United States Patent [19]
Morita et al.

[11] Patent Number: 4,943,612

[45] Date of Patent: Jul. 24, 1990

[54] ULTRA-FINE PARTICULATED POLYMER LATEX AND COMPOSITION CONTAINING THE SAME

[75] Inventors: Hiroshi Morita, Chiba; Eiichi Hirota, Funabashi; Yasuo Ishizaki, Tokyo, all of Japan

[73] Assignee: Lion Corporation, Tokyo, Japan

[21] Appl. No.: 128,657

[22] Filed: Dec. 3, 1987

[30] Foreign Application Priority Data

| | | | |
|---|---|---|---|
| Dec. 6, 1986 | [JP] | Japan | 61-290839 |
| Dec. 6, 1986 | [JP] | Japan | 61-290840 |
| Dec. 6, 1986 | [JP] | Japan | 61-290841 |
| Dec. 6, 1986 | [JP] | Japan | 61-290842 |
| Dec. 6, 1986 | [JP] | Japan | 61-290843 |
| Dec. 6, 1986 | [JP] | Japan | 61-290844 |
| Dec. 6, 1986 | [JP] | Japan | 61-290845 |
| Dec. 6, 1986 | [JP] | Japan | 61-290846 |
| Mar. 31, 1987 | [JP] | Japan | 62-76037 |
| Apr. 24, 1987 | [JP] | Japan | 62-102731 |
| Apr. 24, 1987 | [JP] | Japan | 62-102732 |
| Apr. 24, 1987 | [JP] | Japan | 62-102733 |
| Apr. 24, 1987 | [JP] | Japan | 62-102734 |
| Apr. 24, 1987 | [JP] | Japan | 62-102735 |
| Apr. 24, 1987 | [JP] | Japan | 62-102736 |
| Apr. 24, 1987 | [JP] | Japan | 62-102737 |
| Jun. 15, 1987 | [JP] | Japan | 62-149980 |
| Jun. 15, 1987 | [JP] | Japan | 62-149982 |
| Jun. 15, 1987 | [JP] | Japan | 62-149983 |

[51] Int. Cl.$^5$ .......... C08F 2/16; C08F 2/24; C08F 20/18

[52] U.S. Cl. .......... 524/714; 524/729; 524/745; 524/759; 524/829; 524/831

[58] Field of Search .......... 523/220, 221; 524/829, 524/831, 827, 714, 729, 745, 759

[56] References Cited

U.S. PATENT DOCUMENTS

| | | | |
|---|---|---|---|
| 4,327,004 | 4/1982 | Schmidt et al. | 524/831 |
| 4,771,098 | 9/1988 | Siol et al. | 524/827 |

FOREIGN PATENT DOCUMENTS

| | | |
|---|---|---|
| 0013478 | 7/1980 | European Pat. Off. . |
| 60-170604 | 9/1985 | Japan . |
| 60-170605 | 9/1985 | Japan . |
| 62-253602 | 11/1987 | Japan . |

*Primary Examiner*—Joseph L. Schofer
*Assistant Examiner*—T. McDonald, Jr.
*Attorney, Agent, or Firm*—Armstrong, Nikaido, Marmelstein, Kubovcik & Murray

[57] ABSTRACT

An ultra-fine particulated polymer latex having an average particle size of 100 nm or less, a crosslinked structure and a glass transition temperature lower than a value calculated by a weight fraction method.

4 Claims, 3 Drawing Sheets

ULTRA-FINE PARTICULATED POLYMER LATEX AND COMPOSITION CONTAINING THE SAME

BACKGROUND OF THE INVENTION

1. Field of the Invention

The present invention relates to a polymer latex, more specifically, to an ultra-fine particulated polymer latex obtained from the emulsion polymerization of unsaturated monomers. The present invention also relates to various compositions containing as an essential component the above-mentioned ultra-fine particulated polymer latex obtained from the emulsion polymerization of unsaturated monomers.

The compositions according to the present invention include coating or paint compositions, adhesive compositions, surface coating compositions for metallic materials, magnetic recording media, binder compositions for molding inorganic sintered products, additive compositions for hydraulic inorganic materials, sealing compositions or materials, binder compositions for non-woven fabrics, fiber processing or working compositions, reinforcing compositions for optical transmitting glass fibers, reinforcing compositions for hydraulic inorganic molded articles or materials, compositions for forming electroconductive films, film coating compositions for coated paper, additive compositions for paper making, resin compositions for toner, and photosensitive compositions.

2. Description of the Related Art

It is known in the art to prepare a polymer latex by emulsion polymerization of unsaturated monomers in the presence of an emulsifier. However, the polymer latex obtained by this method has a large particle size, and the film formed therefrom has the drawbacks of inferior properties such as transparency, smoothness, water resistance or solvent resistance, compared with a film formed from an organic solvent type polymer.

To alleviate these drawbacks, methods have been proposed in which the film properties are improved by obtaining a polymer latex having ultrafine particles by use of a polymerization initiator in which a minute amount of a transition metal ion is added as the accelerator in a redox catalyst comprising persulfate and a reducing sulfoxy compound, and then forming an appropriate three-dimensional structure in the polymer latex (Japanese Unexamined Patent Publication (Kokai) No. 60-170604, No. 60-170605, "Surface" vol. 25, No. 2, 86, 1987).

However, in these methods, problems arise in that the influence of the minute amount added of the transition metal used as the polymerization accelerator causes the particle size of the polymer latex to greatly differ, such that even when ultra-fine particulation is possible, the dispersion of the surfactant employed after emulsion polymerization may be small, which greatly increases the viscosity of the polymer latex formed, and thus ammonia water, ammonium phosphate or the like must be added before polymerization or during polymerization.

Further, although the polymer latex obtained by this method is crosslinked within the particles and/or between the particles, due to the influence of the temperature at which a film is formed, the film forming property, transparency or mechanical strength of the film are decreased, and when the polymer latex is stored by stationary standing over a long term, the particles are mutually coalesced or agglomerated to form coarse particles, causing a considerable white turbidity. Further problems arise in that layer separation occurs, and the viscosity is greatly increased. Therefore, this is not an industrially advantageous method.

Also, a method has been proposed in which the water resistance, etc., of the film is improved by obtaining a polymer latex by use of a certain kind of a polyoxyalkylene (meth)acrylic diester (Japanese Patent Publication (Kokoku) No. 54-19905). However, in this method, an ultrafine particulation can not be effected and the polyoxyalkylene (meth)acrylic diester has an inferior solubility and emulsifying power, and further, the film properties such as water resistance, etc., can not be improved unless a large amount of the above diester is used, and moreover, the film becomes sticky, thus causing the problem of an overly strong tackiness.

SUMMARY OF THE INVENTION

Accordingly, the objects of the present invention are to eliminate the above-mentioned disadvantages of the prior art and to provide an ultra-fine particulated pre-crosslinked polymer latex capable of forming a film having an excellent film forming property, transparency, smoothness, tackiness, water resistance, and mechanical strength.

Another object of the present invention is to provide a composition containing the abovementioned ultra-fine particulated polymer latex having an excellent film forming property, transparency, smoothness, tackiness, water-resistance, and mechanical strength.

Other objects and advantages of the present invention will be apparent from the following description.

In accordance with the present invention, there is provided a polymer latex having an average particle size of 100 nm or less, a crosslinked structure, and a glass transition temperature lower than a value calculated by a weight fraction method.

In accordance with the present invention, there are also provided various compositions containing, as an essential component, a polymer latex having an average particle size of 100 nm or less, a crosslinked structure and a glass transition temperature lower than a value calculated by a weight fraction method.

BRIEF DESCRIPTION OF THE DRAWINGS

The present invention will be better understood from the description set forth below with reference to the accompanying drawings: wherein.

DESCRIPTION OF THE PREFERRED EMBODIMENTS

Figure 1:
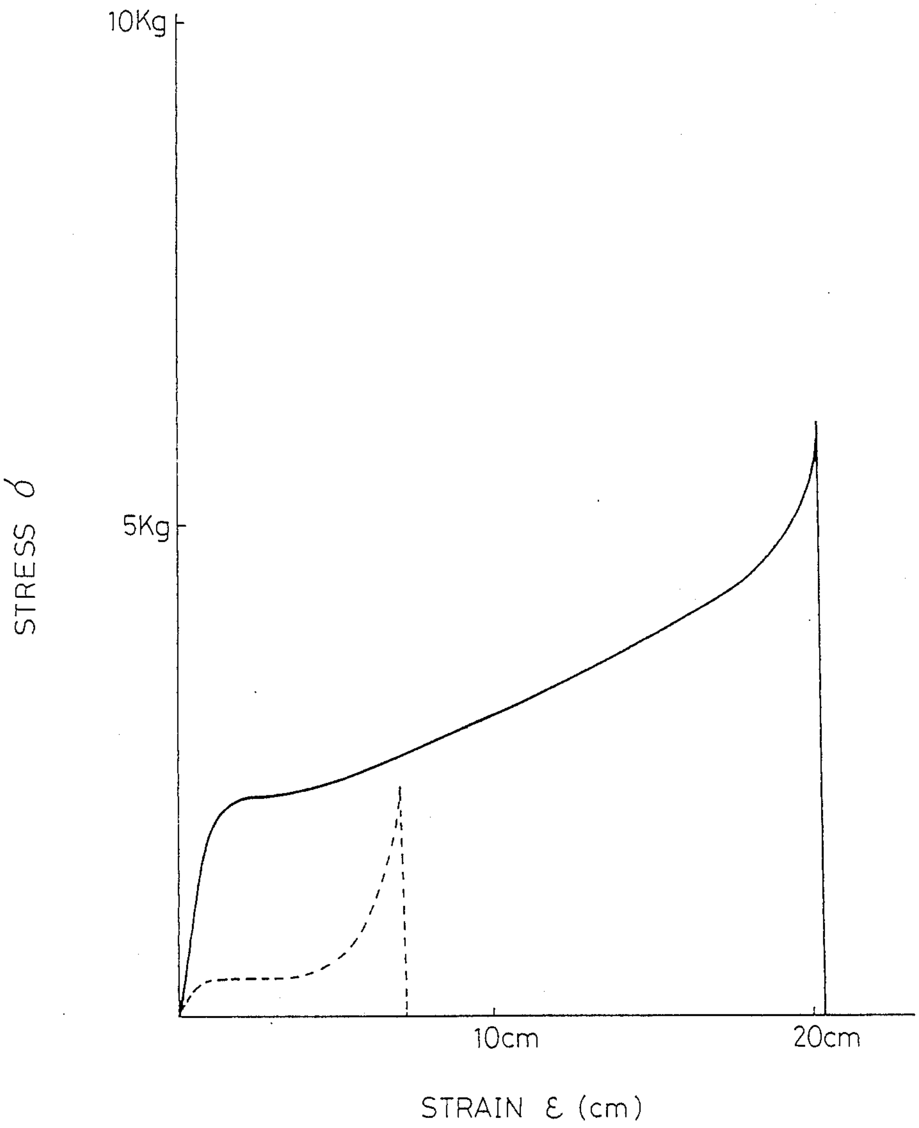
FIG. 1 shows the measurement of the stress-strain test conducted for the dumbbells prepared from the polymer lattices of the products of the invention (Sample No. 1) and the product of the Comparative Example (Sample No. 5: film forming temperature=35° C.) according to JIS K-6781, in which the solid line represents the product of the invention and the broken line represents the product of the Comparison Example.

The polymer latex of the present invention is characterized, primarily, by having an average particle size of 100 nm or less, preferably 80 nm or less.

A polymer latex must have a small average particle size, because a film is formed essentially by a filling and fusion of the particles. In the present invention, since the average particle size is restricted to 100 nm or less, preferably 80 nm or less, various properties of the film such as thermal fusion, transparency, smoothness, luster can be greatly improved.

If the average particle size exceeds 100 nm, a fusion characteristic (denseness) occurs during formation of the film, whereby the luster, transparency and smoothness are sometimes absent, and therefore, the intended purpose of the present invention cannot be accomplished.

Also, the second characteristic of the polymer latex of the present invention is to obtain a crosslinked structure within the particles and/or between the particles.

More specifically, the polymer latex is crosslinked within the particles and/or between the particles thereof by, for example, ion bonding, hydrogen bonding, condensation reaction or mutual polymerization reaction between the functional groups of the unsaturated monomer starting materials or between these and the functional groups possessed by the emulsifier, whereby a film having an excellent transparency, tackiness, water resistance, solvent resistance, and mechanical strength can be formed.

Further, the third characteristic of the polymer latex of the present invention is a glass transition temperature which is lower, preferably by 3° C. or more, more preferably by 5° C. or more, than a value calculated by a weight fraction method.

The glass transition temperature is the temperature at which a change from a glassy rigid state to a rubbery state occurs when a polymer is heated, and provided that the glass transition temperatures of the components which are constituent factors of a polymer are known, the glass transition temperature of the polymer can be determined from the following formula:

$$\frac{1}{Tg} \approx \frac{W_A}{Tg_A} + \frac{W_B}{Tg_B}$$

$W_A$: weight fraction of component A
$W_B$: weight fraction of component B
$Tg_A$: glass transition temperature of component A
$Tg_B$: glass transition temperature of component B The glass transition temperature is influenced by various constituent factors, and generally, in the case of a polymer having a crosslinked structure, the glass transition temperature thereof becomes higher, sometimes by as much as 5° to 7° C., depending on the degree of crosslinking. It is also known that the glass temperature will be lowered by an addition of a plasticizer to the polymer.

On the other hand, in a polymer latex, a minimum film forming temperature is known as the lowest temperature at which a film can be formed by the filling and fusion of the particles, and although the minimum film forming temperature has a proportional relationship to the glass transition temperature, an ultra-fine particulate polymer latex has now been found which is capable of forming a film having a crosslinked structure and having a minimum film forming temperature or a glass transition temperature of the film which is lower than the value calculated by a weight fraction method, and having an excellent mechanical strength.

Thus, the polymer latex of the present invention, although having a crosslinked structure, has a film forming ability exhibiting a glass transition temperature lower than the value calculated by the weight fraction method as described above, and thus exhibits an excellent plasticizing effect different from the products of the prior art, in which the glass transition temperature of the film must be lowered, whereby the minimum film forming temperature is lowered proportionally and, therefore, it is possible to easily form a film having an excellent transparency, tackiness, smoothness, and further, a hard and good mechanical strength such as tensile strength, modulus strength, etc., even at room temperature. In this case, as is apparent from the comparative examples shown below, if the glass transition temperature of the film is higher than the value calculated according to the weight fraction method, the polymer latex cannot fully exhibit the plasticizing effect, and therefore, the minimum film forming temperature becomes higher Accordingly, a film cannot be formed at room temperature, or the formed film, if any, will suffer from the formation of cracks or streaks in the shape of a network, thus failing to form a film having an excellent transparency, smoothness and tackiness, as in the present invention.

Further, a hard and tough film can be obtained only with difficulty, because the hardness and the mechanical strength, such as tensile strength and modulus strength, are absent.

Another characteristic of the polymer latex of the present invention is an excellent dispersion stability over a long term.

More specifically, the polymer latex of the present invention has an average particle size of 100 nm or less, and this average particle size is substantially unchanged even when subjected to a compulsory heating dispersion stability test at 45° C. for one week, or even if a change occurs, generally exhibits a one-peak particle size distribution with an average particle size diameter of 150 nm or less, or even in the case of a greater change ratio, exhibits a two-peak distribution with a first peak particle size distribution of an average particle size of less than 150 nm comprising 97% or more, with the second peak having a particle size distribution of 300 nm or more formed by agglomeration of particles at an extremely small peak of 3% or less, thus having an extremely small particle size distribution of the average particle size.

Further, in the polymer latex of the present invention, even when subjected to a long term storage stability test at 25° C. for 6 months, as is apparent from the Examples and Comparative examples shown below, the change ratio in the average particle size thereof is extremely small.

Accordingly, the polymer latex of the present invention is substantially free from coalescence or mutual agglomeration between particles over a lapse of time and does not form coarse particles, and therefore, there is no change in particles size, lowering in transmittance, change in viscosity, and further change in appearance, etc., and thus an excellent dispersion stability is exhibited over a long term and a lowering of mechanical strength caused by a formation of coarse particles does not occur when formed into a film.

The reason why the polymer latex of the present invention exhibits the excellent dispersion stability described above is not absolutely clear, but the basic factors may be estimated to be that the Brownian movement is relatively active since the average particle size of 100 nm or less, that the respective particles are sufficiently protected because no polymerizable emulsifier remains in the system, and the properties of the respective particle surfaces, etc., whereby coalescence or mutual agglomeration between particles is inhibited and the formation of coarse particles does not occur.

Also, in the present invention, to further improve the dispersion stability of the above polymer latex, for example, polymerization inhibitors or polymerization terminators known in the art, such as p-hydroxydiphenylamine, N,N'-diphenyldiamine, 2,5-di-tert-butylhydroquinone can be added.

Also, the average molecular weight of the already crosslinked polymer latex of the present invention may be generally 1,000,000 or higher, preferably about 10,000,000 to 100,000,000, and in a latex having a higher crosslinking degree, a molecular weight of about 10,000,000 to 1,000,000,000 sometimes may be exhibited.

The present invention is described below in more detail.

The polymer latex of the present invention can be obtained by emulsion polymerization of an unsaturated monomer in the presence of a specific emulsifier, as described below.

As the unsaturated monomer, there may be exemplified (meth)acrylates represented by the formula (I) shown below:

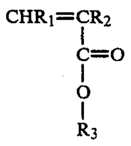 (I)

wherein $R_1$ and $R_2$ independently represent hydrogen or methyl, $R_3$ is an alkyl having 1 to 18 carbon atoms; or lower fatty acid vinyl esters such as vinyl acetate, vinyl propionate, vinyl butyrate; nitriles such as acryronitrile, methacrylonitrile; styrenes such as styrene, α-methylstyrene, chlorostyrene vinyls such as vinyl chloride, vinyl bromide; vinylidenes such as vinylidene chloride, vinylidene bromide; dienes such as butadiene, chloroprene, isoprene; and vinylpyridine; and so on, but preferably, (meth)acrylates, lower fatty acid vinyl esters, nitriles and styrenes are used.

Also, in the present invention, as the unsaturated monomer to be copolymerized with the above unsaturated monomer, for further consolidating the crosslinked structure within the particles and (or) between particles of the polymer latex formed and promoting crosslinking during film formation, an unsaturated monomer having reactive functional groups is preferably used, but an unsaturated monomer not having a functional group, which is convertible to a compound having active hydrogen in the emulsion polymerization system, can be used.

Examples of such unsaturated monomers having reactive functional groups may include the compounds of the formulae (II)-(VIII) as shown below. These monomers can be used either individually or as a combination of two or more compounds, and further, if desired, other copolymerizable unsaturated monomers can be used in combination therewith.

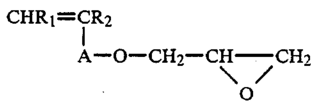 (II)

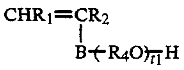 (III)

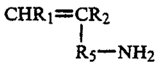 (IV)

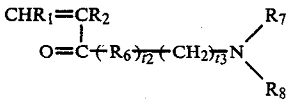 (V)

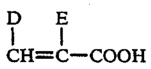 (VI)

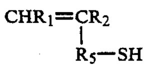 (VII)

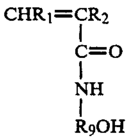 (VIII)

wherein $R_1$, $R_2$, $R_4$, $R_5$, $R_6$, $R_7$, $R_8$, $R_9$, B, D, E, $t_1$, $t_2$ and $t_3$ have the following meanings:

$R_1$, $R_2$: hydrogen or methyl;
$R_4$: alkylene having 2 to 4 carbon atoms;
$R_5$: direct bond, alkylene having 1 to 3 carbon atoms, phenylene or substituted phenylene;
$R_6$: oxygen or —NH—;
$R_7$: hydrogen, alkylol having 1 to 5 carbon atoms;
$R_8$: hydrogen, alkylol having 1 to 5 carbon atoms or alkyl having 1 to 5 carbon atoms;
$R_9$: alkylene having 1 to 4 carbon atoms;
A: methylene or carbonyl;
B: $—CH_2O—$ or carboxyl;
D: hydrogen, alkyl having 1 to 3 carbon atoms, carboxyl,

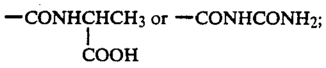

E: hydrogen atom, alkyl having 1 to 3 carbon atoms or $—CH_2COOH$;
$t_1$: real number of 1 to 20;
$t_2$: integer of 0 or 1; and
$t_3$ integer of 0 to 10.

Specific examples of the compounds of the formulae (II), (III), (IV), (V), (VI),(VII) and (VIII) may include those as shown below.

Examples of the formula (II):
Glycidyl acrylate
Glycidyl methacrylate
Glycidyl crotonate
Glycidyl allyl ether.

Examples of the formula (III):
- Hydroxyethyl acrylate
- Hydroxyethyl methacrylate
- Hydroxyethyl crotonate
- Hydroxypropyl acrylate
- Hydroxypropyl methacrylate
- Hydroxypropyl crotonate
- Hydroxybutyl acrylate
- Hydroxybutyl methacrylate
- Polyoxyethylene monoacrylate
- Polyoxyethylene monomethacrylate
- Polyoxyethylene monocrotonate
- Polyoxypropylene monoacrylate
- Polyoxypropylene monomethacrylate
- Polyoxypropylene monocrotonate
- Polyoxybutylene monoacrylate
- Polyoxybutylene monocrotonate
- Hydroxyethyl allyl ether
- Hydroxypropyl allyl ether
- Hydroxybutyl allyl ether
- Polyoxyethylene allyl ether
- Polyoxypropylene allyl ether
- Polyoxybutylene allyl ether.

Examples of the formula (IV):
- Allylamine
- Acrylamine
- Methacrylamine
- Aminostyrene
- α-Methylaminostyrene.

Examples of the formula (V):
- Acrylaminde;
- Methacrylamide;
- Aminopropylmehacrylamide;
- Monomethylacrylamide;
- Monoethylacrylamide;
- Diethylolaminopropylacrylamide.

Examples of the formula (VI):
- Acrylic acid
- Methacrylic acid
- Crotonic acid
- Itaconic acid
- Maleic acid and a monoester thereof with alkyl having 1 to 5 carbon atoms or anhydride
- Fumaric acid and a monoester thereof with alkyl having 1 to 5 carbon atoms or anhydride
- Maleic alanide
- Fumaric alanide
- N-carbamoylmaleic amide
- N-carbamoylfumaric amide.

Examples of the formula (VII):
- Methylallyl thiol
- Methylmercaptostyrene.

Examples of the formula (VIII):
- N-methylolacrylic amide
- N-methylolmethacrylic amide
- N-methylolcrotonic amide
- N-(2-hydroxyethyl)acrylic amide
- N-(2-hydroxyethyl)methacrylic amide
- N-(2-hydroxypropyl)acrylic amide
- N-(2-hydroxypropyl)methacrylic amide.

The ratio of the above unsaturated monomer to the unsaturated monomer having reactive functional groups used may be 99/1 to 60/40 (by weight), preferably 99/1 to 90/10 (by weight). If the use ratio is greater than 1, the crosslinking degree within the particles and between particles of the polymer latex formed will become smaller, and if it is smaller than 60/40, the emulsion polymerizability is reduced, whereby a large amount of agglomerates may be formed, or the film forming property will be inferior, or cracks may occur in the film.

As the emulsifier to be used in emulsion polymerization of the polymer latex of the present invention by use of the above unsaturated monomers, any emulsifiers may be employed which can form a film exhibiting a glass transition temperature lower than the value calculated according to the weight fraction method as described above, but particularly preferably emulsifiers include polyoxyalkylene ethylenically unsaturated carboxylic acid polyesters represented by the formula (IX) shown below (hereinafter abbreviated as poly(meth)acryloyl type emulsifier), the betaine ester type emulsifiers represented by the formulae (X), (XI), (XII), (XIII), and (XIV), and ether carboxylic acid type emulsifiers represented by the formulae (XV), (XVI), and (XVII).

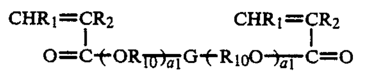
(IX)

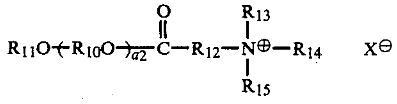
(X)

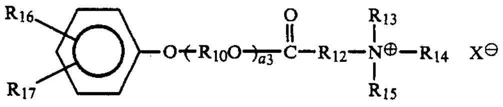
(XI)

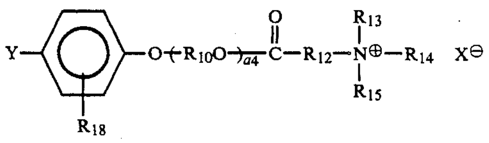
(XII)

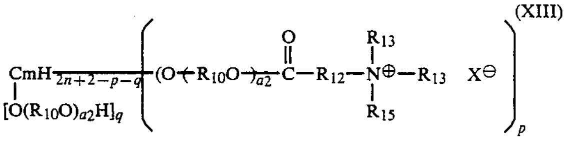
(XIII)

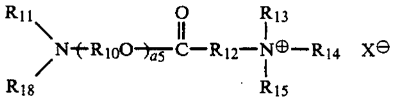
(XIV)

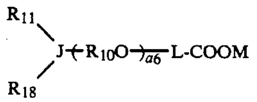
(XV)

$$R_{11}-N[(R_{10}O)_{a7}L\text{-}COOM]_2 \qquad (XVI)$$

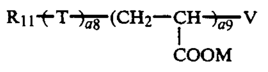
(XVII)

wherein $R_1$, $R_2$, $R_{10}$, $R_{11}$, $R_{12}$, $R_{13}$, $R_{14}$, $R_{15}$, $R_{16}$, $R_{17}$, $R_{18}$, $a_1$, $a_2$, $a_3$, $a_4$, $a_5$, $a_6$, $a_7$, $a_8$, $a_9$, $a_{10}$, G, J, L, M, T, X, Y and V have the following meanings.

$R_1$, $R_2$: hydrogen or methyl $R_{10}$: alkylene having 2 to 4 carbon atoms;

$R_{11}$: alkyl or alkenyl having 8 to 30 carbon atoms, which are either straight or branched, preferably one having 8 to 18 carbon atoms;

$R_{12}$: alkylene having 1 to 5 carbon atoms;

$R_{13}$, $R_{14}$, $R_{15}$: alkyl having 1 to 3 carbon atoms or $-C_2H_4OH$, and the respective groups may be either the same or different;

$R_{16}$, $R_{17}$: alkyl having 6 to 20 carbon atoms or hydrogen, of which at least one is alkyl having 6 to 20 carbon atoms;

$R_{18}$:hydrogen, alkyl or alkenyl having 1 to 30 carbon atoms;

$a_1$, $a_2$, $a_3$, $a_4$, $a_5$, $a_6$, $a_7$: each represent average moles added, $a_1$: real number of 1 to 50, and preferable the mole number of alkylene oxide added in the molecule is 8 or more;

$a_2$: real number of 0 to 20;

$a_3$: real number of 0 to 20 when either one of $R_{16}$ and $R_{17}$ is alkyl, and a real number of 1 to 30 when both $R_{16}$ and $R_{17}$ are alkyls;

$a_4$: real number of 1 to 30;

$a_5$: real number of 0 to 20;

$a_6$: real number of 0 to 20;

$a_7$: real number of 0 to 20;

$a_8$: integer of 0 or 1;

$a_9$: real number of 2 to 20;

p: integer of 2 to 5;

q: integer of 0 to 3;

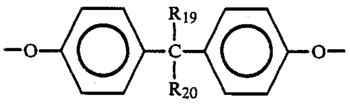

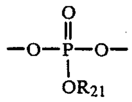

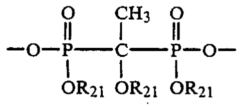

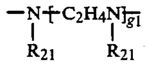 or $-O-C_nH_{2n-g2}-(R_{21})_{g2}O-$ $R_{19}$, $R_{20}$: hydrogen or alkyl having 1 to 2 carbon atoms;

$R_{21}$: hydrogen or $-(R_{10}O)_{a10}H$ or

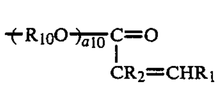

$g_1$: integer of 0 to 5;

$g_2$: integer of 0 to 10;

n: integer of 1 to 10

$a_{10}$: real number of 1 to 50;

Y:

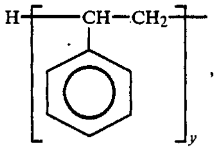 ,

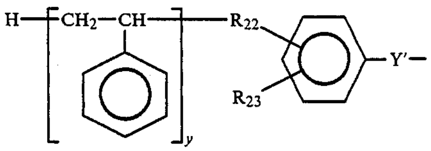

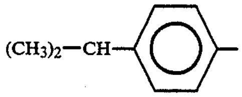 or

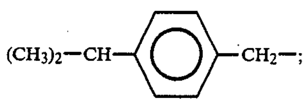

and y is a real number of 1 to 5;

$R_{22}$, $R_{23}$: hydrogen or alkyl having 1 to 20 carbon atoms;

y': alkylene having 3 to 8 carbon atoms, oxygen or carbonyl;

J: nitrogen,

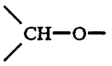 or 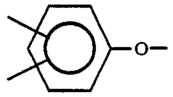

L: alkylene having 1 to 5 carbon atoms or

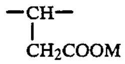

T: direct bond, oxygen, sulfur;

M: hydrogen or inorganic anion;

X: inorganic anion or organic anion;

V: hydrogen or halogen;

Each of these emulsifiers can be used alone, but particularly when obtaining a pre-crosslinked polymer latex of ultra-fine particles having a dense and higher crosslinked structure within the particles and (or) between the particles with a ultrafine average particle size and capable of forming a film exhibiting a glass transition temperature lower than the value determined from the calculation formula, as the emulsifier to be used for the above unsaturated monomers, (a) the poly(meth-)acroyl type emulsifier represented by the above formula (IX), (b) the betaine ester type emulsifier represented by the above formulae ((X), (XI), (XII), (XIII), (XIV), and (c) the ether carboxylic acid represented by the above formulae (XV), (XVI), (XVII) may be used at a weight ratio of (a)/(b)=1/9 to 9/1 or (a)/(c)=1/9 to 9/1, preferably 1/4 to 4/1. If the use ratio is smaller than 1/9, the crosslinking degree within the particles and/or between particles of the polymer latex becomes smaller, and if greater than 9/1, the average particle size of the polymer latex may become greater. The amount employed of these emulsifiers is suitably about 0.1 to 15% by weight, preferably 0.5 to 10% by weight, based on the unsaturated monomers to be emulsion polymerized.

Also, known anionic, nonionic and cationic surfactants may be added, if desired, and specific examples thereof include the sulfate type of higher alcohols, higher alcohol alkylene oxide adducts, alkylphenol alkylene oxide adducts, and styrenated phenol alkylene oxide adducts; the olefin sulfonate type of α-olefins; the respective quaternary ammonium salt type of long chain alkylamine alkylene oxide adducts and di-long chain alkylamine alkylene oxide adducts; sodium salt of N-(1,2-dicarboxyethyl)-N-octadecylsulfonic monoamide; and dialkylsulfosuccinate.

Also, when obtaining the polymer latex of the present invention, if a betaine ester is used as the emulsifier, the pH in the emulsion polymerization is desirably controlled to less than 6, preferably 3 to 6. If the pH is higher than 6, a large amount of agglomerates exhibiting physical properties greatly different from those of the polymer latex of the present invention will be undesirably formed in the emulsion polymerization step.

Further, when obtaining the polymer latex of the present invention, the emulsion polymerization process known in the art can be used as such in the presence of the above unsaturated monomers and the above emulsifier. For example, emulsion polymerization may be performed by emulsifying the polymer of the unsaturated monomer at a concentration of 20 to 60% by weight in water in the presence of a polymerization initiator corresponding to 0.1 to 5% by weight of the unsaturated monomer.

As the polymerization initiator, a water-soluble single initiator or water-soluble redox initiator conventionally used in emulsion polymerization may be used, and examples of such an initiator include hydrogen peroxide alone, combinations of hydrogen peroxide with carboxylic acid such as tartaric acid, citric acid, ascorbic acid, combinations of hydrogen peroxide with oxalic acid, sulfinic acid and salts of these or oxyaldehydes, water soluble iron salts, and alternatively, peroxides such as persulfates, percarbonates, perborates, and water-soluble azo type initiators such as 2,2'-azobis(2-amidinopropane) and salts thereof, 2,2'-azobis(N,N'-dimethyleneisobutylamidine) and salts thereof, 4,4'-azobis(4-cyanovalecic acid) and salts thereof.

Also, water-soluble nonionic polymeric materials, anionic polymeric materials, and cationic polymeric materials, etc., can be used in combination. Further, plasticizers and pH controllers conventionally used in the prior art method can be also used in combination, if desired.

Examples of nonionic polymeric materials may include polyvinyl alcohol, starch derivatives such as dextrin, hydroxyethyl starch, hydroxyethyl cellulose, hydroxyethyl cellulose, and hydroxypropyl cellulose.

Examples of anionic polymeric materials may include polymers such as anionized hydroxyethyl cellulose, anionized starch, anionized guar gum, anionized chitosan, carboxymethyl cellulose, and anionized polyvinyl alcohol.

As the cationic polymeric polymers, there may be included polymers such as cationized hydroxyethyl cellulose, cationized starch, cationized guar gum, cationized chitosan, and cationized (meth)acrylic amide, cationic (meth)acrylic amide, and dimethyldiallylammonium chloride.

These nonionic polymeric materials, cationic polymeric materials and anionic polymeric materials can be used as a single kind or as a combination of two or more kinds, and the amount added is suitably 0.05 to 5% by weight, preferably 0.1 to 3% by weight, based on the monomers to be emulsion polymerized.

As the plasticizer, phthalic acid esters, phosphoric acid esters may be employed. Further, as the pH controller, a salt such as sodium carbonate, sodium bicarbonate, sodium acetate can be used in combination within the range from 0.01 to 3% by weight, but as mentioned above, desirably the pH is less than 6 when a betaine ester type emulsifier is used as the emulsifier.

As mentioned above, according to the present invention, the pre-crosslinked polymer latex of ultra-fine particles having an excellent dispersion stability and film forming property over a long term, and giving a film having, for example, an excellent transparency, water resistance, and mechanical strength, can be provided, and therefore, can exhibit effects not found in the prior art when applied for use in the various compositions mentioned hereinbelow.

Coating or Paint Composition

It is desired in the art, from the viewpoint of, for example, improvements in air pollution and working environmental conditions as well as savings of valuable materials, that aqueous emulsion coating compositions having an excellent film forming property, transparency, smoothness, tackiness, water resistance, and mechanical strength be developed.

According to the present invention, the desired coating composition can be provided by incorporating as an essential component or vehicle therein the abovementioned aqueous polymer latex emulsion, together with conventional ingredients for coating compositions.

The ingredients for coating compositions usable in the present invention may contain any known conventional ingredients for coating compositions. Examples of such ingredients are various coloring pigments, extender (or loading) pigments, rust preventive pigments, antibacterial agents, mildewproofing agents, extenders, fillers, dispersants, viscosity modifiers, antifoam agents, and various other auxiliary additives conventionally used in coating compositions.

Although there are no critical limitations to the concentration of the aqueous polymer latex emulsion in the composition, the aqueous polymer latex composition is preferably included in a concentration of 0.2% to 60% by weight, more preferably 2% to 40%, in terms of a solid content, in the total amount of the composition.

The present coating composition can be widely used from the fields in which conventional aqueous type coating compositions are used to the fields in which conventional solvent type coating compositions are used. Examples of such application fields are wooden products, plastic products, metallic products, civil and architectural structures, automobiles, and railway cars. The present aqueous polymer latex emulsions can be formulated as a vehicle into clear coating compositions for undercoats and topcoats or emulsion coating compositions, or as a raw material into baking coating materials by, for example, blending with, for example, water-soluble melamine resins, or as a blending agent for improving the coating film properties into, for example, water-soluble coating compositions, powdery coating compositions, and hi-solid type coating compositions.

Furthermore, since the present coating compositions have remarkably excellent thixotropic properties and film formability and form strong coating films having an excellent water resistance, the present coating compositions may be used as a surface finish paint for civil and architectural structures, skip bottom paints, bridge paints, magnetic paints including metallic powder, electroconductive paints, radiation blocking paints for electromagnetic radiation shields, or marker inks and nail polishes.

Since the present coating compositions contain as an essential constituent, aqueous polymer latex emulsions having an average particle size of 100 nm or less, a crosslinked structure and a glass transition temperature lower, preferably 3° C. or more, than a value calculated by a weight fraction method, the resultant coating compositions are capable of forming, unlike conventional coating compositions, coating films having an excellent film formability, transparency, smoothness, tackiness, water resistance, and mechanical strength. Accordingly, the present coating compositions can be coated on the surfaces of, for example, various substrates and products such as wooden products, plastic products, mortar products, concrete products, and metallic products to provide thereto various excellent characteristics such as transparency, water resistance, weather resistance, and impact resistance. Furthermore, since the present coating compositions contain no organic solvents, the desired safe and non-pollution type coating compositions can be provided.

Adhesive Composition

It is desired in the art, from the viewpoint of, for example, the improvements in air pollution and working environmental conditions as well as the savings of valuable materials, that aqueous emulsion type adhesive compositions having an excellent transparency, tackiness, water resistance, boilproofing, and adhesion strength are developed.

According to the present invention, the desired adhesive composition can be provided by incorporating as an essential component thereinto the above-mentioned aqueous polymer latex emulsion, together with conventional ingredients for adhesive compositions.

The ingredients for adhesive compositions usable in the present invention may contain any known conventional ingredients for adhesive compositions. The conventional ingredients include fillers and pigments, which improve the stability, flowability, and workability of the adhesive compositions and the smoothness of the applied film and further exhibit extender or loading effects. Examples of such ingredients are barium sulfate, calcium sulfate, aluminum oxide, aluminum silicate, clay, kaolin, talc, bentonite, diatomaceous earth, titanium dioxide, zinc oxide, and carbon black. These ingredients may be used alone or in any mixture thereof.

In addition, if desired, extenders such as casein, soybean protein, wheat flour, starch, and oxidized starch can be used in the present adhesive compositions. Furthermore, dispersants, corrosion inhibitors, rust preventive agents, preservatives, mildewproofing agents, plasticizers, aging preventive agents, antifoam agents, pH adjustors, reaction accelerators, reaction retarders, coloring agents, and various other auxiliary additives conventionally used in adhesive compositions can be used in the present invention.

Although there are no critical limitations to the concentrations of the aqueous polymer latex emulsion in the composition, the aqueous polymer latex composition is preferably included in a concentration of 0.2% to 60% by weight, more preferably 2% to 40%, in terms of a solid content, in the total amount of the composition.

Since the present adhesive composition contains as an essential constituent the above-mentioned aqueous polymer latex, the resultant adhesive composition exhibit an excellent film forming property, transparency, tackiness, water resistance, boilproofing, and adhesion strength, unlike conventional adhesive compositions.

Accordingly, the present adhesive composition has an excellent waterproof adhesive force, weather resistance, and service durability and, therefore, can be advantageously applied in a wide variety of application fields. Examples of such application fields are plywood, woodworking, fabrication of plywood, wood-plastic composite (WPC) materials, waterproof corrugated board, composite materials of metallic foils and porous wood, paper, or other materials, binders for hard board, rock wool, glass wool, fiber board, asbestos filled cement board, calcium silicate board, gypsum board, wood wool filled cement board, and other similar products, and further fabrication works thereof with other materials. Furthermore, the present adhesive composition can be used in the fields of packings for carpets, tire cord treatment, non-woven fabric binders, flock processing, printing of fabrics, paper reinforcing agents, clay binders for paper, waterproof coating agents for paper, sand binders for casting, fiber fabric treatment agents, coating compositions for wooden materials, sealing agents, putty, and other sealants. Furthermore, when tackifiers are added, the present composition can be used as a tack agent.

Since the present adhesive compositions do not contain an organic solvent, the desired safe and non-pollution type adhesive compositions can be advantageously provided.

Surface Coating Composition for Metallic Material

It is desired in the art from the viewpoints of, for example, the prevention of possible fire generation and safety to human body, as well as the characteristics thereof, that aqueous surface coating compositions for metallic materials having excellent transparency, smoothness, luster, water resistance, weathering resistance, and mechanical strength.

In the past, solvent type rust resisting paints containing, for example, lead compounds or zinc powder and vehicles, are generally used for preventing rust generation and corrosion of metallic materials such as inner and outer wall surfaces of various tanks, chemicals plants, various steel structures, roofs, buildings, and various steel pipes (e.g., tap water sewage, water supply, oil or petroleum transportation, and coal/oil mixture (COM/transportation).

Various proposals have been made to develop the improved surface coating compositions for metallic materials without using organic solvents; for example, the use of cement mortar in the surface coating compositions. However, the use of cement mortar causes problems in that cracks occur in the protective coatings with the elapse of time and various desired characteristics such as mechanical strength, impact resistance, abrasive resistance, and acid resistance are not obtained. Furthermore, the formulation of various synthetic resin emulsion into the surface coating compositions containing cement mortar has been proposed (see JP-A-No. 50-44221, JP-B-No. 47-38527, and JP-A-No. 53-128543) to improve the various characteristics. However, the desired characteristics such as water resistance, saline water resistance, weathering resistance, and impact resistance cannot be sufficiently obtained. Furthermore, the glossiness and smoothness are unsatisfactory and, therefore, when these surface coating compositions are applied to the surface of metallic materials, the natural metallic luster is impaired.

Contrary to the above, according to the present invention, the desired surface coating composition for a metallic material can be provided by incorporating as an essential component thereinto the above-mentioned aqueous polymer latex emulsion, together with conventional ingredients for the surface coating compositions. Examples of such ingredients are rust preventing agents, anticorrosive agents, aggregates, cement mortar paste, fibers (e.g., carbon fibers, glass fibers), fillers, dispersants, wetting agents, water repellency agents, and other various auxiliary additives.

The present surface coating composition can be advantageously applied to various metallic materials such as inner and outer wall surfaces of various tanks, chemical plants, various heavy steel structures such as bridges and steel towers, general steel structures such as proofs and inner and outer walls of buildings, the inside and outside surface livings of various steel pipes (e.g., tap water, sewage, water supply, oil or petroleum transportation, and coal/oil mixture (COM) transportation).

Especially, since the present surface coating compositions have excellent water resistance, solvent resistance, and mechanical strength, they can be advantageously applied as, for example, lining coating for hollow steel pipes such as seamless pipes suitable for use in the transportation of, for example, crude oil, petroleum products, COM, coal-water mixture (CWM), which require water resistance, solvent resistance, corrosion resistance, rust resistance, and mechanical strength such as abrasion resistance in the inner walls and water resistance, weathering resistance, and mechanical strength such as damage resistance in the outer walls as well as for pipes for building materials.

As mentioned above, since the present surface coating composition contains, as an essential component, the above-specified aqueous polymer latex emulsion, the polymer coating film having excellent characteristics such as transparency, luster, smoothness, water resistance, solvent resistance, weathering resistance, service durability, and mechanical properties can be formed on the surface of metallic materials without causing the generation of cracks in the films and film release. Thus, the desired protective coatings having an excellent water resistance, weathering resistance, service durability, and other properties can be afforded to the metallic materials without impairing the natural luster of the metallic materials.

Magnetic Recording Media

Magnetic recording media are generally produced by coating on the surfaces of a substrate a magnetic coating composition containing magnetic powder particles dispersed in a solution of a resin (i.e., a binder) in an organic solvent. However, these organic solvent type magnetic coating compositions have various problems such as possible occurrences of fires, environmental air pollutions, health and higienic pollutions and further have disadvantages such as poor dispersibility of the magnetic powder particles and various characteristics.

It has been proposed in, for example, JP-B-Nos. 54-39125, 54-39126, and 57-572 and JP-A-59-9247 that aqueous emulsion type magnetic coating compositions are used in the manufacture of magnetic recording media. According to these proposals, the above-mentioned problems caused from the use of organic solvents are solved. However, although the dispersibility of magnetic power particles and the abrasion resistance and heat resistance of recording media are improved to a certain extent, the stretchability is poor and other properties such as the heat resistance and abrasion resistance are not necessarily satisfactory.

As mentioned above, it is desired in the art that the magnetic recording media having an excellent stretchability and luster as well as a good abrasion resistance and heat resistance are developed. According to the present invention, the desired magnetic recording media can be provided by using the above-mentioned aqueous polymer latex emulsion as a binder component of the magnetic recording media.

The present magnetic recording media can be prepared in any conventional manner. For example, the above-mentioned aqueous polymer emulsion is neutralized and stabilized by adding an aqueous ammonia solution thereto, followed by mixing magnetic powder particles therewith. The magnetic coating composition thus prepared is then coated on the surface of the substrate such as a polyester film. The coated film is then dried, followed by an optional thermal treatment.

Although there are no critical limitations to the concentration of the aqueous polymer emulsion in the composition, the aqueous polymer emulsion is preferably included in a concentration of 3% to 40% by weight, preferably 5% to 25% by weight, in terms of a solid content, in the total amount of the composition. The magnetic coating composition generally contains 10% to 60% by weight, preferably 15% to 50% by weight, of magnetic powder particles such as $\gamma$-$Fe_2$, $O_3CrO_2$ and Co-$\gamma$-$Fe_2O_3$. The magnetic coating composition thus prepared is generally applied to the substrate at a thickness of the magnetic recording layer of 1 to 100 $\mu$m, preferably 3 to 50 $\mu$m.

Since the present magnetic recording media contains, as a binder component, the above-mentioned aqueous polymer emulsion, an excellent surface luster, heat resistance, and abrasion resistance and good stretchability can be obtained and further tackiness between inter layers does not occur. Thus, the practical value of the present magnetic recording media is extremely high.

Binder Composition for Molding Inorganic Sintered Products

The above-mentioned aqueous polymer latex emulsion according to the present invention can be advantageously used in binder composition for molding inorganic sintered products (e.g., ceramics) from inorganic powder (e.g., alumina powder).

Inorganic sintered products are generally manufactured by molding inorganic sintering compositions, granulated by, for example, a spray dryer, by a press molding method or a rubber press molding method. Alternatively, inorganic sintered products are molded by forming the compositions in the form of a film by, for example, a doctor blade method. In these molding methods, various binders are utilized. Examples of such binders usable in the press molding and rubber press molding methods are polyvinyl-alcohol, alkali salts of carboxymethylcellulose, alkali salts of acrylic resins, alkali salts of isobutyrene-maleic anhydride copolymer resins. However, these aqueous resin binders have disadvantages in that the stability and flowability of slurries are poor, the mold damage is serious due to the molding of very hard molded products, the mechanical strength of the molded products is poor, and products having excellent luster and smoothness cannot be obtained.

On the other hand, the doctor blade method is usually used for the manufacture of inorganic sintered products in the form of a sheet, which are usually used in, for example, IC substrates. In this method, so-called solvent type binders are used in which binder components such as butyral resins and acrylic resins are dissolved in solvents, for example, alcohols such as methanol, ethanol, and methylethylketone, and toluene. However, the use of organic solvents is not preferable because the working environmental conditions are worsened and because there is some danger of causing fire.

There are various proposals to eliminate these disadvantages. For example, the use of polyvinyl alcohol, aqueous acrylic resins, polyethyleneoxide, or polyurethane resins as a binder is proposed. However, when these binders are used, the stability and flowability of the slurries are poor, the molding machines are damaged because the resultant molded products are very hard, or post-processing steps are required because the nerve of the molded products is not strong. Various further attempts have been made to obviate the above-mentioned disadvantages as shown in, for example, JP-A-No. 58-181763, 59-35059, 58-167470, JP-A-58-167471, and JP-A-57-7861. However, these proposed binders are still unsatisfactory.

As mentioned above, it is clearly desired in the art that the binder compositions for molding inorganic sintered products providing tough molded products having an excellent appearance (e.g., luster, transparency) and no buckling with a good workability and without causing damage to the molded products, be developed. According to the present invention, the desired binder composition for molding inorganic sintered products can be provided by using the above-mentioned aqueous polymer emulsion as a binder component in the compositions.

The inorganic sintered products such as ceramics and casting molds can be prepared as follows. For example, inorganic powder and the present aqueous polymer emulsion are mixed preferably in a weight ratio of inorganic powder/aqueous emulsion (solid)=99.9/0.1 to 8/2. The resultant compositions can be readily molded in any desired shape by using an extrusion molding method, press molding method or doctor blade method. Examples of the inorganic powder are alumina, silicon oxide, silicon nitride, zirconia, condielite, lithia based ceramics (lithium-alumina-silica; LAS), sodium oxide, hafnium oxide, barium titanate, lead titanate zirconate, zeolite, magnesia, beryllia, boron oxide, tin oxide, aluminum titanate, zinc oxide, silicic sand, olivine sand, zircon sand, and chromite sand.

According to the present invention, since the aqueous polymer emulsion is contained in the binder composition, the workability is improved and the inorganic molded products obtained therefrom have an excellent appearance such as transparency and luster, strong nerve and good mechanical strength. In addition to the strong nerve and toughness, the resultant molded products does not have a very high hardness and, therefore, very little damage to the molded products occurs during the molding step.

Additive Compositions for Hydraulic Inorganic Materials

The above-mentioned aqueous polymer latex emulsion according to the present invention can be advantageously used in the additive compositions for hydraulic inorganic materials.

Various additives are conventionally used in hydraulic inorganic material compositions such as cement pastes, mortars, plasters, concretes, and grouts to improve various characteristics of the molded products, for example, adhesion force, water resistance, chemical resistance, mechanical strength (e.g., bending strength and tensile strength), abrasion resistance or appearance. For example, various additives have been proposed in JP-A-Nos. 60-103061, 60-251160, 60-173054, 57-67061, 57-77059, 59-102480, and 58-49653. Examples of such additives are various polymer compounds such as styrene-vinyl chloride-ethylene terpolymer emulsions, various polymer dispersions, various polymer emulsions, combinations of ethylene-vinyl acetate copolymer emulsions and styrenebutadiene synthetic rubber latexes, and composite polymer emulsions. However, although these additives can improve the various characteristics of hydraulic inorganic compositions and appearance of the molded products to some extent, these improvements are still not enough.

As mentioned above, it is desired in the art that additive compositions for hydraulic inorganic materials capable of further improving the appearance of the molded products and of further improving various characteristics such as water resistance and mechanical properties be developed. According to the present invention, the desired additive compositions for hydraulic inorganic materials can be provided by using the above-mentioned aqueous polymer emulsion as an essential component in the compositions.

The present additive composition can be added to various hydraulic inorganic compositions including cement pastes, mortars, plasters, concretes, or grouts, together with various optional conventional additives, followed by hardening the mixture in any conventional manner.

Examples of such additives are coloring pigments, such as titanium dioxide, oxide yellow, titanium yellow, red iron oxide, black iron oxide, ultramarine blue, chrome green, and violet iron oxide; settling accelerating agents such as calcium chloride; dispersants such as lignin sulfonates and hydroxycarbonates; waterproofing agents such as calcium stearate; antifoaming agents such as tributylphosphates and polypropylene polyethylene glycol; antifreezing agents such as nitrogen-containing sulfur compounds; reinforcing agents such as carbon fibers; electroconductive agents such as metallic powder; and preservatives.

As mentioned above, since the present additive compositions for hydraulic inorganic materials contain the above-mentioned aqueous polymer emulsion as an essential constituent, the visual appearance of the hydraulic inorganic materials can be improved and various characteristics such as the water resistance as well as mechanical strength (e.g., bending strength, compression strength) can be further improved. Accordingly, the practical value of the present additive composition is extremely high.

Sealing Compositions or Materials

The above-mentioned aqueous polymer latex emulsion according to the present invention can be advantageously used in sealing compositions suitable for use in the repair and reinforcement of civil and architectural structures such as cement mortar structures and cement concrete structures.

Since concrete generally used as structural materials in civil and architectural fields has, for example, a poor tensile strength and bending strength, and shrinkage cracks or similar phenomena inevitably occur. These shrinkage cracks are then developed by a strain caused by external force such as external loads and changes in the ground conditions to finally cause a break in the waterproofing layer. This, of course leads to water leakage of, for example, rain and underground water, and furniture and baggage inside, for example, buildings, are contaminated and damaged, and erosion also occurs to cause serious damage to the inside of the structures, whereby the life of the architectural structures is shortened.

Various sealing materials have been used as methods for preventing water leakage and for improving the life of the structures. For example, although JP-A-No. 58-80066 discloses the use of polymer cements as the sealing material, the water resistance is poor, when epoxy resins are used, the life of a structure is reduced due to the difference in adhesion forces between the hardened products and the civil and architectural structures depending upon the conditions. Furthermore, JP-A-No. 53-98122 proposes the use of urethane prepolymer as a sealing material. Although this sealing material improves the waterproofing properties and the structural life when compared to the above-mentioned sealing materials, this sealing material is readily putrescible and the waterproofing properties and the structural life are still unsatisfactory.

As mentioned above, it is clearly desired in the art that the sealing compositions or materials capable of easily repairing and reinforcing civil and architectural structures and having an excellent water resistance, structural life, mechanical strength and a high adhesion force be developed. According to the present invention, the desired sealing compositions or materials can be provided by using the above-mentioned aqueous polymer emulsion as an essential component in the compositions.

The present sealing compositions or materials optionally contain, as a uniform mixture, in additive to the above-mentioned aqueous emulsions, solvents, fillers, grout materials, and known sealing materials such as hydraulic inorganic materials or hydraulic polymer substances (e.g., hydrophilic urethane prepolymer).

Although there are no critical limitations to the concentration of the aqueous polymer emulsion in the composition, the aqueous polymer emulsion is preferably included in a concentration of 1% to 60% by weight, preferably 5% to 40% by weight, in terms of a solid content, in the total amount of the composition.

The present sealing compositions or materials can be advantageously used as a sealing material for preventing possible water leakage at portions of civil and architectural structures as disclosed in JP-A-No. 53-98122, and as a waterproof roofing material.

Since the present sealing composition or material contains the above-mentioned aqueous polymer emulsion, the sealing composition can be easily applied and the resultant hardened resin layer has an excellent water resistance, service durability, mechanical strength, and adhesion strength. Accordingly, the portions at which water leakage may occur can be satisfactorily repaired or reinforced and, therefore, the practical value thereof is extremely high.

Binder Compositions for Non-Woven Fabrics

The above-mentioned aqueous polymer latex emulsion according to the present invention can be advantageously used in binder compositions for non-woven fabrics.

Various aqueous emulsions or latexes of, for example, polyacrylates, polyvinyl acetate, polyethylenepolyvinyl acetate, polyvinyl chloride, polyvinylidene chloride, polyacrylonitrile-polybutadiene, and polystyrene-polybutadiene are used as a binder for non-woven fabrics such as clothes, industrial raw materials, and hygienic materials. The binder is used for adhering and immobilizing the fibers by forming a film at the intersection of fibers.

However, conventional aqueous emulsions or latex binders all have relatively poor transparency, mechanical strength, water resistance, solvent resistance and other properties and, therefore, the resultant non-woven fabrics obtained therefrom do not have sufficient luster, water resistance, solvent resistance, washing resistance, and cleaning resistance. Various attempts have been made to solve these disadvantages. For example, urea resins, melamine resins or phenol resins are included in conventional aqueous emulsions and are impregnated in the non-woven fabrics, followed by heat treating. However, this method causes the generation of formaldehyde during processing, which in turn pollutes the working environment, since the above-mentioned thermosetting resins contain a relatively large amount of free formaldehyde. Furthermore, when the formaldehyde remains in the resultant non-woven fabrics, the non-woven fabrics are not preferable from the viewpoints of health and hygiene and, since the resultant non-woven fabrics have a poor transparency and mechanical strength, the visual appearance of non-woven fabrics is impaired, the non-woven fabrics become too hard, and the natural feel of the fabric is impaired. Furthermore, although non-woven binders containing isocyanate compounds are also proposed, the resultant fabrics tend to become yellowed and have a poor weathering resistance.

As mentioned above, it is clearly desired in the art that the binder compositions for non-woven fabrics capable of providing an excellent mechanical strength, water resistance, and solvent resistance, and also capable of improving the working environment, without impairing the good visual appearance of non-woven fabrics and remaining formaldehyde in the resultant fabrics are developed. According to the present invention, the desired binder compositions for non-woven fabrics can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 0.5% to 50% by weight, preferably 1% to 40% by weight, in terms of a solid content, in the total amount of the composition.

The present binder composition can optionally contain, in addition to the above-mentioned aqueous emulsion, any conventional ingredients usually used in the conventional binder compositions. Examples of such ingredients are antistatic agents, softening agents, antibromic agents, antibacterial agents, fungistats, mothproofing agents, antiyellowing agents, perspiration absorbing agents, water absorbing agents, fire retardants, and water repellents.

The non-woven fabrics can be produced using the present binder composition in any conventional manner. For example, fibers such as rayon fibers, cellulose fibers, polyamide fibers, glass fibers, vinyl resin fibers are brought into contact with the present binder compositions by, for example, a dipping, print, spray, and powder method.

Since the present binder composition contains the above-mentioned aqueous polymer emulsion, the film forming properties are excellent and the coating films having a good transparency, water resistance, solvent resistance, and mechanical strength can be formed at the intersection of the fibers. Thus, the present binder composition can provide an improved visual appearance, mechanical strength, water resistance, and solvent resistance to the resultant non-woven fabrics. Furthermore, since the present binder composition is non-solvent, the binder composition have an excellent in safety and are non-pollutive.

Accordingly, the present binder composition can be advantageously applied to non-woven core materials for clothes, non-woven industrial material (e.g., interiors automobiles, carpets for vehicles, filters, sheets for civil industries, roofing, agricultural materials, paper, and felt) and non-woven fabrics for hygienic, medical, and home living use.

Fiber Processing or Working Compositions

The above-mentioned aqueous polymer latex emulsion according to the present invention can be advantageously used in fiber processing (or working) composition.

Various aqueous polymer emulsions or latexes, as used in the above-mentioned binder compositions for non-woven fabrics, are also used as a fiber processing or working compositions. However, as mentioned in the binder compositions for non-woven fabrics, it is desired in the art that the fiber processing compositions capable of providing an excellent mechanical strength, water resistance, and solvent resistance and capable of improving the working environment, without impairing the visual appearance of non-woven fabrics and remaining formaldehyde in the resultant fabrics, be developed. According to the present invention, the desired fiber processing or working compositions can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 0.5% to 50% by weight, preferably 1% to 40% by weight, in terms of a solid content, in the total amount of the composition.

The present fiber processing or working composition can optionally contain, in addition to the abovementioned aqueous polymer emulsion, any conventional ingredients usually used in the conventional fiber processing compositions. Examples of such ingredients are antistatic agents, softening agents, antibromic agents, antibacterial agents, fungistats, mothproofing agents, antiyellowing agents, perspiration absorbing agents, water absorbing agents, fine retardants, and water repellents.

The present fiber processing agents can be advantageously applied to textile products such as trousers, slacks, and skirts for providing water resistance and creasing resistance, without impairing the visual appearance of the textile products. Furthermore, folding or creasing of the textile products (e.g., trousers and slacks) having an appropriate amount of the present fiber processing composition applied thereto can be effected by an iron or a trousers-press.

Since the present fiber processing or working composition contains the above-mentioned aqueous polymer emulsion, the film forming properties are excellent and the coating films having good transparency, water resistance, and mechanical strength can be formed at the intersection of fibers, the desired processing can be carried out as mentioned above. In addition, according to the present invention, stainproof properties, crease resistance, stretchability, shrink resistance, melt resistance, and pill resistance can be provided. Furthermore, since the present fiber processing composition is non-solvent, the present composition has an excellent safety factor and is non-pollutive.

Reinforcing Compositions for Optical Transmitting Glass Fiber

The above-mentioned aqueous polymer latex emulsion according to the present invention can be advantageously used in reinforcing compositions for optical transmitting glass fiber.

As is known in the art, optical glass fibers capable of transferring incident light from the light receiving end to the light emission end, and of emitting the light therefrom, are used as the optical transmitting media for image, illumination light, and laser transmitting. These optical glass fibers are noted in the art because of their long distance, low transmitting loss, thin diameter, light weight, and non-induction properties.

Various attempts have been made to protect and reinforce the optical glass fibers. For example, thermoplastic resins (e.g., nylon, polyethylene, polyvinyl chloride) or the aqueous emulsions thereof are used for coating a film on the outer surface of the glass fiber. However, when the above-mentioned thermoplastic resins (e.g., nylon) are coated, the glass fiber is bent and broken to cause unpreferable light leakage, since the glass fiber cannot follow the high plastic deformation of the coated film. Furthermore, the optical glass fiber coated with a conventional aqueous emulsion has a poor water resistance and insufficient mechanical strength and, therefore, the optical glass fiber requires a strong protecting layer, especially at the connecting portions or branched light transmitting portion, and particularly when the optical glass fiber is installed underground or at the bottom of the sea.

As mentioned above, it is clearly desired in the art that a reinforced optical glass fiber having an excellent water resistance and mechanical strength be developed. According to the present invention, the desired reinforcing compositions for optical glass fiber can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 5% to 50% by weight, preferably 10% to 40% by weight, in terms of a solid content, in the total amount of the composition.

The present reinforcing composition may optionally contain, in addition to the above-mentioned aqueous polymer emulsion, any conventional ingredients usable in the similar compositions. Examples of such ingredients are coloring pigments, antioxidants, UV absorbers, carbon black, and antistatic agents.

The reinforced glass fiber for optical transmitting can be prepared as follows. For example, the above-mentioned reinforcing compositions according to the present invention can be coated by a known coating apparatus (e.g., dipping type coating), on the outer surface of glass fiber obtained by, for example, a melt-spinning method, followed by drying the coated film. There are no critical limitations to the diameter of the glass fiber, but preferably the diameter is approximately 50 to 5000 μm, more preferably 100 to 3000 μm. On the other hand, the thickness of the coated film is preferably 0.1 to 1000 μm, more preferably 0.5 to 500 μm.

As mentioned above, according to the present invention, the reinforcing tough protective layer having an excellent water resistance, mechanical strength, and the other characteristics can be advantageously applied to the optical glass fibers and, therefore, the occurrence of the unpreferable breaking of and damage to the glass fiber can be effectively obviated. Thus, extremely practically high values can be obtained in the preparation of the optical glass fibers.

Reinforcing Compositions for Hydraulic Inorganic Molded Articles

The above-mentioned aqueous polymer latex emulsion according to the present invention can be advantageously used in the reinforcing compositions for hydraulic inorganic molded articles.

Reinforcing compositions containing monomers, polymerization initiators, crosslinking agents, and coupling agents are used for reinforcing molded and hardened products of hydraulic inorganic materials such as mortar, concrete, and plaster. These reinforcing composition are, for example, radiation polymerized or heat polymerized, after impregnated to the hydraulic products. However, since monomers usually have high vapor pressure at an ambient condition, extrusive apparatus is required to prevent a pollution of the working environment.

Various attempts have been made to solve the above-mentioned problems. For example, aqueous polymer emulsions such as, SBR latex and aqueous emulsions of polyacrylates or ethylene-vinyl acetate copolymer are impregnated from the surface of the hardened hydraulic inorganic materials, followed by drying and solidifying. However, the resultant products still have the problems of a poor or unsatisfactory water resistance, solvent resistance, acid resistance, alkali resistance, and mechanical resistance. This limits the application fields of the hydraulic materials or causes the problems of a shortened structural life, an unpreferable generation of cracks, and finally, a breakage of the products.

As mentioned above, it is clearly desired in the art that molded products of the reinforced hydraulic inorganic material having an excellent water resistance, solvent resistance, acid resistance, alkali resistance, and mechanical strength be developed. According to the present invention, the desired reinforced molded products of hydraulic inorganic material can be provided by using the above-mentioned aqueous polymer emulsion as an essential component in the compositions.

Although there are no critical limitations to the concentration of the aqueous polymer emulsion in the reinforcing composition, the aqueous polymer emulsion is preferably included in a concentration of 0.5% to 50% by weight, preferably 1% to 40% by weight, in terms of a solid content, in the total amount of the composition.

The reinforcing composition according to the present invention may optionally contain, in addition to the above-mentioned aqueous polymer emulsion, any conventional ingredients usable in the similar compositions. Examples of such ingredients are rust preventive agents, corrosion preventive agents, antibacterial agents, mothproofing agents, coloring agents, fillers, and pigments.

The present reinforcing compositions can reinforce the molded products of hydraulic inorganic materials such as the molded products of mortar, concrete, and plaster (e.g., mortar boards, piles, poles, or fume pipes) by impregnating the molded products with the present reinforcing compositions, followed by drying.

Since the above-mentioned aqueous polymer emulsions are used in the present reinforcing compositions, the polymers having excellent film forming properties as well as a good water resistance, solvent resistance, alkali resistance, and mechanical strength can be uniformly and stably impregnated in the surface and inside of hardened hydraulic inorganic products. Thus, the present reinforcing compositions can be used in the various products of mortar, concrete, and plaster as well as fume pipes for domestic or industrial waste water, and for U-shaped grooves. Furthermore, since the present reinforcing compositions are not solvent, the use of the present reinforcing composition is also advantageous from the viewpoints of safety and pollution.

Compositions for Forming Electroconductive Films

The above-mentioned aqueous polymer latex emulsion according to the present invention can be advantageously used in the compositions for forming electroconductive films.

Various electroconductive materials are used in, for example, electronic parts to prevent problems such as malfunctions and erroneous operation caused by static electricity. Of these materials, laminated type electroconductive materials comprising a insulating base having an electroconductive layer laminated thereon are preferably utilized, from the economic and operational viewpoints. These electroconductive layers are generally prepared from electroconductive film forming materials containing, as a binder, resins dissolved in solvents and metals, metallic compounds, carbon particles, electroconductive polymer such as semiconductive surfactants, and electroconductive fillers dispersed in the resin solution. However, the use of the above-mentioned organic solvent type film forming materials is not preferable from the viewpoints of fire, environmental pollution, and hygiene. Furthermore, the dispersibility of electroconductive materials such as metallic powder is poor.

Various attempts have been made to obviate the above-mentioned problems. For example, the use of aqueous emulsion type electroconductive film forming materials has been proposed in, for example, JP-A-Nos. 61-81401, 60-156769, 59-219304, 58-187467, and 55-133455. Although these aqueous materials can obviate the above-mentioned problems and although the dispersibility of the electroconductive substance (e.g., metal powder) and the abrasion resistance and heat resistance of the electroconductive layer are somewhat improved, the weathering resistance, water resistance, and solvent resistance are unsatisfactory.

As mentioned above, it is desired in the art that electroconductive film forming materials capable of forming electroconductive films having good weathering resistance, water resistance, and solvent resistance, and having an excellent luster, be developed. According to the present invention, the desired compositions for forming electroconductive film can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 5% to 40% by weight, preferably 7% to 30% by weight, in terms of a solid content, in the total amount of the composition.

The electroconductive substances contained in the present electroconductive film forming materials are those conventionally used. Examples of such electroconductive materials are metallic powder particles of, for example, nickel, copper, iron, aluminum, tin, antimony, zinc, and oxides thereof, diphosphonic acid derivatives such as organic or inorganic salts of 1-hydroxyethane-1,1-diphosphonic acid, carbon black, polymer compounds such as electroconductive fillers. Although there are no critical limitations to the amount of the electroconductive substance in the composition, the electroconductive substance is preferably 10% to 90% by weight, more preferably 15% to 80% by weight, in terms of a solid content, in the total amount of the composition.

The present compositions for forming electroconductive films may optionally contain any conventional ingredients such as resins, anti-aging agents, UV absorbers, flame retardants, reinforcing agents, and lubricants.

According to the present invention, the laminated type electroconductive materials can be prepared by coating the above-mentioned compositions on an insulation substrate such as fibers, woven fabrics, non-woven fabrics, synthetic resins, synthetic resin composites, wood products, cement mortar, and cement concrete, by any conventional coating machine such as a roll coater, knife coater, and a flow coater.

Film Coating Compositions for Coated Paper

The above-mentioned aqueous polymer latex emulsion according to the present invention can be advantageously used in the film coating compositions for coated paper.

As film coating compositions for coated paper, mixture or aqueous dispersions of water-soluble polymers (e.g., starch, casein, carboxymethyl cellulose, hydroxyethyl cellulose, polyvinyl alcohol, sodium polyacrylate, and polyacrylic amide) and aqueous emulsions (e.g., polyacrylates, polyvinyl acetate, polyvinylidene chloride, polyacrylonitrile-polybutadiene, and polystyrene-polybutadiene) are conventionally used. However, these mixtures or dispersions are disadvantageous in that the storage stability (i.e., separation into two phases) when stored for a long period is poor and the coated films obtained are fragile and, therefore, the films are easily damaged. Furthermore, since the coated films have a poor water resistance and solvent resistance, picking or blistering is generated in the coated layer when used as a binder in the coated layer. To solve these problems, epoxy resin, urea resin, melamine resin, or phenol resin is added to the above-mentioned mixtures and dispersions. These resins are subjected to a condensation reaction during the drying step after coating, and thus the strength and water resistance of the coated layer are improved. However, this proposal still has problems in that formaldehyde is generated during the drying step to thereby worsen the working environment, the film strength of the coated film is unsatisfactory, and the flexibility is poor.

As mentioned above, it is desired in the art that film coating compositions for coated paper capable of forming a coated film having an excellent water resistance, solvent resistance, and, film strength and good luster, and capable of inhibiting the generation of picking and blistering be developed. According to the present invention, the desired film coating compositions can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 0.5% to 50% by weight, preferably 1% to 40% by weight, in terms of a solid content, in the total amount of the composition.

The present film coating compositions may optionally contain, in addition to the above-mentioned aqueous emulsion, any conventional ingredients. Examples of such ingredients are fillers, pigments, coloring agents, pitch control agents, slim control agents, preservatives, fungistat, antibacterial agents, and antifoam agents.

The present film coating composition can be applied to, for example, heat-sensitive recording paper, laser emission recording paper, pressure-sensitive recording paper, and ink jet recording paper, especially preferably to leuco dye type heat-sensitive recording paper and ink jet recording paper.

For example, heat-sensitive recording paper can be prepared using, as a heat-sensitive recording layer, leuco dyes, developers, and coloring accelerators and white pigments. Examples of leuco dyes are black coloring leuco dyes such as 3-N-methyl-N-cyclohexylamino-6-methyl-7-phenylamino fluorane, 3-N,N-diethyl- amino-0-chlorophenylamino fluorane, 3-N,N-diethylamino-6-methyl-7,7-phenylamino fluorane, and 3-diethylamino-6-methyl-6-aniline fluorane, and blue coloring leuco dyes such as crystal violet.

The developers include, for example, electron accepter substances capable of melting upon heating to react with the leuco dye to thereby convert the dye to the colored form. Examples of such developers are 4,4'-diisopropylidene diphenol (bisphenol A), p-hydroxybenzoic acid benzylcarboxylic acid, calcium 2-hydroxy-3-naphthoate, and calcium 1-bromo-2-hydroxy-3-naphthoate.

The coloring accelerators include, for example, higher fatty acid amides, such as lauryl amide, hardened fatty acid amide, behenic amide. The fillers include, for example, calcium carbonate, talc, titanium dioxide, clay, and kaolin. These can be used alone or in any mixture thereof.

According to the present invention, the coated paper can be prepared, for example, by applying or coating the present film coating composition to the surface of, for example, high quality paper by any conventional coating means such as a wire bar and roll coater, followed by drying.

Since the present film coating composition contains the above-mentioned aqueous polymer emulsion, the coated film having good film forming properties, luster, water resistance, solvent resistance, and mechanical strength can be uniformly coated on the surface of paper. In addition, according to the present invention, the generation of picking and blistering is effectively prevented and the coated paper having excellent printing properties and luster can be advantageously obtained. Furthermore, since the present film coating compositions are non-solvent, and do not generate harmful substances, an excellent safety factor and pollution-free environment can be attained.

Additive Compositions for Paper Marking

The above-mentioned aqueous polymer latex emulsion according to the present invention can be advantageously used in the additive compositions for paper making.

As the additive agents for paper making, water-soluble polymers (e.g., starch, carboxymethyl cellulose, hydroxymethyl cellulose, polyvinyl alcohol, sodium polyacrylate, and polyacrylic amide) and aqueous polymer emulsions (or latexes) (e.g., polyvinyl chloride, polyacrylonitrile-polybutadiene, polystyrene-polybutadiene) are used. Of these polymer type additive agents, the quaternarized products of copolymers of styrene and dimethylaminoethyl methacrylate are known as those which afford sizing effects and paper force enhancing effects to the finished paper when they are added to raw pulp slurries for paper making. However, the use of these quaternazrized products as an inner additive for paper making results in the finished paper having a high wet strength and, therefore, the disintegratability of the lost paper becomes poor. As a result, a large amount of lost paper generated during paper making processes is difficult to reuse by adding to raw pulp slurries. Accordingly, it has been proposed in JP-A-No. 60-167994 to use terpolymers such as styrenedimethylaminopropyl acrylamide-acryl amide as an inner additive for paper making, which has good disintegratability of the lost paper and affords both sizing effects and paper force enhancing effects. However, since these aqueous dispersions having a good storage stability contain organic solvents, the working environmental conditions are worsened and the films formed from the above-mentioned terpolymer have a poor transparency and mechanical strength and, therefore, the sizing effects and the paper force enforcing effects are still unsatisfactory. Furthermore, since the film forming properties at the intersection of pulps (or fibers) are not good, a sufficient drying at a high temperature is required and the energy costs become unpreferably high.

As mentioned above, it is desired in the art that additive compositions for paper making capable of remarkably increasing the sizing effects, the paper force enhancing effects, and the disintegratability of lost paper, without using organic solvents, be developed. According to the present invention, the desired additive compositions for paper making can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 0.01% to 30% by weight, preferably 0.05% to 10% by weight, in terms of a solid content, in the total amount of the composition.

The present additive composition may optionally contain any conventional ingredients used in the art. Examples of such ingredients are disintegrating accelerators, fillers, pigments, coloring agents, pitch control agents, slim control agents, preservatives, fungistats, antifoam agents, and water filtration and yield increasing agents.

Since the present additive compositions contain the above-mentioned aqueous polymer emulsions, polymer films having good film formability, transparency, water resistance, solvent resistance, and mechanical strength can be uniformly formed within and on the surface of the finished paper. Thus, according to the present invention, paper having good sizing effects, paper force enchancing effects, and the integratability of lost paper can be obtained without danger or pollution. Furthermore, according to the present invention, the formation of films at the intersections of pulp fibers is facilitated. Accordingly, the present additive composition can be advantageously used as the inside additive in the production of printing paper such as newspaper and offset paper and coated paper such as thermo-sensitive recording paper, pressure-sensitive recording paper, layer coloring recording paper, ink jet recording paper and high quality coated paper.

Resin Compositions for Toner

The above-mentioned aqueous polymer latex emulsion according to the present invention can be advantageously used in the resin compositions for toner.

Toners for developing electric or magnetic latent images are usually prepared by mixing, in the molten condition, thermoplastic resins, coloring agents, and optionally added auxiliary agents, followed by pulverizing into minute powder particles having a size of, for example, 1 to 20 μm. The essential component, thermoplastic resins, conventionally used include, for example, synthetic resins such as polystyrene, polymethacrylates, polyvinyl acetate, polyvinyl chloride, and polyamides and natural resin such as resin and ester gum. However, these conventional toners can result in good fixed images only when a high pressure, e.g., about 30 $kg/cm^2$, is applied to the pressure rolls and, therefore, various problems such as curling of the image support, decrease in the luster, and the generation of wrinkles occur. To solve these troubles, it is proposed in JP-A-No. 60-104957 to use multi-structure type capsule toner composed of core materials and shell materials. However, since this capsule toner uses a large amount of a surfactant for preparing a stable G/0 and G/0 and W/0 mixed emulsion, the surfactant remains on the surface of the toner particles and agglomerated particles are formed by blocking due to the hygroscopic properties of the surfactant. Accordingly, when these toners are used in, for example, a high speed copying machine, fogging of fixed images occurs on normal paper and, therefore, the resulting product is not good. Furthermore, when the image is brought into contact with water, the image is damaged because the water resistance is poor. Thus, it is necessary to remove the surfactant from the surface of the toner particles.

Furthermore, since the resin components for the capsule toners are two-dimensional structure, the image is damaged due to the poor solvent resistance when the image is brought into contact with solvents such as benzene, and due to the low mechanical strength when the image is rubbed.

As mentioned above, it is desired in the art that resins for toners having an excellent water resistance, solvent resistance, and abrasion resistance, offset preventive properties, and low pressure fixability of the image and capable of developing highly resolved clear image be provided. According to the present invention, the desired resins for toners can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 3% to 99% by weight, preferably 5% to 97% by weight, in terms of a solid content, in the total amount of the composition.

The aqueous polymer compositions for the toners may further contain coloring agents such as pigments and dyes. Examples of such pigments and dyes are carbon black, iron black, phthalocyanine blue, ultramarine blue, quinacridone, benzidine yellow. Furthermore, flow improving agents such as alumina and silica also can be added.

When magnetic toners are prepared, ferromagnetic metal powder such as iron, cobalt, and nickel or alloys or metallic compounds such as magnetite, hematite, and ferrite, i.e., those capable of being magnetized in magnetic fields, are incorporated into the toners. These magnetic powder is usually included in an amount of 15% to 70% by weight, preferably 20 to 50% by weight based on the weight of the toner.

The toner resin can be prepared by adding dyes, pigments and/or magnetic powder to the present aqueous polymer emulsions, followed by mixing. The resultant mixture can be powdered by, for example, a conventional spray drying method. Alternatively, the aqueous polymer emulsion is first powdered and, then, the resultant powder is uniformly mixed in a molten state with dyes, pigments, and/or magnetic powder, followed by pulverizing or granulating in a conventional pulverizer (e.g., hammer mill, jet mill). The particle size of the toners thus obtained is usually 1 to 50 μm, preferably 5 to 20 μm.

Since the present resin for toner contain the above-mentioned aqueous polymer emulsions, the water resistance, solvent resistance, and the mechanical strength (e.g., abrasion resistance) are excellent. Accordingly, the toners having the desired characteristics can be obtained. Furthermore, since the present aqueous polymer emulsions are non-solvent system, the harmful substances are not generated in the production step and, therefore, the working environment can be kept safe and pollution-free.

Photosensitive Compositions

The above-mentioned aqueous polymer latex emulsion according to the present invention can be advantageously used in the photosensitive compositions.

Aqueous polymer emulsions are conventionally used, as a mordant, antistatic agent, coloring agent, UV absorbing agent, adhesion improving agent, or film quality improving agent, in various layers of photosensitive materials. Examples of such layers are subbing layers, intermediate layers, dye image providing substance containing layers, scavenger layers, protective layers, auxiliary layers, backing layers, image receiving layers, timing layers, barrier layers, release layers, antistatic layers, and antihalation layers. Furthermore, aqueous polymer emulsions are used as a dispersion medium for loading or adsorbing (or a binder for immobilizing) various photographic additives. Examples of such additives are couplers, UV absorbers, antioxidants, brighteners, developing inhibitors, and dye image providing substances.

When aqueous polymer emulsions are included in photosensitve materials, the aqueous polymer emulsions are added to coating compositions and photosensitive materials or film units are prepared therefrom. Thus, the surface luster, the dimension stability, and the flexibility are improved. However, since surfactants remain in conventional aqueous polymer emulsions, the photographic performances are adversely affected. Thus, the aqueous emulsions must be purified by, for example, dialysis, in exchange methods, membrane filtration or electric dialysis such as synchrofilter, fiber. Furthermore, the aqueous emulsions obtained from the above-mentioned purification treatment still have problems such as a poor dispersion stability and the formation of coarse particles due to agglomeration or unifying, and thus the photographic performances such as the surface luster, dimension stability, and flexibility are impaired.

As mentioned above, it is desired in the art that photosensitive compositions having good photographic performances and capable of forming photosensitive layers having excellent luster, water resistance, solvent resistance, and mechanical strength be provided. According to the present invention, the desired photosensitve compositions can be provided by using the above-mentioned aqueous polymer emulsion as an essential component in the compositions.

Although there are no critical limitations to the concentration of the aqueous polymer emulsion in the composition, the aqueous polymer emulsion is preferably included in a concentration of 0.5% to 99% by weight, preferably 1% to 95% by weight, in terms of a solid content, in the total amount of the composition.

According to the present invention, the desired photosensitive material can be prepared as follows. For example, the aqueous polymer emulsions obtained as mentioned heretobefore are mixed with photosensitve silver halides such as silver bromide, silver iodide, silver chloride, silver bromochloride, silver iodochloride, silver iodobramochloride, and gelatin and, further optionally, the other coloring agents, UV absorbers, fluorescent brighteners, antifogging agents, stabilizers, and dispersants to prepare emulsions. The resultant emulsions are coated by, for example, an extrusion coating method, on supports such as paper base supports (e.g., karyta coat paper, document paper, resin coated paper), natural fiber ester supports (e.g., nitrocellulse and diacetate cellulose), and synthetic polymer film supports (e.g., polyester, polycarbonate, polystyrene).

Since the present photographic materials contain the above-mentioned aqueous polymer emulsions, the luster of the photosensitive layer surface is excellent and layer separation from the supports does not occur. In addition, an excellent water resistance, solvent resistance, mechanical strength and photographic characteristics can be obtained. Accordingly, the present photographic compositions can be advantageously used in the subbing layers, intermediate layers, dye image providing substance containing layers, scavenger layers, protective layers, auxiliary layers, backing layers, image receiving layers, timing layers, barrier layers, release layers, antistatic layers, and antihalation layers.

EXAMPLES

The present invention will now be further illustrated by, but is by no means limited to, the following Examples and Comparative Examples, wherein all parts and percentages are expressed on a weight basis unless otherwise noted. In the following Examples and Comparative Examples, various physical properties and film characteristics are evaluated as follows:

Evaluation of Physical Properties

Average particle size: the average particle size was measured by Coulter Submicron Particle Analyzer (Coulter Model N4 type, produced by Coulter Electronics Co., U.S.A.).

Crosslinkability: 30 g of polymer latex prepared to a solid content of 40 wt. % was cast uniformly on a glass plate 12 cm×14 cm and dried in air at 25° C. The film thus obtained was cut to 2 cm×4 cm, immersed in a laboratory dish filled with benzene at 20° C. for 48 hours, and the evaluation was based on the degree of swelling and solubility of the film, as follows.

o: equal to the film area before immersion in benzene (2 cm×4 cm) or slightly swollen.

Δ: high degree of swelling, film shape impaired.

x: film dissolved in benzene and became a homogeneous solution.

Film forming property: film was formed by drying in air at 25° C., and the state of the formed film was evaluated by visual observation.

o: smooth and uniform film formed.

Δ: film with streaks in shape of a network formed.

x: no film formed.

Glass transition temperature (Tg): Tg was measured by use of a thermal analysis measurement device (SSC 5000 DSC 200). The calculated value Tg was calculated according to the weight fraction method (as described above).

Evaluation of Film Characteristics

A 30 parts amount of the above polymer latex controlled to a solid content of 20% was cast uniformly on a glass plate 12 cm×14 cm, dried in air at 25° C. to form a film, and the film characteristics were evaluated. The film characteristics were evaluated according to the following standards.

Transparency: haze value of the film was measured according to JIS K 6714 by an integration system light transmittance measurement device.

Water resistance: film was cut to 2 cm×4 cm, immersed in a laboratory filled with water at 20° C., and the time until the film whitened was determined by visual observation.

o: 10 days or longer.

Δ: 2 days or longer but less than 10 days.

x: less than 2 days.

Tackiness: film surface was touched with a finger, and the sticky feeling was evaluated according to the following standards.

o: no sticky feeling.

Δ: slightly sticky.

x: sticky.

Elongation and strength: a dumbbell was prepared, and the tensile strength, elongation at break, and 50%, 100%, and 200% modulus strengths were measured according to JIS K-6781.

EXAMPLE 1-1

A reaction vessel made of a glass equipped with a thermometer, a stirrer, a reflux condenser, a nitrogen introducing pipe, and a dropping funnel was charged with 8 parts of an emulsifier as shown in Table 1-1 and 150 parts by weight of water to prepare a solution and the system was internally replaced with nitrogen gas. Separately, 156 parts of a mixture of unsaturated monomers comprising 75 parts of ethyl acrylate, 75 parts of methyl methacrylate, 4.5 parts of N-methylolacrylamide and 1.5 parts of water were prepared, and 15 parts of the mixture were added to the above reaction vessel and emulsified at 40° C. for 30 minutes. Then, the temperature of the mixture was raised to 60° C. and a solution of a polymerization initiator 2,2'-azobis(N,N'-dimethyleneisobutylamidine) hydrochloride dissolved in 48.5 parts by weight of water to $9.0\times10^{-3}$ mole/liter-aqueous phase was added to the above reaction vessel, followed immediately by a continuous addition of the remainder of the unsaturated monomers to the reaction vessel over 30 minutes to carry out polymerization at 60° C. After completion of the dropwise addition of the unsaturated monomers, the mixture was subjected to aging at 60° C. for 60 minutes.

The properties of the polymer latex obtained above and the characteristics of the formed film are shown in Table 1-1.

The samples Nos. 1 to 4 are examples of the present invention, and it can be understood that the polymer latex of the present invention comprising ultra-fine particles having crosslinked structures within particles and (or) between particles has an excellent transparency, water resistance, and mechanical strength of the film, but a lower glass transition temperature than the polymer latex obtained according to the method of the prior art, and therefore, is a polymer latex having an excellent film forming property.

Also, according to JIS K-6781, from the polymer lattices of Samples No. 1 (the present invention) and Sample No. 5 (Comparative Example), dumbbells were prepared and stress-strain tests were conducted. The results are shown in the drawing. As is apparent from the drawing, the product of the present invention forms a film which is hard but extremely tough, compared with that of the Comparative Example.

TABLE 1-1

| Sample No. | | Emulsifier | Polymer latex: Properties: Average particle size (mm) | Cross-linkability | Film forming property | Glass transition temperature Tg (°C.) Calcd. | Found | Film characteristics: Transparency | Water resistance | Tackiness | Elongation (%) | Tensile strength: Strength (kg/cm²) Break | Modulus 50% | 100% |
|---|---|---|---|---|---|---|---|---|---|---|---|---|---|---|
| Example | 1 | Glycine chloride betaine ester of polyoxyethylene octylphenyl ether (EOP = 3) 4.0 parts by weight Dimethacrylate of polyoxypropylene polyoxyethylene glycol (POP = 3, EOP = 12) 4.0 parts by wt. | 55 | o | o | 30 | 23 | 2.3 | o | o | 200 | 165 | 62 | 85 |
| | 2 | Glycine chloride-2-heptyl undecyl ester 4.0 parts by wt. Diacrylate of polyoxypropylene polyoxyethylene-Biphenol A (POP = 2, EOP = 9) 4.0 parts by wt. | 70 | o | o | 30 | 23 | 3.1 | o | o | 180 | 140 | 58 | 82 |
| | 3 | Glycine chloride betaine ester of polyoxypropylene polyoxyethylene-lauryl ether (POP = 2, EOP = 2) 5.0 parts by wt. Dimethacrylate of polyoxyethyleneglycol (EOP = 14) 3.0 parts by wt. | 73 | o | o | 30 | 23 | 4.2 | o | o | 215 | 162 | 59 | 76 |
| | 4 | Alanyl chloride ester of polyoxypropylene polyoxyethylene nonylphenyl ether (POP = 1, EOP = 2) 4.0 parts by wt. Tetramethacrylate of polyoxypropylene polyoxyethylene ethylenediamine (POP = 8.3, EOP = 5.7) 4.0 parts by wt. | 45 | o | o | 30 | 22 | 3.2 | o | o | 231 | 188 | 61 | 82 |
| Comparative Example | 5*1 | Bleached Shellac resin 4.0 parts by weight Dimethacrylate of polyoxyalkylenephosphate (New Frontier A-299E) 4.0 parts by weight | 61 | o | Δ | 30 | 30 | 12.4*2<br>— | o*2<br>— | Δ*2<br>— | 85*2<br>— | 65*2<br>— | 26*2<br>— | —<br>*3 |
| | 6*1 | Sodium α-olefinic sulfonate with 16-18 carbon atoms 6.0 parts by weight | 35 | x | x | 30 | 30 | 24.0*2<br>— | o*2<br>— | o*2<br>— | 25*2<br>— | 23*2<br>— | —<br>— | —<br>*3 |
| | 7*1 | N-(1,2-dicarboxyethyl)-N-octadecyl sulfosuccinic monoamide-4Na salt 4.0 parts by weight Dimethacrylate of polyoxyalkylenephosphate | 92 | o | x | 30 | 31 | 8.3*2<br>— | o*2<br>— | o*2<br>— | 67*2<br>— | 39*2<br>— | 33*2<br>— | *3 |

TABLE 1-1-continued

| Sample No. | Emulsifier | Polymer latex: Average particle size (mm) | Properties: Cross-linkability | Properties: Film forming property | Glass transition temperature Tg (°C.): Calcd. | Glass transition temperature Tg (°C.): Found | Film characteristics: Transparency | Water resistance | Tackiness | Elongation (%) | Tensile strength, Strength (kg/cm²): Break | Modulus 50% | Modulus 100% |
|---|---|---|---|---|---|---|---|---|---|---|---|---|---|
| | (New Frontier A-229E) 4.0 parts by weight | | | | | | | | | | | | |

*[1]Polymerization initiator (KPS redox type) Potassium persulfate 3.0 × $10^{-3}$ mole/liter-aqueous phase Sodium thiosulfate 3.0 × $10^{-3}$ mole/liter-aqueous phase Copper sulfate 5.0 × $10^{-5}$ mole/liter-aqueous phase
*[2]Film formation at 35° C.
*[3]Film formation attempted at 25° C., but unmeasurable.

EXAMPLE 1-2

A polymer latex was prepared by emulsion polymerization in the same manner as in Example 1-1 by using 8.0 parts of the emulsifier as shown in Table 1-2, 157 parts of unsaturated monomers comprising 90 parts of ethyl acrylate, 60 parts of methyl methacrylate, 4.5 parts of N-methylolacrylic amide, and 2.5 parts of water, and a solution of polymerization initiators of $3.0\times10^{-3}$ mole/liter-aqueous phase of potassium persulfate, $3.0\times10^{-3}$ mole/liter-aqueous phase of sodium thiosulfate, and $5.0\times10^{-5}$ mole/liter-aqueous phase of copper sulfate dissolved in 47.5 parts of water.

The properties of the polymer latex thus obtained and the characteristics of the film formed by air drying at 20° C. were measured and evaluated similarly as in Example 1-1. The results are shown in Table 1-2. Samples No. 8–11 are Examples of the present invention, and Samples No. 12–14 and 14' are Comparative Examples.

TABLE 1-2

| | | Polymer latex | | | | | | Film characteristics | | | | | | |
|---|---|---|---|---|---|---|---|---|---|---|---|---|---|---|
| | | | Properties | | | | | | | | Tensile strength | | | |
| | | | | | | | | | | | | Strength (kg/cm$^2$) | | |
| | | | | | | | | | | | | | Modulus | |
| Sample No. | | Emulsifier | Average particle size (mm) | Cross-linkability | Film forming property | Glass transition temperature Tg (°C.) Calcd. | Glass transition temperature Tg (°C.) Found | Trans-parency | Water resistance | Tackiness | Elongation | Break | 50% | 100% |
| Example | 8 | 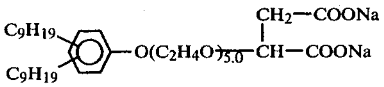 4.0 parts by weight<br>Dimethacrylate of polyoxypropylene polyoxyethylene glycol ($\overline{POP}$ = 3, $\overline{EOP}$ = 12) 4.0 parts by wt. | 79 | o | o | 18 | 13 | 2.7 | o | o | 345 | 82 | 67 | 72 |
| | 9 | 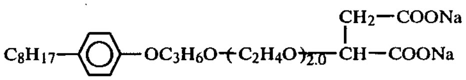<br>Diacryalte of polyoxypropylene polyoxyethylenebisphenol A ether ($\overline{POP}$ = 2,4 $\overline{EOP}$ = 9 4.0 parts by wt. | 43 | o | o | 18 | 14 | 3.0 | o | o | 307 | 70 | 56 | 59 |
| | 10 | 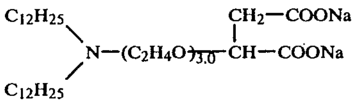 6.0 parts by wet.<br>Dimethacrylate of polyoxyethylene glycol ($\overline{EOP}$ = 14) 2.0 parts by wt. | 57 | o | o | 18 | 12 | 3.2 | o | o | 296 | 67 | 53 | 57 |
| Example | 11 | 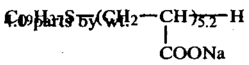 4.0 parts by wt. 6.0 parts by wt.<br>Dimethacrylate of polyoxypropylene polyoxyethylene ($\overline{POP}$ = 8.3 , $\overline{EOP}$ = 5.7) 2.0 parts by wt. | 82 | o | o | 18 | 12 | 2.6 | o | o | 277 | 65 | 49 | 52 |
| Comparative Example | 12 | Bleached Shellac resin<br>Dimethacrylate of polyoxyalkylenephosphate (New Frontier A-229E) 4.0 parts by weight | 31 | o | o | 18 | 18 | 33.7 | o | x | 103 | 26 | 25 | — |
| | 13 | Sodium α-olefinic sulfonate with 16–18 carbon atoms 6.0 parts by weight | 35 | x | o | 18 | 18 | 22.6 | x | o | 132 | 31 | 17 | — |
| | 14 | N-(1,2-dicarboxyethyl)-N-octadecyl sulfosuccinic monoamide-4Na salt 4.0 parts by weight | 86 | o | x | 18 | 20 | 9.4*1 | o*1 | o*1 | 164*1 | 27*1 | 14*1 | — |

TABLE 1-2-continued

| | Polymer latex | | | | | | Film characteristics | | | | | | |
|---|---|---|---|---|---|---|---|---|---|---|---|---|---|
| | | Properties | | | | | | | | | Tensile strength | | |
| | | | | | | | | | | | Strength (kg/cm²) | | |
| | | | | | Glass transition temperature Tg (°C.) | | | | | | | Modulus | |
| Sample No. | Emulsifier | Average particle size (mm) | Cross-linkability | Film forming property | Calcd. | Found | Transparency | Water resistance | Tackiness | Elongation | Break | 50% | 100% |
| 14′ | Dimethacrylate of polyoxyalkylenephosphate (New Frontier A-229E) 4.0 parts by weight<br>Sodium allyllauryl sulfosuccinate 6.0 parts by wt.<br>Dimethacrylate of polyoxyalkylenephosphate (New Frontier A-229E) 2.0 parts by weight | 60 | o | x | 18 | 24 | 25*[1] | o*[1] | o*[1] | 188*[1] | 36*[1] | 22*[1] | — |

*[1] Film formation attempted at 20° C., but only the film formed at 30° C. could be measured.

EXAMPLE 1-3

A polymer latex was prepared by emulsion polymerization in the same manner as in Example 1-1 at the polymerization aging temperature shown in Table 1-3 by using 154.5 parts of a mixture of unsaturated monomers comprising 60 parts of n-butyl acrylate, 90 parts of styrene and 4.5 parts of 2-hydroxyethyl methacrylate and a solution of 8.0 parts of the emulsifiers shown below:

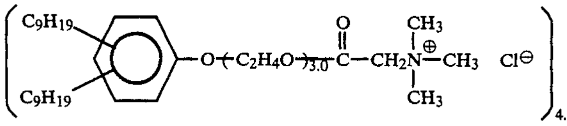

4.0 parts

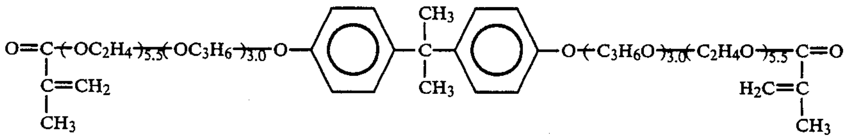

4.0 parts and $9.0\times10^{-3}$ mole/liter-aqueous phase of the polymerization initiator shown in Table 1-3 dissolved in 50parts of water. The properties of the polymer latex obtained and the characteristics of the film obtained by air drying at 20° C. are shown in Table 1-3. Sample Nos. 15–17 and 19–21 are Examples of the present invention, and Sample Nos. 18 and 22 are Comparative Examples.

TABLE 1-3

| | Emulsion polymerization condition | | Latex properties and file characteristcs | | | | | | | |
|---|---|---|---|---|---|---|---|---|---|---|
| Sample | Polymerization initiator | Temperature (°C.) | Average particle size (mm) | Crosslinkability | Film forming Property | Glass transition temperature (Tg:°C.) Calcd. | Glass transition temperature (Tg:°C.) Found | Transparancy | Water resistance | Tackiness |
| 15 | 2,2'-azobis(N,N'-dimethylene-isobutylamidine) hydrochloride | 65 | 63 | o | o | 24 | 18 | o | o | o |
| 16*1 | | 65 | 47 | o | o | " | " | o | o | o |
| 17 | | 75 | 87 | o | o | " | " | o | o | o |
| 18 | | 85 | 163 | o | o | " | " | Δ~x | o | o |
| 19 | 2,2'-azobis(2-amidinopropane) hydrochloride | 60 | 86 | o | o | " | " | o | o | o |
| 20 | | 75 | 58 | o | o | " | " | o | o | o |
| 21*1 | | 75 | 44 | o | o | " | " | o | o | o |
| 22 | | 85 | 149 | o | o | " | " | Δ~x | o | o |

*1: Only 6.0 parts of a betaine ester type emulsifier.

All of the films of Sample Nos. 15, 17, 19, 20 and 21 had a mechanical elongation strength of 150% or more and a tensile strength (strength at break) of 150 kg/cm$^2$ or more, with the glass transition temperatures being all 20° C. or lower in contrast to the calculated value of 24° C., and had a good film forming property.

EXAMPLE 1-4

The following emulsifiers E-1 to E-5 in the parts shown in Table 1-4:

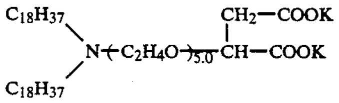

E-1

$C_{12}H_{25}O—C_3H_6O—(C_2H_4O)_{2.0}—COONa$

E-2

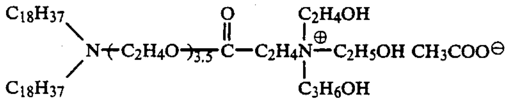

E-3

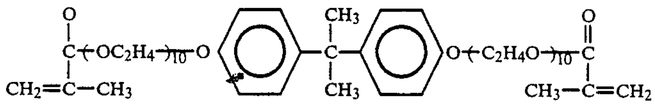

E-4

-continued

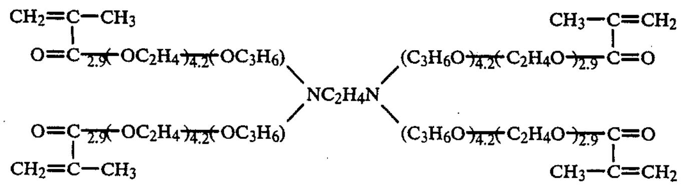

E-5 and separately the unsaturated monomer mixtures M-1 to M-3 shown below:

| | | | |
|---|---|---|---|
| Vinyl acetate: | 84.6 parts | ] | M-1 |
| Ethyl acrylate: | 65.4 parts | | |
| Acrylic acid: | 4.5 parts | | |
| Butyl acrylate: | 58.3 parts | ] | M-2 |
| Methyl methacrylate: | 55.9 parts | | |
| Styrene: | 38.8 parts | | |
| N-methylolacrylamide: | 3.0 parts | | |
| Methacrylonitrile: | 85.0 parts | ] | M-3 |
| Butyl acrylate: | 65.0 parts | | |
| Acrylic acid: | 3.0 parts | | |

were prepared, and emulsion polymerization was carried out in the same manner as in Example 1-2 to prepare a polymer latex. The properties of the polymer latex obtained and the characteristics of the film formed by air drying at 25° C. are shown in Table 4.

Sample Nos. 23-34 are Examples of the present invention. All of the films of Sample Nos. 23-34 had a mechanical elongation strength of 150% or more and a tensile strength (strength at break) of 150 kg/cm$^2$ or more.

glass bottle and left to stand in a thermostat chamber at 25° C. for 6 months and in a thermostat chamber at 45° C. for one week, respectively, and thereafter, the appearance, transmittance, viscosity, and average particle size were measured for an evaluation of the dispersion stability of the polymer latex. The appearance, transmittance, viscosity, and average particle size were measured according to the following methods.

Appearance: evaluated by visual determination at 25° C. according to the following standards.

o: transparent or translucent liquid.

Δ: white turbid liquid.

x: white turbid paste or white turbidity with separation into two layers.

Transmittance: absorbance under light irradiation with a wavelength of 800 nm was determined by a spectrophotometer (Digital Double Beam Spectrophotometer UVIDEC-320 produced by Nippon Bunko Kogyo K.K.) and a light transmittance (%) was calculated therefrom.

Viscosity: viscosity at 25° C. was measured by a Brookfield type viscometer (Brookfield type viscometer produced by Tokyo Keiki K.K.).

TABLE 1-4

| | Emulsifier | | | Latex properties and film characteristics | | | | | | | |
|---|---|---|---|---|---|---|---|---|---|---|---|
| Sample | Kind | Part by weight | Unsaturated monomer | Average Particle size (mm) | Cross-linkability | Film forming Property | Glass transition temperature Tg:°C.) Calcd. | Found | Transparency | Water resistance | Tackiness |
| 23 | E-1 | 4 | M-1 | 73 | o | o | 25 | 20 | o | o | o |
| 24 | E-1 | 4.0 | | | | | | | | | |
| | E-4 | 1.5 | M-1 | 82 | o | o | 25 | 21 | o | o | o |
| 25 | E-2 | 4.0 | | | | | | | | | |
| | E-5 | 3.0 | M-1 | 87 | o | o | 25 | 19 | o | o | o |
| 26*1 | E-3 | 4.0 | M-1 | 64 | o | o | 25 | 21 | o | o | o |
| 27 | E-1 | 5.0 | M-2 | 48 | o | o | 25 | 19 | o | o | o |
| 28 | E-1 | 4.0 | | | | | | | | | |
| | E-4 | 3.0 | M-2 | 62 | o | o | 25 | 21 | o | o | o |
| 29 | E-1 | 6.0 | | | | | | | | | |
| | E-5 | 1.5 | M-2 | 47 | o | o | 25 | 18 | o | o | o |
| 30 | E-2 | 5.0 | | | | | | | | | |
| | E-4 | 3.0 | M-2 | 58 | o | o | 25 | 19 | o | o | o |
| 31*1 | E-3 | 4.0 | | | | | | | | | |
| | E-4 | 4.0 | M-3 | 79 | o | o | 22 | 17 | o | o | o |
| 32 | E-2 | 4 | M-3 | 66 | o | o | 22 | 16 | o | o | o |
| 33 | E-1 | 6.0 | | | | | | | | | |
| | E-4 | 3.0 | M-3 | 52 | o | o | 22 | 14 | o | o | o |
| 34 | E-2 | 6.0 | | | | | | | | | |
| | E-5 | 1.5 | M-3 | 49 | o | o | 22 | 15 | o | o | o |

*1: Polymerization initiator 2,2'-azobis(2-N,N'-amidinopropane) hydrochloride 9.0 × $10^{-3}$ mole/liter-aqueous phase: polymerization aging temperature 70° C.

EXAMPLE 1-5

The dispersion stability of the polymer lattices of the above Sample Nos. 1-34 were evaluated in the following manner. The results are shown in Table 1-5. A dispersion stability test was conducted as described below.

Dispersion stability

A 150 g amount of a polymer latex controlled to a solid component concentration of 40% was sealed in a Average particle size: average particle size was measured by a Coulter Submicron Particle Analyzer (Coluter Model N4 type, produced by Coulter Electronics Inc., U.S.A.).

Figures 2A, 2B:
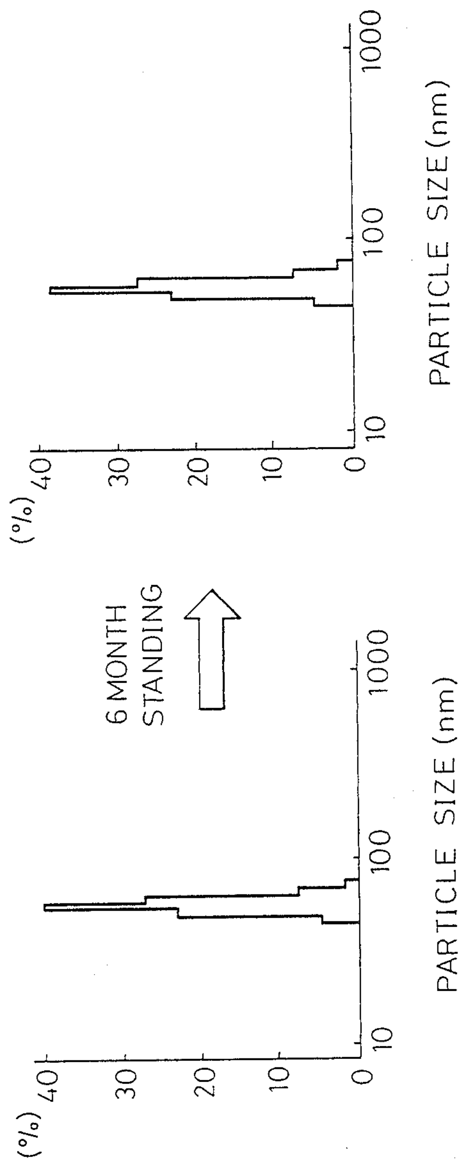
FIG. 2 (A) and FIG. 2 (B) are graphs representing the change in particle size distribution when the polymer lattices of the product of the invention (Sample No. 1) and the product of the Comparative Example (Sample No. 7) were allowed to stand at a temperature of 25° C. for 6 months.
Figure 2D:
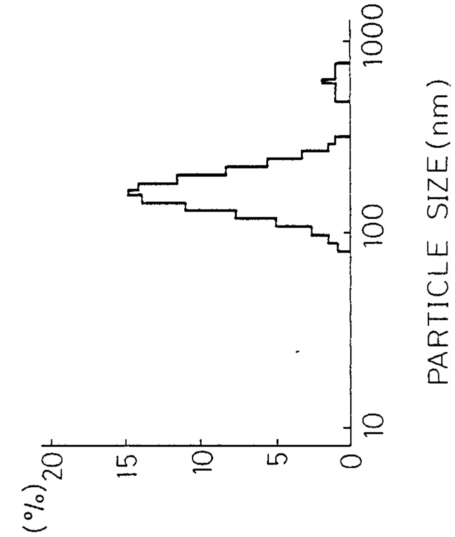
Figure 2C:
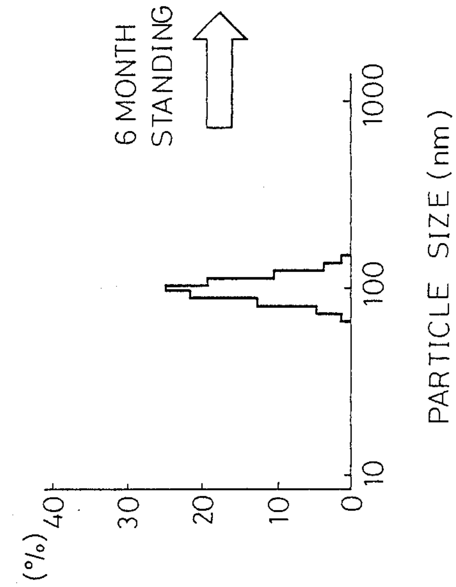

Also, the polymer lattices of Sample Nos. 1-4, 8-11, 15-17, 19-21, and 23-34 provided for the compulsory heating dispersion stability test by stationary standing in a thermostat chamber at 45° C. for one week were formed into films, as in Example 1-1, and the film characteristics were measured as in Example 1-1. Good results similar to those in Examples 1-1, 1-2, 1-3 and 1-4 were obtained for the transparency, water resistance, tackiness, solvent resistance (crosslinkability), and mechanical strength. The change in particle size distribution before and after the stationary stability test is graphically represented as shown in FIG. 2 (A) and FIG. 2 (B).

The Sample No. 7 in Table 1-5 (1) containing many ultra-large particles after a stationary test at 45° C. for one week had a poor dispersibility that was unmeasurable, and therefore, for both sample No. 1 and sample No. 7, the changes in particle size distribution after stationary standing at 25° C. for 6 months were graphically represented for comparison.

TABLE 1-5

| Sample | | Appearance (25° C.) Stationary standing Before | After 25° C. | After 45° C. | Transmittance (%) Stationary standing Before | After 25° C. | After 45° C. | Viscosity (25° C., cP) Stationary standing Before | After 25° C. | After 45° C. | Average particle size*2 (nm, %) Stationary standing Before | After 25° C. | After 45° C. | |
|---|---|---|---|---|---|---|---|---|---|---|---|---|---|---|
| Example | 1 | o | o | o | 47 | 46 | 46 | 61 | 63 | 65 | 55:100% | 57:99.9%, 151:0.1% | 56:100% | (0) |
| | 2 | o | o | o | 40 | 40 | 39 | 323 | 320 | 326 | 70:100% | 70:100% | 70:99.9%, 224:0.1% | (0.1% or less) |
| | 3 | o | o | o | 39 | 37 | 38 | 221 | 224 | 226 | 73:100% | 79:99.9%, 325:0.1% | 74:100% | (0) |
| | 4 | o | o | o | 58 | 57 | 57 | 157 | 158 | 160 | 45:100% | 45:100% | 46:100% | (0) |
| Comparative Ex. | 5 | o | x | x | 42 | 10 or less | 10 or less | 250 | 5000 or more | 5000 or more | 61:100% | —*1 | —*1 | (—) |
| | 7 | o | Δ | x | 24 | 10 or less | 10 or less | 187 | 526 | 5000 or more | 92:100% | 162:95%, 624:5% | —*1 | (—) |
| Example | 8 | o | o | o | 30 | 30 | 29 | 121 | 127 | 130 | 79:100% | 79:100% | 79.4:100% | (0) |
| | 9 | o | o | o | 57 | 55 | 56 | 163 | 174 | 167 | 43:100% | 43:100% | 44:100% | (0) |
| | 10 | o | o | o | 44 | 43 | 43 | 79 | 83 | 84 | 57:100% | 57:100% | 57:99.9%, 182:0.1% | (0.1% or less) |
| | 11 | o | o | o | 28 | 28 | 27 | 236 | 247 | 240 | 82:100% | 89:100% | 88:99.9%, 242:0.1% | (0.1% or less) |
| Comparative Ex. | 12 | o | x | x | 51 | 10 or less | 10 or less | 232 | 5000 or more | 5000 or more | 31:100% | —*1 | —*1 | (—) |
| | 14 | Δ | Δ | x | 19 | 10 or less | 10 or less | 212 | 428 | 5000 or more | 86:100% | 198:95%, 983:5% | —*1 | (—) |
| Example | 15 | o | o | o | 41 | 39 | 39 | 187 | 196 | 192 | 63:100% | 63:100% | 63.2:100% | (0) |
| | 16 | o | o | o | 52 | 52 | 50 | 166 | 180 | 189 | 47:100% | 47:100% | 50.7:100% | (0) |
| | 17 | o | o | o | 27 | 26 | 26 | 96 | 97 | 97 | 87:100% | 190:99.9%, 431:0.1% | 90:99.8%, 288:0.2% | (0.1% or less) |
| Comparative Ex. | 18 | Δ | Δ | Δ | 10 or less | 10 or less | 10 or less | 24 | 30 | 54 | 163:100% | 198:97%, 98.3:3% | 178:96%, 598:4% | (4%) |
| Example | 19 | o | o | o | 29 | 28 | 27 | 172 | 181 | 187 | 86:100% | 86:100% | 89:100% | (0) |
| | 20 | o | o | o | 44 | 43 | 43 | 139 | 143 | 140 | 58:100% | 58:100% | 59:100% | (0) |
| | 21 | o | o | o | 57 | 55 | 55 | 86 | 94 | 95 | 44:100% | 149:99.9%, 168:0.1% | 45:100% | (0) |
| Comparative Ex. | 22 | Δ | Δ | Δ | 10 or less | 10 or less | 10 or less | 53 | 62 | 67 | 149:100% | 190:96%, 1270:4% | 198:96%, 983:4% | (4%) |
| Example | 23 | o | o | o | 38 | 37 | 36 | 180 | 183 | 190 | 73:100% | 76:100% | 77:99.9%, 269:0.1% | (0.1% or less) |
| | 24 | o | o | o | 32 | 31 | 31 | 164 | 172 | 175 | 82:100% | 84:100% | 86:100% | (0) |
| | 25 | o | o | o | 30 | 28 | 27 | 143 | 146 | 154 | 87:100% | 93:100% | 92:99.3%, 450:0.7% | (0.5%) |
| | 26 | o | o | o | 39 | 38 | 39 | 217 | 222 | 219 | 64:100% | 66:100% | 65:100% | (0) |
| | 27 | o | o | o | 54 | 51 | 52 | 239 | 244 | 243 | 48:100% | 51:99.9%, 136:0.1% | 51:100% | (0) |
| | 28 | o | o | o | 42 | 42 | 42 | 118 | 123 | 126 | 62:100% | 62:100% | 65:100% | (0) |
| | 29 | o | o | o | 54 | 53 | 50 | 216 | 224 | 225 | 47:100% | 47:100% | 50:99.8%, 127:0.2% | (0) |
| | 30 | o | o | o | 45 | 41 | 43 | 190 | 197 | 204 | 58:100% | 58:99.9%, 182:0.1% | 58:100% | (0) |
| | 31 | o | o | o | 33 | 32 | 33 | 169 | 178 | 185 | 79:100% | 80:100% | 79:100% | (0) |
| | 32 | o | o | o | 40 | 38 | 37 | 218 | 232 | 226 | 66:100% | 68:100% | 67:100% | (0) |
| | 33 | o | o | o | 47 | 46 | 45 | 243 | 251 | 255 | 52:100% | 53:100% | 53:99.1%, 118:0.1% | (0) |
| | 34 | o | o | o | 52 | 50 | 49 | 269 | 276 | 282 | 49:100% | 50:100% | 50:99.2%, 260:0.8% | (0.5%) |

*1: Unmeasurable because of many ultra-large particles and poor dispersibility.
*2: For those having two-peak distribution, average particle size and distribution are shown for each peak. Ratio of coarse particles of 300 nm or greater is shown in brackets.

EXAMPLE 2-1

The aqueous emulsions obtained in Example 1-1 were used for the evaluation thereof as a coating composition.

A mortar plate, a straight grain birch 5.0 cm×5.0 cm×1.0 cm and a steel plate 20 cm×10 cm×0.4 cm (SS41) were stripped of contaminating components on the surface by washing with an aqueous polyoxyethylene nonylphenyl ether solution (EOP=9.7), washed with water, and the above aqueous emulsion with a solid content of 40% was then applied uniformly as a resin layer 0.2 mm thick, on the surface.

Subsequently, after air drying at 25° C., for the clear coating on the mortar plate, the straight grain birch and the steel plate, the appearance (luster), water resistance, saline water resistance and impact resistance were evaluated by the following standards according to JIS K-5400.

Appearance (luster):

o: coating is transparent and has luster inherent in the material to be coated;

Δ: slightly translucent, slightly inferior in luster inherent in the material to be coated and some streaks in network exist on the coating surface;

x: coating is translucent, without luster inherent in the material to be coated.

Water resistance and saline water resistance:

o: no wrinkles, blisters, cracks and peeling of the coated surface;

Δ: slight wrinkles, blisters, cracks, and peeling of the coated surface;

x: wrinkles, blisters, cracks and peeling of the coated surface.

Impact resistance:

o: no cracking or peeling of the film;

Δ: slight cracking and peeling of the film;

x: cracking and peeling of the film.

The characteristics and performances as the coating composition were performed according to the above methods. The results are shown in Table 2-1. Sample Nos. 1-4 are Examples of the present invention, and it can be understood that they are good coating material compositions with a remarkably excellent water resistance and mechanical strength of the coated film.

Sample Nos. 5-7 are Comparative Examples.

TABLE 2-1

| | | Coating performance | | | | | | | | | | | |
|---|---|---|---|---|---|---|---|---|---|---|---|---|---|
| | | Appearance (luster) | | | Water resistance | | | Saline water resistance | | | Impact resistance | | |
| Sample No. | | Mortar plate | Straight grain birch | Steel plate | Mortar plate | Straight grain birch | Steel plate | Mortar plate | Straight grain birch | Steel plate | Mortar plate | Straight grain birch | Steel plate |
| Exam- | 1 | o | o | o | o | o | o | o | o | o | o | o | o |
| ple | 2 | o | o | o | o | o | o | o | o | o | o | o | o |
| | 3 | o | o | o | o | o | o | o | o | o | o | o | o |
| | 4 | o | o | o | o | o | o | o | o | o | o | o | o |
| Com- | 5 | Δ | Δ | Δ | x | x | Δ | x | x | x | x | x | x*[1] |
| para- | 6 | Δ | Δ | Δ | x | x | x | x | x | x | x | x | x*[1] |
| tive | 7 | o | o | o | Δ | Δ | Δ | x | x | x | x | x | x*[1] |

*[1]: Film forming property unmeasurable, and thus the film formed at 35° was measured.

EXAMPLE 2-2

The properties of the aqueous emulsion obtained in Example 1-2, the characteristics of the film formed by air drying at 20° C., and performances as the coating composition were measured and evaluated as in Example 2-1. The results are shown in Table 2-2. Sample Nos. 8-11 are Examples of the present invention, and Sample Nos. 12-14 and 14' are Comparative Examples.

TABLE 2-2

| | | Coating performance | | | | | | | | | | | |
|---|---|---|---|---|---|---|---|---|---|---|---|---|---|
| | | Appearance (luster) | | | Water resistance | | | Saline water resistance | | | Impact resistance | | |
| Sample No. | | Mortar plate | Straight grain birch | Steel plate | Mortar plate | Straight grain birch | Steel plate | Mortar plate | Straight grain birch | Steel plate | Mortar plate | Straight grain birch | Steel plate |
| Exam- | 8 | o | o | o | o | o | o | o | o | o | o | o | o |
| ple | 9 | o | o | o | o | o | o | o | o | o | o | o | o |
| | 10 | o | o | o | o | o | o | o | o | o | o | o | o |
| | 11 | o | o | o | o | o | o | o | o | o | o | o | o |
| Com- | 12 | Δ | Δ | Δ | Δ | x | x | Δ | x | x | x | x | x |
| para- | 13 | Δ | x | x | x | x | x | x | x | x | x | x | x |
| tive | 14 | x | x | x | x | x | x | x | x | x | x | x | x |
| Exam-ple | 14* | Δ | Δ | Δ | Δ | Δ | Δ | x | x | x | x | x | X |

*Film formation attempted at 20° C. proved impossible, and thus the film formed at 30° C. was measured.

EXAMPLE 2-3

The properties of the aqueous emulsion obtained in Example 1-3, the characteristics of the film obtained by air drying at 20° C., and the performances as the coating composition were measured as in Example 2-1. The results are shown in Table 2-3.

Sample Nos. 15, 16, 17, 19, 20, and 21 are Examples of the present invention.

As shown in Table 2-3, for all of the aqueous emulsions of Sample Nos. 15-17, 19, 20, and 21, excellent performances as the coating material in appearance (luster), water resistance, saline mater resistance, and impact resistance were exhibited.

TABLE 2-3

| | Coating performance | | | | | | | | | | | |
|---|---|---|---|---|---|---|---|---|---|---|---|---|
| | Appearance (luster) | | | Water resistance | | | Saline water resistance | | | Impact resistance | | |
| Sample No. | Mortar plate | Straight grain birch | Steel plate | Mortar plate | Straight grain birch | Steel plate | Mortar plate | Straight grain birch | Steel plate | Mortar plate | Straight grain birch | Steel plate |
| 15 | o | o | o | o | o | o | o | o | o | o | o | o |
| 16 | o | o | o | o | o | o | o | o | o | o | o | o |
| 17 | o | o | o | o | o | o | o | o | o | o | o | o |
| 19 | o | o | o | o | o | o | o | o | o | o | o | o |
| 20 | o | o | o | o | o | o | o | o | o | o | o | o |
| 21 | o | o | o | o | o | o | o | o | o | o | o | o |

EXAMPLE 2-4

The aqueous polymer emulsions obtained in Example 1-4 were used for the evaluation thereof as the coating composition. That is, as in Example 2-1, by using the aqueous emulsions of Sample Nos. 23–34, the performances as the coating composition were evaluated. As a result, for all of the aqueous emulsions of Sample Nos. 23–34, excellent performances as the coating material in appearance (luster), water resistance, saline water resistance, and impact resistance were exhibited.

EXAMPLE 2-5

The solid content of the aqueous emulsions of Sample Nos. 8-11 obtained in Example 1-2 was adjusted to 40% and alumina (purity 99.0%, average particle size 0.5 μm, produced by Showa Kinzoku K.K.) as the pigment was added to 200% based on the solid content and mixed by stirring by a homomixer (1000 rpm×10 min.).

The pigment-mixed aqueous emulsion was applied uniformly on a steel plate (SS41, 20.0 cm×10.0 cm×0.4 cm) washed with petroleum ether, to a thickness of 0.2 mm, dried in air at 20° C., and the appearance (luster), water resistance, saline water resistance, and impact resistance were measured and evaluated as in Example 2-1.

All of the results were good and the coated films exhibited excellent effects.

EXAMPLE 2-6

The solid content of the aqueous emulsion of Sample Nos. 8-11 obtained in Example 1-2 was adjusted to 40%, and titanium white pigment (Titanium White R-K produced by Teikoku Kako Co.) and a defoaming agent (Nopco 8034, produced by Sunnopco Co.) were added in amounts of 150% and 0.6% based on the solid content, respectively, and mixed under stirring by a homomixer (1000 rpm×10 min.).

The pigment-mixed aqueous emulsion was applied by spraying uniformly on a steel plate treated with zinc phosphate (SS41, 22.0 cm×10.0 cm×0.4 cm) washed with petroleum ether, followed by heat treatment at 130° C. for 30 minutes to form a coating with a film thickness of 50 μm. The coating was subjected to measurement of the water resistance, saline water resistance, and impact resistance according to JIS K5400 and evaluated as in Example 2-1. All of the results were good and the coated films exhibited excellent effects.

Also, 5 g of the aqueous emulsion of Sample Nos. 8–11 adjusted to a solid content of 20% by weight was cast uniformly on a glass plate 5 cm×6 cm and dried in air at 25° C. The film thus obtained was further subjected to heat treatment at 160° C. for 3 hours, and the degree of yellowness of the film before and after the heat treatment was measured by an SM Color Computer SM-4-CH Model (45 angle diffusion system) produced by Suga Test Instruments Co., Ltd. As a result, the degree of yellow was 3 or less before the treatment and 10 or less after the heat treatment, without yellow discoloration.

From the above results, it can be understood that the coating composition of the present invention is also suitable as a baking paint.

EXAMPLE 2-7

The aqueous emulsion of Sample Nos. 1, 8, 9, 15, 17 and 28 obtained in Examples 1-1, 1-2, 1-3, and 1-4 adjusted to a pH of 7 and a solid content of 40% by water and triethanolamine, calcium carbonate and asbestos were charged in predetermined amounts into a kneader, and predetermined amounts of sodium secondary phosphate and water were added, followed by uniform mixing. During the operation, water was added so that the viscosity of the coating material became the consistency as defined by the automobile standard (JASO-7006 (Kind 1 B)) (about 350).

Aqueous emulsion: 85 parts
Calcium carbonate: 25 parts
Asbestos: 25 parts
Sodium secondary phosphate: 0.5 parts
Water: balance The coating composition thus prepared was evaluated as the underbody coating material according to the automobile standard JASO-7006 (Kind 1 B) for storage stability, workability, baking test, oil resistance, boiling water resistance, impact resistance, abrasion resistance, and antivibration characteristic. The results are shown in Table 2-4.

Form Table 2-4, it can be understood that the coating composition of the present invention is also suitable as the coating material for vehicles such as automobiles.

TABLE 2-4

| Sample No. | Storage stability | Workability | Baking test | Oil resistance | Boiling resistance | Impact resistance | Abrasion resistance | Anti-vibration resistance |
|---|---|---|---|---|---|---|---|---|
| 1 | o | o | o | o | o | o | o | o |
| 8 | o | o | o | o | o | o | o | o |
| 9 | o | o | o | o | o | o | o | o |
| 10 | o | o | o | o | o | o | o | o |
| 15 | o | o | o | o | o | o | o | o |

TABLE 2-4-continued

| Sample No. | Storage stability | Workability | Baking test | Oil resistance | Boiling resistance | Impact resistance | Abrasion resistance | Anti-vibration resistance |
|---|---|---|---|---|---|---|---|---|
| 17 | o | o | o | o | o | o | o | o |

o; Satisfies the standard of JASO-7006 (Kind 1B)

EXAMPLE 2-8

To 99.8 parts of the aqueous emulsion of Sample Nos. 3, 9, 10, 17, 20, 28, and 33 obtained in Examples 1-1, 1-2, 1-3, and 1-4 adjusted to a solid concentration of 20% was added 0.2 part of a fluorescent compound or a dye of acridine, coumarine, rhodamine or fluorescein, followed by uniform mixing, to obtain a marking ink.

The marking ink was filled in a pen having a polyester pen tip with a shore hardness of 25 and a void volume of 57%, and writing was effected on a pure paper under a load pressure of about 100 g. It was evaluated whether these results could give writing having sharp images and printing with good leveling and without fog, or whether sharp images and printing could be maintained when the written site after drying was rubbed with a forefinger tip under a load of about 300 g directly or after dipping in 0.5 g of water or benzene oil for 5 minutes.

The results are shown in Table 2-5. From Table 2-5, it can be understood that the coating composition of the present invention has an excellent luster, abrasion resistance, water resistance, and solvent resistance, and is suitable for marking with, for example, marking pens and brush pens, and for a manicure.

TABLE 2-5

| Sample No. | Luster | Abrasion resistance | Water resistance | Solvent resistance |
|---|---|---|---|---|
| 3 | o | o | o | o |
| 9 | o | o | o | o |
| 10 | o | o | o | o |
| 17 | o | o | o | o |
| 20 | o | o | o | o |
| 28 | o | o | o | o |
| 30 | o | o | o | o |

o; Sharp image and printed letter with good luster can be written and maintained with respective evaluation

EXAMPLE 3-1

The aqueous emulsion obtained in Example 1-1 were used for the evaluation thereof as an adhesive composition.

Using a straight grain birch, steel plate (SPCC HL#320 finished), and a mortar plate 3.5 cm×2.5 cm×1.0 cm, each plate was washed with petroleum ether, dried in air at room temperature, and coated with the aqueous emulsion with a solid content of 40% to about $4\times10^{-3}$ g/cm$^2$.

Subsequently, according to JIS K-6852, a normal state test, water resistance test and repeated boiling test were performed to measure the compression shear adhesive strength.

Evaluations of the water resistance and boiling resistance shown in Table 3-1 were judged by comparison between the compression shear adhesive strength measured by the normal state test and the compression shear adhesive strength measured by the repeated boiling test, according to the following standards:

o: exhibiting 61–100% of the compression shear adhesive strength of the normal test;

Δ: exhibiting 60% or less of the compression shear adhesive strength of the normal test;

x: body to be adhered is peeled off.

The results of the evaluations of the properties of the aqueous emulsions, the film characteristics, and the performance, conducted according to the above methods, are shown in Table 2-1.

The Sample Nos. 1–4 are Examples of the present invention, and it can be understood that these samples exhibit excellent effects as adhesives. Sample Nos. 5–7 are comparative Examples.

TABLE 3-1

| Sample No. | Adhesive force: Normal state test: Mortar plate | Normal state test: Straight grain birch | Normal state test: Steel plate | Water resistance: Mortar plate | Water resistance: Straight grain birch | Water resistance: Steel plate | Boiling resistance: Mortar plate | Boiling resistance: Straight grain birch | Boiling resistance: Steel plate |
|---|---|---|---|---|---|---|---|---|---|
| Example | | | | | | | | | |
| 1 | 49 | 58 | 42 | o | o | o | o | o | o |
| 2 | 44 | 47 | 32 | o | o | o | o | o | o |
| 3 | 51 | 59 | 37 | o | o | o | o | o | o |
| 4 | 53 | 62 | 44 | o | o | o | o | o | o |
| Comparative Example | | | | | | | | | |
| 5*2 | 12 | 20 | 18 | Δ | Δ | Δ | Δ | Δ | Δ |
| 6 | *1 | *1 | *1 | *1 | *1 | *1 | *1 | *1 | *1 |
| 7 | *1 | *1 | *1 | *1 | *1 | *1 | *1 | *1 | *1 |

*1 Unmeasurable due to bad adhesiveness
*2 Adhered at 30° C.

EXAMPLE 3-2

An aqueous emulsion was prepared by emulsion polymerization in the same manner as in Example 1-1 by using 157 parts of unsaturated monomers comprising 90 parts of ethyl acrylate, 60 parts of methyl methacrylate, 4.5 parts of N-methylolacrylic amide, and 2.5 parts of water, and the same emulsifier as in Example 1-1.

The properties of the aqueous emulsion thus obtained, the characteristics of the film formed by air drying at 20° C., and performances as an adhesive were measured and evaluated as in Examples 1-1 and 3-1. The results are shown in Table 3-2 and Table 3-3. Sample Nos. 3-8 to 3-11 are Examples of the present invention, and Sample Nos. 3-12 to 3-14 are Comparative Examples.

The modulus strength was determined at 100% and 200%.

TABLE 3-2

| | | Aqueous emulsion | | | | | | | | Film Characteristics | | | |
|---|---|---|---|---|---|---|---|---|---|---|---|---|---|
| | | | Properties | | | | | | | Tensile strength | | | |
| | | Average particle size | Cross-linka- | Film form-ing prop- | Gloss transition temperature Tg (°C.) | | Trans- | Water resis- | Elon-gation | Strength (kg/cm²) | | | |
| | | | | | | | | | | | Modulus | |
| Sample No. | Emulsifier | (mm) | bility | erty | Calcd. | Found | parency | tance | (%) | Break | 100% | 200% |
| Example | | | | | | | | | | | | |
| 3-8 as in sample No. 1 | same emulsifier | 48 | o | o | 18 | 13 | 1.3 | o | 315 | 78 | 47 | 56 |
| 3-9 | same emulsion as in sample No. 2 | 71 | o | o | 18 | 14 | 2.2 | o | 296 | 64 | 39 | 47 |
| 3-10 | same emulsion as in sample No. 3 | 63 | o | o | 18 | 12 | 3.2 | o | 280 | 66 | 41 | 50 |
| 3-11 | same emulsion as in sample No. 4 | 82 | o | o | 18 | 12 | 1.4 | o | 334 | 72 | 44 | 57 |
| Comparative Example | | | | | | | | | | | | |
| 3-12 | same emulsion as in sample No. 5 | 38 | o | o | 18 | 18 | 30.4 | o | 125 | 29 | 23 | — |
| 3-13*1 | same emulsion as in sample No. 6 | 35 | x | o | 18 | 18 | 22.6 | x | 132 | 31 | 17 | — |
| 3-14*1 | same emulsion as in sample No. 7 | 86 | o | x | 18 | 20 | *2 | *2 | *2 | *2 | *2 | *2 |

*1Polymerization initiator: Potassium persulfate $3.0 \times 10^{-3}$ mole/liter - aqueous phase; Sodium thiosulfate $3.0 \times 10^{-3}$ mole/liter - aqueous phase; Copper sulfate $5.6 \times 10^{-5}$ mole/liter - aqueous phase

*2Unmeasurable due to bad film formation

TABLE 3-3

| | Adhesive force | | | | | | | | |
|---|---|---|---|---|---|---|---|---|---|
| | Normal state test | | | Water resistance | | | Boiling resistance | | |
| Sample No. | Mortar plate | Straight grain birch | Steel plate | Mortar plate | Straight grain birch | Steel plate | Mortar plate | Straight grain birch | Steel plate |
| Example | | | | | | | | | |
| 3-8 | 35 | 47 | 33 | o | o | o | o | o | o |
| 3-9 | 29 | 38 | 24 | o | o | o | o | o | o |
| 3-10 | 33 | 45 | 31 | o | o | o | o | o | o |
| 3-11 | 36 | 46 | 33 | o | o | o | o | o | o |
| Comparative Example | | | | | | | | | |
| 3-12 | 21 | 27 | 19 | Δ | Δ | Δ | Δ | Δ | Δ |
| 3-13 | 19 | 23 | 16 | x | x | x | x | x | x |
| 3-14 | 14 | 21 | 18 | *1 | *1 | *1 | *1 | *1 | *1 |

*1Unmeasurable due to bad film formation

EXAMPLE 3-3

An aqueous emulsion was prepared by emulsion polymerization in the same manner as in Example 1-1 by using 8.0 parts of the emulsifier as shown in Table 3-4, 157 parts of unsaturated monomers comprising 90 parts of ethyl acrylate, 60 parts of methyl methacrylate, 4.5 parts of N-methylolacrylic amide, and 2.5 parts of water, and a solution of polymerization initiators of $3.0\times10^{-3}$ mole/liter-aqueous phase of potassium persulfate, $3.0\times10^{-3}$ mole/liter-aqueous phase of sodium thiosulfate, and $5.0\times10^{-5}$ mole/liter-aqueous phase of copper sulfate dissolved in 47.5 parts by weight of water.

The properties of the aqueous emulsion thus obtained, the characteristics of the film formed by air drying at 20° C., and the performances as an adhesive were measured and evaluated as in Example 3-1. The results are shown in Table 3-4. Sample Nos. 8-11 are Examples of the present invention.

The results of the evaluation of the adhesiveness of Sample Nos. 8-11 were good in a normal state test, and for the water resistance and boiling resistance for all of the mortar plates, straight grain birch, and steel materials.

TABLE 3-4

| | | Aqueous emulsion | | | | | | Film characteristics | | | | | |
|---|---|---|---|---|---|---|---|---|---|---|---|---|---|
| | | | Properties | | | | | | | | Tensile strength | | |
| | | | | | | | | | | | Strength (kg/cm²) | | |
| | | Average particle | Cross- | Film forming | Gloss transition temperature Tg (°C.) | | Trans- | Water | | Elongation | | Modulus | |
| Sample No. | Emulsifier | size (nm) | linkability | property | Calcd. | Found | parency | resistance | Tackiness | (%) | Break | 100% | 200% |
| Example 8 | 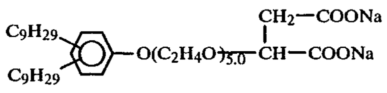 4.0 parts<br>Dimethacrylate of polyoxypropylene polyoxyethylene glycol (POP = 3, EOP = 12) 4.0 parts | 79 | o | o | 18 | 13 | 2.7 | o | o | 345 | 82 | 67 | 72 |
| 9 | 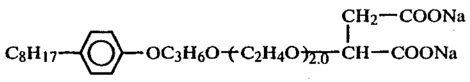 4.0 parts<br>Diacrylate of polyoxypropylene polyoxyethylenebisphenol A ether (POP = 2, EOP = 9) 4.0 parts | 43 | o | o | 18 | 14 | 3.0 | o | o | 307 | 70 | 56 | 59 |
| 10 | 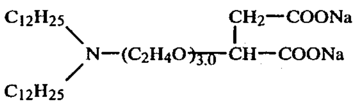 6.0 parts<br>Dimethacrylate of polyoxyethylene glycol (EOP = 14) 2.0 parts | 57 | o | o | 18 | 12 | 3.2 | o | o | 296 | 67 | 53 | 57 |
| 11 | 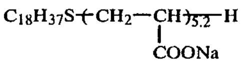 6.0 parts<br>Dimethacrylate of polyoxypropylene polyoxyethylene (POP = 8.3, EOP = 5.7) 2.0 parts | 82 | o | o | 18 | 12 | 2.6 | o | o | 277 | 65 | 49 | 52 |

EXAMPLE 4-1

A reaction vessel made of a glass equipped with a thermometer, a stirrer, a reflux condenser, a nitrogen introducing pipe, and a dropping funnel was charged with 8 parts of an emulsifier as shown in Table 4-1 and 150 parts of water to prepare a solution and the system was internally replaced with nitrogen gas. Separately, 156 parts of a mixture of unsaturated monomers comprising 75 parts of ethyl acrylate, 75 parts of methyl methacrylate, 4.5 parts of N-methylolacrylamide, and 1.5 parts of water were prepared, and 15 parts of the mixture were added to the above reaction vessel and emulsified at 40° C. for 30 minutes. Next, after the temperature of the mixture was raised to 60° C., a solution of a polymerization initiator 2,2'-azobis(N,N'-dimethyleneisobutylamidine) hydrochloride dissolved in 48.5 parts by weight of water to $9.0\times10^{-3}$ mole/liter-aqueous phase was added to the above reaction vessel, followed immediately by a continuous addition of the remainder of the unsaturated monomers to the reaction vessel over 30 minutes to carry out polymerization at 60° C. After completion of the dropwise addition of the unsaturated monomers, the mixture was subjected to aging at 60° C. for 60 minutes to prepare an aqueous emulsion.

The average particle size, crosslinkability (solvent resistance) and glass transition temperature of the aqueous emulsion thus obtained as well as the film characteristics were measured in the same manner as in Example 1-1.

The performance as the surface coating composition was evaluated as follows.

Test panels of a steel plate (SPCC HL#-320 finished, an aluminum plate (A-1100P, HL#-320 finished, and a copper plate (C1100P, HL#-400 finished) 7.6 cm×2.6 cm×0.5 cm were each washed with a solvent of petroleum ether, dried in air at room temperature, and coated with the above aqueous emulsion uniformly by a knife coater to a resin layer thickness of 0.2 mm.

Subsequently, after drying in air at 25° C., the metal surface was coated with a resin layer to be provided as a sample for an evaluation of luster, weathering resistance, and impact resistance according to the following standards.

Luster:

o: transparent with luster inherent in metal;

Δ: coating layer slightly translucent with slightly inferior luster inherent in metal;

x: coating layer is translucent with no luster inherent in metal;

Water resistance: the sample was dipped in a laboratory dish filled with deionized water and sea water at 20° C. for 28 days, and the state of the coating layer was measured according to the following standards:

o: coating layer is transparent with luster inherent in metal, and the metal plate and the coating layer are not peeled off;

Δ: coating layer is translucent, with slightly inferior luster inherent in metal, but the metal plate and the coating layer are not peeled off;

x: coating layer is whitened, without luster inherent in metal, and the metal plate and the coating layer are peeled off or can be readily peeled off.

Weathering resistance: presence of blistering, peeling of the sample after irradiation for 1000 hours by an accelerating weathering resistance testing device according to JIS K-5400 was measured by visual observation.

Impact resistance: judged according to the impact resistance test method A of JIS K-5400 by the following standards:

o: no cracking or peeling of film;

Δ: slight cracking or peeling of film;

x: cracking or peeling of the film.

The results of the properties of the aqueous emulsions, the film characteristics and performance evaluations as the surface coating composition conducted according to the above methods are shown in Table 4-1 and Table 4-2. The sample Nos. 1 to 4 are examples of the present invention, and it can be understood that these samples exhibit excellent effects as surface coating compositions for metal materials. Sample Nos. 4-5 and 6 are Comparative Examples.

TABLE 4-1

| | Aqueous emulsion | | | | | |
|---|---|---|---|---|---|---|
| | | Properties | | | | |
| Sample No. | Emulsifier | Average particle size (nm) | Cross-linkability | Gloss transition temperature Tg (°C.) Calcd. | Found | Elongation (%) |
| Example | | | | | | |
| 1 | Glycine chloride betaine ester of polyoxyethylene octylphenyl ether (EOP = 3) 4.0 parts<br>Dimethacrylate of polyoxypropylene polyoxyethylene glycol (POP = 3, EOP = 12) 4.0 parts | 55 | o | 30 | 23 | 200 |
| 2 | Glycine chloride-2-heptylundecyl ester 4.0 parts<br>Diacrylate of polyoxypropylene polyoxyethylene-bisphenol A ether (POP = 2, EOP = 9) 4.0 parts | 70 | o | 30 | 23 | 180 |
| 3 | Glycine chloride betaine ester of polyoxypropylene polyoxyethylene-lauryl ether (POP =0 2, EOP = 2) 5.0 parts<br>Dimethacrylate of polyoxyethylene glycol (EOP = 14) 3.0 parts | 73 | o | 30 | 23 | 215 |
| 4 | Alanyl chloride ester of polyoxypropylene polyoxyethylene nonylphenyl ether (POP = 1, EOP = 2) 4.0 parts<br>Tetramethacrylate of polyoxypropylene polyoxyethylene ethylenediamine (POP = 8.3, EOP = 5.7) 4.0 parts | 45 | o | 30 | 22 | 231 |
| Comparative Example | | | | | | |

TABLE 4-1-continued

| | | | | | | |
|---|---|---|---|---|---|---|
| 4-5*1 | Dimethacrylate of polyoxypropylene polyoxyethylene glycol (POP = 3, EOP = 12) 5.0 parts<br>Glycine chloride betaine ester of polyoxyethylene octylphenyl ether (POP = 1, EOP = 2) 3.0 parts | 250 | o | 30 | 24 | 85 |
| 6 | Sodium α-olefinic sulfonate with 16-18 carbon atoms 6.0 parts | 35 | x | 30 | 30 | 120*2 |

| Sample No. | Emulsifier | Film characteristics<br>Tensile strength<br>Strength (kg/cm$^2$)<br>Break | Modul;us 50% | 200% | Water resistance | Transparency |
|---|---|---|---|---|---|---|
| Example | | | | | | |
| 1 | Glycine chloride betaine ester of polyoxyethylene octylphenyl ether (EOP = 3) 4.0 parts<br>Dimethacrylate of polyoxypropylene polyoxyethylene glycol (POP = 3, EOP = 12) 4.0 parts | 165 | 62 | 85 | o | 2.3 |
| 2 | Glycine chloride-2-heptylundecyl ester 4.0 parts<br>Diacrylate of polyoxypropylene polyoxyethylene-bisphenol A ether (POP = 2, EOP = 9) 4.0 parts | 140 | 58 | 82 | o | 3.1 |
| 3 | Glycine chloride betaine ester of polyoxypropylene polyoxyethylene-lauryl ether (POP =0 2, EOP = 2) 5.0 parts<br>Dimethacrylate of polyoxyethylene glycol (EOP = 14) 3.0 parts | 162 | 59 | 76 | o | 4.2 |
| 4 | Alanyl chloride ester of polyoxypropylene polyoxyethylene nonylphenyl ether (POP = 1, EOP = 2) 4.0 parts<br>Tetramethacrylate of polyoxypropylene polyoxyethylene ethylenediamine (POP = 8.3, EOP = 5.7) 4.0 parts | 188 | 61 | 82 | o | 3.2 |
| Comparative Example | | | | | | |
| 4-5*1 | Dimethacrylate of polyoxypropylene polyoxyethylene glycol (POP = 3, EOP = 12) 5.0 parts<br>Glycine chloride betaine ester of polyoxyethylene octylphenyl ether (POP = 1, EOP = 2) 3.0 parts | 70 | 32 | — | Δ | 17.5 |
| 6 | Sodium α-olefinic sulfonate with 16-18 carbon atoms 6.0 parts | 82*2 | 10*2 | 13*2 | x*2 | 37.2*2 |

*1Polymerization aging temperature: 75° C.
*2Film formation at 30° C.

TABLE 4-2

| Sample No. | | Performance<br>Luster | Water resistaace<br>Deionized water | Sea water (hard water) | Weathering resistance | Impact resistance |
|---|---|---|---|---|---|---|
| Example | | | | | | |
| 1 | o | o | o | None | o | |
| 2 | o | o | o | None | o | |
| 3 | o | o | o | None | o | |
| 4 | o | o | o | None | o | |
| Comparative Example | | | | | | |
| 4-5 | x | Δ | Δ | None | Δ | |
| 6 | Δ | x | x | None | x | |

EXAMPLE 4-2

The performances of the aqueous polymer emulsion Sample Nos. 8-11 obtained in Example 1-2 as the surface coating compositions for metal materials were measured and evaluated as in Example 4-1. As a result, Sample Nos. 8-11 were found to have a good luster, water resistance, weathering resistance, and impact resistance for all of the metal materials of steel plate, aluminum plate, and copper plate.

EXAMPLE 5-1

A reaction vessel made of a glass equipped with a thermometer, a stirrer, a reflux condenser, a nitrogen introducing pipe, and a dropping funnel was charged with 8 parts by weight of an emulsifier as shown in Table 5-1 and 150 parts of water to prepare a solution and the system was internally replaced with nitrogen gas. Separately, 156 parts of a mixture of unsaturated monomers comprising 90 parts of ethyl acrylate, 60 parts of methyl methacrylate, 4.5 parts of N-methylolacrylamide, and 1.5 parts of water were prepared, and 15 parts of the mixture were added to the above reaction vessel and emulsified at 40° C. for 30 minutes. Next, after the temperature of the mixture was raised to 60° C., a solution of polymerization initiators dissolved in 48.5 parts of water to $3.0\times10^{-3}$ mole/liter-aqueous phase of potassium persulfate, $3.0\times10^{-3}$ mole/liter-phase aqueous phase of sodium thiosulfate, and $5.0\times10^{-5}$ mole/liter-aqueous phase of copper sulfate was added to the above reaction vessel, followed immediately by continuous addition of the remainder of the unsaturated monomers into the reaction vessel over 30 minutes to carry out polymerization at 60° C. After completion of the dropwise addition of the unsaturated monomers, the mixture was subjected to aging at 60° C. for 60 minutes to prepare an aqueous emulsion.

The average particle size, crosslinkability and glass transition temperature of the aqueous emulsion thus obtained were measured in the same manner as in Example 1-1. The results are shown in Table 5-1.

The aqueous polymer emulsions obtained above were evaluated as a magnetic recording medium as follows.

To 53.6 parts of the above aqueous emulsion adjusted to a solid content of 40%, 21.2 parts of 1% of ammonia water and 59.8 parts of water were added 50 parts of $\gamma$-$Fe_2O_3$ magnetic powder, and the mixture was dispersed in a ball mill to prepare a slurry for formation of a magnetic recording layer.

The slurry for formation of a magnetic layer is applied by a knife coater to a thickness of the magnetic recording layer of 10 $\mu$m on a polyester base film with a thickness of 21 $\mu$m, and dried by heating at 50° C. for 8 hours to prepare a magnetic recording tape.

The magnetic recording tape was subjected to measurements of the magnetic property (rectangular form Br/Bs), abrasion reduction, heat resistance, stretchability, and luster.

The abrasion reduction, heat resistance, stretchability, and luster were evaluated according to the following standards.

Abrasion reduction: a magnetic recording tape with a constant length was connected in a loop, and permitted to run in frictional contact with a magnetic head at a running speed of 38 cm/sec. for 1 hour, and the abrasion reduction then measured.

Heat resistance:

o: little adhesion occurs between the polyester film substrate and the magnetic recording layer;

x: adhesion readily occurs between the polyester film substrate and the magnetic recording layer.

Stretchability: magnetic recording tape was cut to 5.0 cm×0.5 cm×31 $\mu$m, and the test strip subjected to stress by a tensile tester until an elongation of 50% was exhibited, and the state of deformation (strain) was observed and evaluated as follows:

o: adhesion between polyester film substrate and magnetic recording layer is good, and no deformation of test strip observed;

x: adhesion between polyester film substrate and magnetic recording layer is not good, the strip lacks dimensional stability, and deformation is observed.

Luster:

o: dispersibility of $\gamma$-$Fe_2O_3$ magnetic powder is good in the magnetic recording layer, with an excellent luster on the surface of the magnetic recording layer;

x: dispersibility of $\gamma$-$Fe_2O_3$ magnetic powder is inferior in the magnetic recording layer, with an inferior luster on the surface of the magnetic recording layer.

The performances of the magnetic recording tapes are shown in Table 5-1. Sample Nos. 5-1 - 5-4 are Examples of the present invention, and it can be understood that the magnetic recording tapes obtained accordingly to the present invention have an excellent dispersibility of the magnetic powder, and an excellent luster, without causing interlayer adhesion, thus having an excellent heat resistance, abrasion resistance, and stretchability. Sample Nos. 5-5 to 5-6 and 13 are Comparative Examples.

TABLE 5-1

| | Sample No. | Aqueous emulsion: Emulsifier | | Properties: Average particle size (nm) | Properties: Cross-linkability | Properties: Gloss transition temperature Tg (°C.) Calcd. | Properties: Gloss transition temperature Tg (°C.) Found | Characteristics: Rectangular form ratio (Br/Bs) | Characteristics: Abrasion reduction (index) | Characteristics: Heat resistance | Characteristics: Stretchability | Characteristics: Luster |
|---|---|---|---|---|---|---|---|---|---|---|---|---|
| Example | 5-1 | 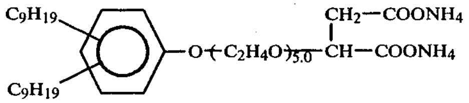 | 4.0 parts | 81 | o | 18 | 13 | 0.87 | 80 | o | o | o |
| | | Dimethacrylate of polyoxypropylene polyoxyethylene glycol (POP = 3, EOP = 12) | 4.0 parts | | | | | | | | | |
| | 5-2 | 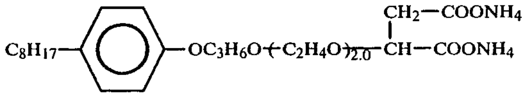 | 4.0 parts | 45 | o | 18 | 14 | 0.85 | 74 | o | o | o |
| | | Diacrylate of polyoxypropylene polyoxyethylene-bisphenol A ether (POP = 2, EOP = 9) | 4.0 parts | | | | | | | | | |
| | 5-3 | 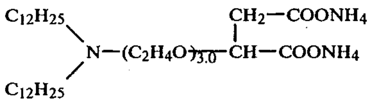 | 6.0 parts | 55 | o | 18 | 12 | 0.86 | 83 | o | o | o |
| | | Dimethacrylate of polyoxyethylene glycol (EOP = 14) | 2.0 parts | | | | | | | | | |
| | 5-4 | 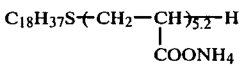 | 6.0 parts | 78 | o | 18 | 12 | 0.85 | 69 | o | o | o |
| | | Dimethacrylate of polyoxypropylene polyoxyethylene (POP = 8.3, EOP = 5.7) | 2.0 parts | | | | | | | | | |
| Comparative Example | 5-5* | $C_{18}H_{37}O(C_2H_4O)_{3.0}CH_2COONH_4$ | 3.0 parts | 147 | o | 18 | 14 | 0.76 | 110 | o | x | x |
| | | Dimethacrylate of polyoxypropylene polyoxyethylene glycol (POP = 3, EOP = 13) | 5.0 parts | | | | | | | | | |
| | 13 | Sodium α-olefinic sulfonate with 16-18 carbon atoms | 6.0 parts | 35 | x | 18 | 17 | 0.78 | 147 | x | x | x |
| | 5-6 | Magnetic recording medium prepared by use of vinyl chloride-vinyl acetate copolymer as the binder and organic solvent (ethyl acetate) | | — | — | — | — | 0.75 | 100 | o | x | x |

*Polymerization, aging temperature: 75° C.

EXAMPLE 6-1

The aqueous polymer emulsion sample Nos. 6-1 to 6-5 and 13 of Example 5-1 were used for the evaluation.

The average particle size, crosslinkability of the aqueous emulsion, and the glass transition temperature were measured as mentioned above. The results are shown in Table 6-1.

The properties of the above-mentioned polymer emulsion were evaluated as the binder composition as follows.

To a slurry obtained by mixing 100 parts of alumina (AL-160SG-1), purity 99.0%, average particle size 0.5 μm, produced by Showa Keikinzoku K.K.), 24 parts of and 0.6 part of a dispersant (acrylic acid/acrylic acid ester copolymer $NH_4$ salt) in a ball mill for 24 hours, 24.5 parts of the aqueous emulsion with a solid component concentration of 40 g as prepared above, 3 parts of a polyethylene glycol with a molecular weight of 200 and 2 parts of ethyl carbitol were added, followed further by mixing in a ball mill for 24 hours. The resultant slurry was defoamed under reduced pressure and then adhered to a thickness of 1.2 mm onto a polyester sheet. After drying overnight at room temperature, a green sheet in shape of a tape (10 cm×22 cm) was prepared. The number of cracks on the green sheet, tensile strength and green density were measured. The number of cracks and the tensile strength were evaluated according to the following standards.

Cracking:

o: no cracks at all on the 10 cm×22 cm sheet surface;

Δ: slight cracking on the 10 cm×22 cm sheet surface;

x: considerably cracking on the sheet surface 10 cm×22 cm.

Tensile strength: according to JIS6301, the sheet was punched into dumbbell No. 1 form, and the tensile strength at break was measured at a speed of 0.3 cm/min.

The properties of the aqueous emulsion and the performances of the molded product are shown in Table 6-1.

Sample Nos. 6-1 to 6-4 are Examples of the present invention, and since the aqueous emulsion of the present invention comprises ultra-fine particles having cross-linked structures internally of the particles and (or) between particles, it can be understood that the molded product obtained by use of the emulsion as the binder is free from cracks and has an excellent strength at break.

Sample Nos. 6-5 and 13 are Comparative Examples.

TABLE 6-1

| Sample No. | Aqueous emulsion Properties: Average particle size (nm) | Cross-linkability | Gloss transition temperature Tg (°C.) Calcd. | Found | Performance: Cracked state | Green density (g/cm³) | Strength at break (Kg/cm²) |
|---|---|---|---|---|---|---|---|
| Example | | | | | | | |
| 6-1 | 81 | o | 18 | 13 | o | 2.79 | 105.6 |
| 6-2 | 45 | o | 18 | 14 | o | 2.81 | 117.2 |
| 6-3 | 55 | o | 18 | 12 | o | 2.76 | 100.4 |
| 6-4 | 78 | o | 18 | 12 | o | 2.77 | 86.9 |
| Comparative Example | | | | | | | |
| 6-5*2 | 147 | o | 18 | 14 | o | 2.63 | —*1 |
| 13 | 35 | x | 18 | 17 | Δ | 2.77 | 58.7 |

*1Many cracks on sheet
*2Polymerization, aging temperature: 75° C.

EXAMPLE 6-2

Using a mixture of unsaturated monomers comprising 60 parts of butyl acrylate, 90 parts of styrene, 3.0 parts of N-methylolacrylic amide and 1.5 parts of water, 0.582 part of 2.2-azobis(N,N'-dimethyleneisobutylamidine) hydrochloride, and the emulsifier shown in Table 6-2, emulsion polymerization was carried out as in Example 6-1 to obtain an aqueous emulsion.

The average particle size and crosslinkability of the aqueous emulsion obtained were measured in the same manner as in Example 6-1, the results are shown in Table 6-2.

Into a kneader (S-13-2 Model produced by Enonami Seisakusho) were thrown 100 parts of Flattery Sand (siliceous sand produced from Cape Flattery, Northeast seashore, State of Queensland, Australia), and 3.0 parts of the aqueous emulsion obtained in Examples 6-1 and 6-2 was added thereto, followed by stirring for 1 minute. Next, the siliceous mixture obtained was placed lightly into a cylindrical mold of 50 mmØ×50 mm to the extent so as to fill the mold, subsequently by first filling the above mixture by manually pushing it into the above mold, further supplementing the mixture so that it is raised higher by about 2 cm than the upper end of the above mold, followed further by manually pushing thereon to push the mixture uniformly into the mold, with the superfluous siliceous mixture being removed, to be molded and obtain a test strip. The test strip was released when it became releasable from the mold and cured. During this operation, curing was managed at 25° C.

For the test strip thus obtained, 2 days after molding, the appearance, surface stability and compression strength were measured. The appearance and surface stability were evaluated according to the following standards.

Appearance:

o: test strip has luster and good touch feeling;

test strip inferior in both luster and touch feeling;

x: test strip without luster, with coarse touch feeling.

Surface stability (SSi %)

Using a 10 mesh sieve, the Lowtap shaking method (produced by Heiko Seisakusho K.K.) was practiced for 2 minutes, and the surface stability was calculated from the following formula:

$$\text{Surface stability} = \frac{\text{Weight of test strip after shaking}}{\text{Weight of test strip before shaking}} \times 100$$

The results of evaluation of the test strip are shown in Table 6-2. Sample Nos. 6-1 and 6-6-6-8 are Examples of the present invention, and Sample Nos. 5 and 11 are Comparative Examples.

As described above, from the results of Sample Nos. 6-1-6-4 and 6-6-6-8, it can be understood that these samples are suitable as the binder for molding of inorganic sintered products.

thiosulfate, and $5.0\times10^{-5}$ mole/liter-aqueous phase of copper sulfate or 2,2'-azobis(N,N'-dimethyleneisobutylamidine) hydrochloride (VA-044) controlled to 9.0×10- mole/liter-aqueous phase, dissolved in 48.5 parts of water, was added to the above reaction vessel, followed immediately by a continuous addition of the remainder of the unsaturated monomers into the reaction vessel over 30 minutes to carry out polymerization at 60° C. After completion of the dropwise addition of the unsaturated monomers, the mixture was subjected to aging at 60° C. for 60 minutes to prepare an aqueous emulsion.

TABLE 6-2

| | | Aqueous emulsion | | | | | Performance of test strip | | |
|---|---|---|---|---|---|---|---|---|---|
| | | | | Properties | | | | | |
| Sample No. | | Emulsifier | Average particle size (nm) | Gloss Cross-linkability | Sur- transition temperature Tg (°C.) Calcd. | Found | Appearance | face stability (%) | Strength pressure (Kg/cm$^2$) |
| Example | 6-6 | Glycine chloride betaine ester of polyoxyethylene octylphenyl ether (EOP = 3) 4.0 parts<br>Dimethacrylate of polyoxypropylene polyoxyethylene glycol (POP = 2, EOP = 9) 4.0 parts | 64 | o | 23 | 18 | o | 98.6 | 45.6 |
| | 6-7 | Glycine chloride-2-heptyl undecyl ester 4.0 parts<br>Diacrylate of polyoxypropylene polyoxyethylene-bisphenol A ether (POP = 2, EOP = 9) 4.0 parts | 74 | o | 23 | 19 | o | 99.2 | 47.9 |
| | 6-8 | Alanyl chloride ester of polyoxypropylene polyoxyethylene nonylphenyl ether (POP = 1, EOP = 2) 4.0 parts<br>Tetramethacrylate of polyoxypropylene polyoxyethylene ethylenediamine (POP = 8.3, EOP = 5.7) 4.0 parts | 52 | o | 23 | 18 | o | 98.5 | 43.3 |
| | 6-1 | 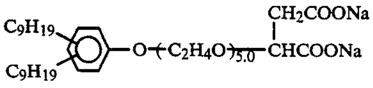 4.0 parts<br>Methacrylate of polyoxypropylene polyoxyethylene glycol 4.0 parts (POP = 3, EOP = 13) | 86 | o | 18 | 13 | o | 98.4 | 47.2 |
| Comparative Example | 6-5 | $C_{18}H_{27}O\ (C_2H_4O)_{3.0}\ CH_2COONa$ 3.0 parts<br>Dimethacrylate of polyoxypropylene polyoxyethylene glycol (POP = 3, EOP = 12) 5.0 parts | 132 | o | 18 | 14 | x | 64.2 | 18.9 |
| | 6-9* | Sodium dodecyl sulfate 6.0 parts | 53 | o | 23 | 23 | Δ | 85.7 | 24.2 |

*Hardness management: 25° C.

EXAMPLE 7-1

A reaction vessel made of glass equipped with a thermometer, a stirrer, a reflux condenser, a nitrogen introducing pipe and a dropping funnel was charged with 8.0 parts of an emulsifier as shown in Table 7-1 and 150 parts of water to prepare a solution and the system was internally replaced with nitrogen gas. Separately, 156 parts of a mixture of unsaturated monomers comprising 75 parts of ethyl acrylate, 75 parts of methyl methacrylate, 4.5 parts of N-methylolacrylamide, and 1.5 parts of water were prepared, and 15 parts of the mixture were added to the above reaction vessel and emulsified at 40° C. for 30 minutes. After the temperature of the mixture was raised to 60° C., a solution of KPS-redox type polymerization initiators shown in Table 7-1 controlled to $3.0\times10^{-3}$ mole/liter-aqueous phase of potassium persulfate, $3.0\times10^{-3}$ mole/liter-aqueous phase of sodium The average particle size, crosslinkability and glass transition temperature of the aqueous emulsion thus obtained were measured as mentioned above.

The aqueous emulsions obtained above were evaluated as a hydraulic inorganic material as follows.

According to JIS A 6204, a concrete composition comprising 475 kg/m$^3$ of Asano Cement produced by Nippon Cement K.K., 950 kg/m$^3$ of fine aggregates (specific gravity: 2.64, coarse crushing ratio: 2.42) and the aqueous emulsion added in an amount of 20% and water added to a flow value of 140±5 was subjected after the material age of 28 days to an evaluation of flexural strength, compression strength, and water resistance according to the following standards.

Compression strength: measured according to JIS A 1108.

Flexural strength: measured according to JIS A 1106.

Water resistance: after the material age of 28 days, the same sample as used for measurement of the compression strength before immersion was immersed in water for 28 days, and the water resistance was evaluated according to the following standards.

o: luster on concrete surface same as before immersion of sample in water;

Δ: no luster on concrete surface;

x: concrete surface whitened.

The properties of the aqueous emulsions and performances of the concrete compositions thus obtained are shown in Table 7-1. Sample Nos. 1, 2, 7-1, and 7-2 are Examples of the present invention, and it can be seen that these samples have a remarkable strength (compression strength, flexural strength) and water resistance. Sample Nos. 7-3-7-5 and 7 are Comparative Examples.

TABLE 7-1

| Sample | No. | Aqueous emulsion: Emulsifier | | Properties: Average particle size (nm) | Properties: Cross-linkability | Properties: Gloss transition temperature Tg (°C.) Calcd. | Found | Performance: Flexural strength (Kg/cm²) | Performance: Compression strength (Kg/cm²) | Performance: Water resistance | Polymerization initiator |
|---|---|---|---|---|---|---|---|---|---|---|---|
| Example | 1 | Glycine chloride betaine ester of polyoxyethylene octylphenyl ether (EOP = 3) | 4.0 parts | 55 | o | 30 | 23 | 217 | 1291 | o | VA-044 |
| | | Dimethacrylate of polyoxypropylene polyoxyethylene glycol (POP = 3, EOP = 12) | 4.0 parts | | | | | | | | |
| | 2 | Glycine chloride-2-heptyl undecyl ester | 4.0 parts | 70 | o | 30 | 23 | 197 | 1206 | o | VA-044 |
| | | Diacrylate of polyoxypropylene polyoxyethylene-bisphenol A ether POP = 2, EOP = 9) | 4.0 parts | | | | | | | | |
| | 7-1 | 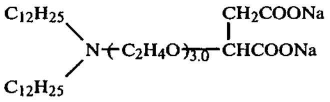 | 5.0 parts | 47 | o | 30 | 23 | 199 | 1362 | o | KPS type |
| | | Dimethacrylate of polyoxyethylene glycol (EOP = 14) | 3.0 parts | | | | | | | | |
| | 7-2 | 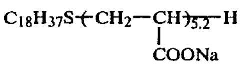 | 5.0 parts | 65 | o | 30 | 22 | 213 | 283 | o | KPS type |
| | | Diacrylate of polyoxypropylene polyoxyethylene POP = 8.3, EOP = 5.7) | 3.0 parts | | | | | | | | |
| Comparative Example | 7-3* | Dimethyacrylate of polyoxypropylene polyoxyethylene glcyol (POP = 3, EOP = 12) | 4.5 parts | 215 | o | 30 | 26 | 173 | 871 | Δ | VA-044 |
| | | Glycine chloride betain ester of polyoxyethylene octylphenyl ether (POP = 1, EOP = 2) | 3.5 parts | | | | | | | | |
| | 7-4 | Sodium α-olefinic sulfonate with 16-18 carbon atoms | 6.0 parts | 42 | x | 30 | 30 | 179 | 846 | x | VA-044 |
| | 7-5 | No addition | | — | — | — | — | 110 | 750 | Δ | — |

*Polymerization aging temperature: 75° C.

EXAMPLE 7-2

Calcined gypsum and fine hollow glass spheres obtained from white sand are formulated according to the ratios shown in Table 7-2 and mixed uniformly to obtain gypsum board materials. Next, a minimum amount of water in which the gypsum board material can be completely slurried was used, and to the water were added a water repellant compound represented by the chemical formula:

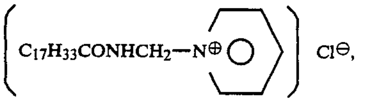

a mixture of unsaturated monomers of 85 parts of ethyl acrylate, 65 parts of methyl methacrylate and 3 parts of N-methylolacrylic amide and the aqueous emulsion (average particle size: 58 nm, crosslinkability: o) obtained similarly as in Example 7-1 by use of the emulsifier used in sample No. 1 in Example 7-1 (or 1-1) according to the ratios shown in Table 7-2, followed by uniform mixing. The above gypsum board material was added to and uniformly mixed with the mixture, and the mixture was then molded into a board 150 mm×180 mm×9 mm and dried by dehydration to a constant weight at 80° C. The thus obtained product was used as the test board, and the flexural strength, compression strength and water resistance (water absorption) thereof were measured to obtain the results shown in Table 7-2.

Also, for comparison, test boards were prepared by varying the formulation ratios of the calcined gypsum and fine hollow glass spheres obtained from white sand, or the amounts of the above water repellant and the above aqueous emulsion formulated, and the water absorption, flexural strength, water resistance, water absorption, and appearance thereof were measured.

The water absorption was measured by dipping the test board into water of 30° C. to absorb water, and the absorption was determined from the amount of water absorbed after 24 hours, according to the following formula:

Absorption (%) =

-continued $$\frac{\text{Test board weight after water absorption} - \text{Test board weight before water absorption}}{\text{Test board weight before water absorption}} \times 100$$

The flexural strength and compression strength were measured according to JIS K-7203 and JIS K-6911.

The properties of the gypsum boards thus obtained are shown in Table 7-2. Sample Nos. 7-6-7-13 are Examples of the present invention, and sample Nos. 7-14–7-18 are Comparative Examples.

TABLE 7-2

| | Composition (parts) | | | | Performance | | |
|---|---|---|---|---|---|---|---|
| | | | | | Strength ($Kg/cm^2$) | | Water resistance |
| Sample No. | Calcined gypsum | Fine hollow glass sheres obtained from white sand | Water repellent | Aqueous emulsion | Flexural strength | Compression strength | (Absorption % by weight) |
| Example | | | | | | | |
| 7-5 | 90 | 10 | 1.0 | 5.0 | 31.7 | 152.2 | 9.3 |
| 7-7 | 80 | 20 | 1.0 | 5.0 | 29.6 | 131.7 | 9.3 |
| 7-8 | 70 | 30 | 0.5 | 5.0 | 24.0 | 110.4 | 27.5 |
| 7-9 | 70 | 30 | 2.0 | 1.0 | 26.3 | 120.9 | 22.6 |
| 7-10 | 70 | 30 | 3.5 | 5.0 | 30.3 | 134.8 | 6.5 |
| 7-11 | 70 | 30 | 2.0 | 2.0 | 25.1 | 115.5 | 17.9 |
| 7-12 | 70 | 30 | 2.0 | 5.0 | 28.5 | 131.1 | 10.5 |
| 7-13 | 70 | 30 | 2.0 | 10.0 | 31.7 | 152.2 | 6.3 |
| Comparative Example | | | | | | | |
| 7-14 | 80 | 20 | 0 | 0 | 16.2 | 78.9 | unmeasureable |
| 7-15 | 80 | 20 | 1.0 | 0 | 16.7 | 80.1 | " |
| 7-16 | 30 | 0 | 0 | 14.0 | 58.8 | " | |
| 7-17 | 70 | 30 | 2.0 | 5.0 | 14.5 | 60.3 | " |
| 7-18 | 70 | 30 | 3.5 | 5.0 | 15.0 | 65.1 | " |

EXAMPLE 8-1

A reaction vessel made of a glass equipped with a thermometer, a stirrer, a reflux condenser, a nitrogen introducing pipe and a dropping funnel was charged with 8.0 parts of an emulsifier as shown in Table 8-1 and 150 parts of water to prepare a solution and the system was internally replaced with nitrogen gas. Separately, 156 parts of a mixture of unsaturated monomers comprising 75 parts of ethyl acrylate, 75 parts of methyl methacrylate, 4.5 parts of N-methylolacrylamide and 1.5 parts of water were prepared, and 15 parts of the mixture were added into the above reaction vessel and emulsified at 40° C. for 30 minutes. Next, after the temperature of the mixture was raised to 60° C., a solution of a polymerization initiator 2,2'-azobis(N,N'-dimethyleneisobutylamidine) hydrochloride dissolved in 48.5 parts of water to $9.0\times10^{-3}$ mole/liter-aqueous phase was added to the above reaction vessel, followed immediately by a continuous addition of the remainder of the unsaturated monomers to the reaction vessel over 30 minutes to carry out polymerization at 60° C. After completion of the dropwise addition of the unsaturated monomers, the mixture was subjected to aging at 60° C. for 60 minutes to prepare an aqueous emulsion.

The average particle size, crosslinkability, and glass transition temperature of the aqueous emulsion thus obtained were measured as mentioned before.

The film characteristics and performance of the aqueous emulsions were evaluated as follows.

An amount of 30 g of the aqueous emulsion adjusted to a solid content of 20% was cast uniformly on a glass plate 12 cm×14 cm, and dried in air at room temperature to form a film. The film was peeled from the glass plate, and the elongation, modulus strength, and tensile load at break were measured according to JIS K-6781.

Also, the properties of the aqueous emulsion, such as water resistance and adhesive force, were evaluated according to the following standards.

Water resistance: on the surface (5.0 cm×5.0 cm) of a mortar plate 5.0 cm×5.0 cm×1.0 cm was uniformly cast about 2.5 g of an aqueous emulsion adjusted to a solid content of 20%, followed by drying in air at room temperature, to form a film. Next, the mortar test strip was immersed in a laboratory dish filled with water at 20° C. for 28 days, and the state of the film formed on the mortar plate was observed and evaluated as follows.

o: film transparent and having good adhesiveness to mortar plate;

Δ: film translucent, but having good adhesiveness to mortar plate;

x: film whitened, and having inferior adhesiveness to mortar plate.

Adhesive force: by using a mortar plate 3.5 cm×2.5 cm×1.0 cm, the compression shear adhesive strength 7 days after coating about 0.05 g of the aqueous emulsion with a solid content of 40% by weight was measured according to JIS K-6852.

The results of an evaluation of the characteristics and performances of the films formed by the above aqueous emulsions of Example 8-1 are shown in Table 8-1.

Sample Nos. 1–4 are Examples of the present invention, and Sample Nos. 8-1 and 6 are Comparative Examples.

TABLE 8-1

| Sample No. | Emulsifier | Aqueous emulsion: Properties: Average particle size (nm) | Cross-linkability | Gloss transition temperature Tg (°C.) Calcd. | Found |
|---|---|---|---|---|---|
| Example | | | | | |
| 1 | Glycine chloride betaine ester of polyoxyethylene octylphenyl ether (EOP = 3) 4.0 parts<br>Dimethacrylate of polyoxypropylene polyoxyethylene glycol (POP = 3, EOP = 12) 4.0 parts | 55 | o | 30 | 23 |
| 2 | Glycine chloride-2-heptylundecyl ester 4.0 parts<br>Diacrylate of polyoxypropylene polyoxyethylene-bisphenol A ether (POP = 2, EOP = 9) 4.0 parts | 70 | o | 30 | 23 |
| 3 | Glycine chloride betaine ester of polyoxypropylene polyoxyethylene-lauryl ether (POP =0 2, EOP = 2) 5.0 parts<br>Dimethacrylate of polyoxyethylene glycol (EOP = 14) 3.0 parts | 73 | o | 30 | 23 |
| 4 | Alanyl chloride ester of polyoxypropylene polyoxyethylene nonylphenyl ether (POP = 1, EOP = 2) 4.0 parts<br>Tetramethacrylate of polyoxypropylene polyoxyethylene ethylenediamine (POP = 8.3, EOP = 5.7) 4.0 parts | 45 | o | 30 | 22 |
| Comparative Example | | | | | |
| 8-1* | Dimethacrylate of polyoxypropylene polyoxyethylene glycol (POP = 3, EOP = 12) 5.0 parts<br>Glycine chloride betaine ester of polyoxyethylene octylphenyl ether (POP = 1, EOP = 2) 3.0 parts | 250 | o | 30 | 24 |
| 6 | Sodium α-olefinic sulfonate with 16–18 carbon atoms 6.0 parts | 35 | x | 30 | 30 |

| Sample No. | Emulsifier | Film characteristics: Elongation (%) | Tensile strength: Strength (kg/cm$^2$) Break | Modulus 50% | Modulus 100% | Water resistance | Adhesive force |
|---|---|---|---|---|---|---|---|
| Example | | | | | | | |
| 1 | Glycine chloride betaine ester of polyoxyethylene octylphenyl ether (EOP = 3) 4.0 parts<br>Dimethacrylate of polyoxypropylene polyoxyethylene glycol (POP = 3, EOP = 12) 4.0 parts | 200 | 165 | 62 | 85 | o | 45 |
| 2 | Glycine chloride-2-heptylundecyl ester 4.0 parts<br>Diacrylate of polyoxypropylene polyoxyethylene-bisphenol A ether (POP = 2, EOP = 9) 4.0 parts | 180 | 140 | 58 | 82 | o | 41 |
| 3 | Glycine chloride betaine ester of polyoxypropylene polyoxyethylene-lauryl ether (POP =0 2, EOP = 2) 5.0 parts<br>Dimethacrylate of polyoxyethylene glycol (EOP = 14) 3.0 parts | 215 | 162 | 59 | 76 | o | 47 |
| 4 | Alanyl chloride ester of polyoxypropylene polyoxyethylene nonylphenyl ether (POP = 1, EOP = 2) 4.0 parts<br>Tetramethacrylate of polyoxypropylene polyoxyethylene diamine (POP = 8.3, EOP = 5.7) 4.0 parts | 231 | 188 61 | 82 | o | 51 | |
| Comparative Example | | | | | | | |
| 8-1* | Dimethacrylate of polyoxypropylene polyoxyethylene glycol glycol (POP = 3, EOP = 12) 5.0 parts<br>Glycine chloride betaine ester of polyoxyethylene octylphenyl ether (POP = 1, EOP = 2) 3.0 parts | 85 | 70 | 32 | — | Δ | 21 |
| 6 | Sodium α-olefinic sulfonate with 16–18 carbon atoms 6.0 parts | 120 | 82 | 10 | 13 | x | 23 |

*;Polymerization aging temperature: 75° C.

Next, the sealing materials of Sample Nos. 1–4 were applied uniformly on the rooftop floor of a newly built apartment house and dried in air at room temperature to form a coating, and then cement mortar was cast on the coating to a thickness of 1.5 cm as the rooftop floor finishing, and as a result, no water leakage was observed.

Also, at the water leakage sites of the apartment rooftop, cuttings, sash surroundings, underground walls and cuttings, and also water leakage sites in the bath room, the sealing materials of Sample Nos. 1–4 were injected and cured at room temperature to form resin layers. Consequently, water leakage from the above water leakage sites was stopped and the resulting water proofing effects were excellent.

EXAMPLE 8-2

An aqueous emulsion was prepared by emulsion polymerization in the same manner as in Example 8-1 by using 8.0 parts of the emulsifier as shown in Table 8-2, 157 parts of unsaturated monomers comprising 90 parts of ethyl acrylate, 60 parts of methyl methacrylate, 4.5 parts of N-methylolacrylic amide, and 2.5 parts of water, and a solution of polymerization initiators of $3.0\times10^{-3}$ mole/liter-aqueous phase of potassium persulfate, $3.0\times10^{3}$ mole/liter-aqueous phase of sodium thiosulfate, and $5.0\times10^{-5}$ mole/liter-aqueous phase of copper sulfate dissolved in 47.5 parts of water.

The properties of the aqueous emulsion thus obtained, and the characteristics and performances of the film formed by air drying at 20° C., were measured and evaluated as in Example 8-1. The results are shown in Table 8-2. Sample Nos. 7–10 are Examples of the present invention.

Subsequently, the properties of the aqueous emulsions of Sample Nos. 7–10 as a sealing material were evaluated in the same manner as in Example 8-1. Sample Nos. 7–10 all had a good water resistance and adhesive force, and excellent water proofing effects were obtained.

TABLE 8-2

| Sample No. | | Aqueous emulsion: Emulsifier | | Properties: Average particle size (nm) | Cross-linkability | Gloss transition temperature Tg (°C.): Calcd. | Found | Film characteristics: Elongation (%) | Tensile strength: Strength (Kg/cm²): Break | Modulus: 100% | 200% | Performance: Water resistance | Adhesiveness |
|---|---|---|---|---|---|---|---|---|---|---|---|---|---|
| Example | 7 | 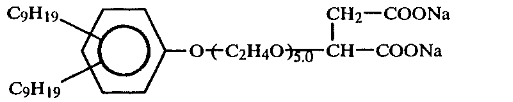 | 4.0 parts | 79 | o | 18 | 13 | 345 | 82 | 67 | 72 | o | 38 |
| | | Dimethacrylate of polyoxypropylene polyoxyethylene glycol (POP ÷ 3, EOP = 12) | 4.0 parts | | | | | | | | | | |
| | 8 | 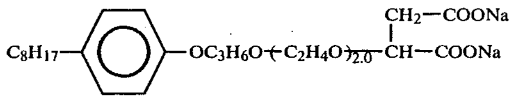 | 4.0 parts | 43 | o | 18 | 14 | 307 | 70 | 56 | 59 | o | 37 |
| | | Diacrylate of polyoxypropylene polyoxyethylene-bisphenol A ether (POP = 2, EOP = 9) | 4.0 parts | | | | | | | | | | |
| | 9 | 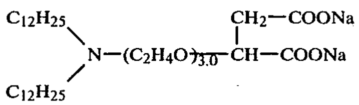 | 6.0 parts | 57 | o | 18 | 12 | 296 | 67 | 53 | 57 | o | 40 |
| | | Dimethacrylate of polyoxyethylene glycol (EOP = 14) | 2.0 parts | | | | | | | | | | |
| | 10 | 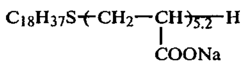 | 6.0 parts | 82 | o | 18 | 12 | 277 | 65 | 49 | 52 | o | 36 |
| | | Dimethacrylate of polyoxypropylene polyoxyethylene (POP = 8.3, EOP = 5.7) | 2.0 parts | | | | | | | | | | |

EXAMPLE 9-1

The aqueous polymer emulsions obtained in Example 1-1 were used for the evaluation thereof as a non-woven fabric binder.

A 51 mm fibrous layer of rayon, 2 denier to about 30 $g/m^2$, was formed into a wave with the standard roller card. On the fibrous layer was printed lines comprising horizontal wavy lines at 6/inch of about 0.7 $g/m^2$ of the aqueous emulsion shown in Table 1. Subsequently, the fibrous layer was dried in a hot dryer at 80° to 110° C. to prepare a non-woven fabric.

The appearance, water resistance, and solvent resistance of the non-woven fabric thus obtained were evaluated according to the following standards.

Appearance: judged by a comparison of the luster between the non-woven fabric and the fibrous layer after preparation with the roller card.

o: luster equally excellent;

Δ: luster of non-woven fabric slightly inferior;

x: luster of non-woven fabric inferior.

Water resistance and solvent resistance: the non-woven fabric was cut to a size of 2.0 cm×15 cm, immersed in a laboratory dish filled with water or a petroleum solvent at 20° C. for 48 hours, and the non-woven fabric test strip was dried at a temperature of 50° to 60° C., under a reduced pressure of 50 to 100 mm Hg in a vacuum dryer. The appearance and the mechanical stretch (i.e., tensile strength) of the test strip were measured and compared with the measurement results of the test strip before immersion, for evaluation according to the following standards.

Appearance:

o: luster is the same as before immersion, and form retentivity of test strip is good;

Δ: luster is slightly reduced compared with before immersion, and form retentivity of test strip is inferior;

x: there is no luster compared with before immersion, and form retentivity of test strip is bad.

Tensile strength:

o: lowering in tensile strength is less than 20%;

Δ:lowering in tensile strength is 20% to less than 50%;

x: lowering in tensile strength is 50% or higher.

The properties of the aqueous emulsion, the characteristics of the film and performances as the non-woven fabric were measured according to the above methods. The results are shown in Table 9-1.

The Sample Nos. 1–4 are examples of the present invention, and it is clear that they exhibit excellent effects as the binder for non-woven fabric. Also, these samples were found to be good without generating bad odors which will worsen the working environment during working, and without any yellow decoloration. Sample Nos. 5–7 are Comparative Examples.

TABLE 9-1

| Sample No. | Evaluation of Non-Woven Fabric | | | | |
|---|---|---|---|---|---|
| | | Water resistance | | Solvent resistance | |
| | Appearance | Appearance | Tensile strength | Appearance | Tensile strength |
| Example | | | | | |
| 1 | o | o | o | o | o |
| 2 | o | o | o | o | o |
| 3 | o | o | o | o | o |
| 4 | o | o | o | o | o |
| Comparative Example | | | | | |
| 5 | Δ | Δ | Δ | x | x |
| 6 | Δ | x | x | x | x |
| 7 | x | x | x | Δ | Δ |

EXAMPLE 9-2

The properties of the aqueous emulsion obtained in Example 1-2, the characteristics of the film formed by air drying at 20° C., the performances as the non-woven fabric binder were measured and evaluated as in Example 9-1. The results are shown in Table 9-2. Sample Nos. 8–11 are Examples of the present invention, and Sample Nos. 12–14 and 14' are Comparative Examples.

TABLE 9-2

| Sample No. | Evaluation of Non-woven Fabric | | | | |
|---|---|---|---|---|---|
| | | Water resistance | | Solvent resistance | |
| | Appearance | Appearance | Tensile strength | Appearance | Tensile strength |
| Example4 | | | | | |
| 8 | o | o | o | o | o |
| 9 | o | o | o | o | o |
| 10 | o | o | o | o | o |
| 11 | o | o | o | o | o |
| Comparative Example | | | | | |
| 12 | Δ | Δ | Δ | x | x |
| 13 | Δ | x | x | x | x |
| 14 | x | x | x | Δ | Δ |
| 14' | Δ | Δ | Δ | Δ | Δ |

EXAMPLE 9-3

The properties of the aqueous emulsion obtained in Example 1-3, the characteristics of the film obtained by air drying at 20° C., and the performances as the non-woven fabric were measured as in Example 9-1. The results are shown in Table 9-3.1

Sample Nos. 15, 16, 17, 19, 20 and 21 are Examples of the present invention, and Sample Nos. 18 and 22 are Comparative Examples.

TABLE 9-3

| | Evaluation of Non-woven Fabric | | | | |
|---|---|---|---|---|---|
| | | Water resistance | | Solvent resistance | |
| Sample No. | Appearance | Appearance | Tensile strength | Appearance | Tensile strength |
| 15 | o | o | o | o | o |
| 16 | o | o | o | o | o |
| 17 | o | o | o | o | o |
| 19 | o | o | o | o | o |
| 20 | o | o | o | o | o |
| 21 | o | o | o | o | o |

EXAMPLE 9-4

The aqueous polymer emulsions obtained in Example 1-4 were evaluated as the non-woven fabric binder in the same manner as in Example 9-1.

The results are shown in Table 9-4.

TABLE 9-4

| | Evaluation of Non-woven Fabric | | | | |
|---|---|---|---|---|---|
| | | Water resistance | | Solvent resistance | |
| Sample No. | Appearance | Appearance | Tensile strength | Appearance | Tensile strength |
| 23 | o | o | o | o | o |
| 24 | o | o | o | o | o |
| 25 | o | o | o | o | o |
| 26 | o | o | o | o | o |
| 27 | o | o | o | o | o |
| 28 | o | o | o | o | o |
| 29 | o | o | o | o | o |
| 30 | o | o | o | o | o |
| 31 | o | o | o | o | o |
| 32 | o | o | o | o | o |
| 33 | o | o | o | o | o |
| 34 | o | o | o | o | o |

EXAMPLE 10-1

The aqueous emulsions obtained in Example 1-1 were used for the evaluation thereof as a fiber working agent.

Pleated skirts of twill fabrics comprising 100% wool and wool/polyester (50/50) were each attached at the folded portions on one side thereof with the aqueous emulsion 1 to a solid concentration of 3 g/m$^2$ by spraying, and ironing was performed on a pad to effect folding, thereby applying resin working at the folded portion. Resin working was also applied at the folded portion on the opposite side, according to the same method.

Subsequently, the appearance, washing resistance and cleaning resistance of the folded portion of the fabric obtained, were evaluated according to the following standards.

Appearance: luster inherent in twill fabric of wool and wool/polyester at the folded portion applied with resin working was judged by visual observation, and evaluated according to the following standards:

o: excellent luster;

Δ: slightly reduced luster;

x: inferior luster.

Washing resistance, cleaning resistance; after the inner angle of the folded portion of the resin worked fabric was measured according to JIS-L-1041, the fabric was immersed in water or a petroleum solvent at 20° C. for 2 hours, and the operation of performing dehydration (desolventization) and drying was repeated 20 times before measurement of the inner angle at the folded portion. An evaluation of the inner angle of 28 when applied with resin working was made according to the following standards:

o: inner angle less than 50;

Δinner angle of 50–89;

x: inner angle of 90 or more.

The properties of the aqueous emulsion, the characteristics of the film, and performances as the fiber working agent were measured according to the above methods. The results are shown in Table 10-1.

The Sample Nos. 1–4 are Examples of the present invention, and it is clear that they exhibit excellent effects as the fiber working agent. Also, these samples were found to be good without generating bad odors which will worsen the working environment during working, and without any yellow decoloration. Sample Nos. 5–7 are Comparative Examples.

TABLE 10-1

| | Evaluation of | | |
|---|---|---|---|
| Sample No. | Appearance | Washing resistance (water) | Cleaning resistance (petroleum solvent) |
| Example 1 | o | o | o |
| 2 | o | o | o |
| 3 | o | o | o |
| 4 | o | o | o |
| Comparative Example 5 | Δ | Δ | x |
| 6 | Δ | x | x |
| 7 | x | x | Δ |

EXAMPLE 10-2

The properties of the aqueous emulsion obtained in Example 1-2, the characteristics of the film formed by air drying at 20° C., and the performances as the fiber working agent were measured and evaluated as in Example 10-1. The results are shown in Table 10-2. Sample Nos. 8–11 are Examples of the present invention, and Sample Nos. 12–14 and 14′ are Comparative Examples.

TABLE 10-2

| | Evaluation of fiber working agent | | |
|---|---|---|---|
| Sample No. | Appearance | Washing resistance (water) | Cleaning resistance (petroleum solvent) |
| Example 8 | o | o | o |
| 9 | o | o | o |
| 10 | o | o | o |
| 11 | o | o | o |
| Comparative Example 12 | Δ | Δ | x |
| 13 | Δ | x | x |
| 14 | x | x | Δ |
| 14′ | Δ | Δ | Δ |

EXAMPLE 10-3

The properties of the aqueous emulsion obtained in Example 1-3, the characteristics of the film obtained by air drying at 20° C., and the performances as the fiber working agent were measured as in Example 10-1. The results are shown in Table 10-3.

Sample Nos. 15, 16, 17, 19, 20 and 21 are Examples of the present invention, and Sample Nos. 18 and 22 are Comparative Examples.

TABLE 10-3

| | Evaluation of fiber working agent | | |
|---|---|---|---|
| Sample No. | Appearance | Washing resistance (water) | Cleaning resistance (petroleum solvent) |
| 15 | o | o | o |
| 16 | o | o | o |
| 17 | o | o | o |
| 19 | o | o | o |
| 20 | o | o | o |
| 21 | o | o | o |

EXAMPLE 10-4

The aqueous emulsions obtained in Example 1-4 were evaluated as the fiber working agent in the same manner as in Example 10-1.

The results are shown in Table 10-4.

TABLE 10-4

| | Evaluation of fiber working agent | | |
|---|---|---|---|
| Sample No. | Appearance | Washing resistance (water) | Cleaning resistance (petroleum solvent) |
| 23 | o | o | o |
| 24 | o | o | o |
| 25 | o | o | o |
| 26 | o | o | o |
| 27 | o | o | o |
| 28 | o | o | o |
| 29 | o | o | o |
| 30 | o | o | o |
| 31 | o | o | o |
| 32 | o | o | o |
| 33 | o | o | o |
| 34 | o | o | o |

EXAMPLE 11-1

The aqueous emulsions obtained in Example 1-1 were evaluated as a reinforced glass fiber for optical transmission.

Glass fiber with an outer diameter of about 130 μm was coated by a vertical coating device with the aqueous emulsion of Sample Nos. 1–7 in Table 1-1 to a coating thickness of 4 μm and dried to obtain a reinforced glass fiber for optical transmission.

The appearance, water resistance, elongation and strength of the reinforced glass fiber for optical transmission were evaluated according to the following standards.

Appearance: the state of the coated film formed on the outer circumference of the glass fiber was visually judged.

o: coated film uniform and has good transparency and luster;

Δ: coated film uniform, but slightly reduced transparency and luster;

x: coated film is nonuniform and has inferior transparency and luster.

Water resistance: a part of the reinforced fiber for optical transmission was immersed in a laboratory dish filled with water at 20° C. for 6 months and the states of the immersed portion and the unimmersed portion were visually judged.

o: no difference in appearance between the immersed portion and the unimmersed portion, and a good coated film is formed;

Δ: immersed portion exhibits slight blooming, compared with unimmersed portion;

x: immersed portion is whitened, and the coated film can be easily peeled from the glass fiber.

Elongation and strength: the reinforced glass fiber for optical transmission was subjected to a tensile test at a speed of 10 mm/min., and the strength and elongation at break were measured to the following standards:

The properties of the aqueous emulsion, the characteristics of the film and performances as the reinforced glass fiber for optical transmission were evaluated according to the above methods. The results are shown in Table 11-1.

The Sample Nos. 1–4 are Examples of the present invention, and it is clear that the reinforced glass fiber for optical transmission has a good appearance and an excellent water resistance and mechanical strength. Also, these samples were found to be good without generating bad odors which will worsen the working environment during working, and without yellow decoloration. Sample Nos. 5–7 are Comparative Examples.

TABLE 11-1

| | | Evaluation of reinforced glass fiber for optical transmission | | | | |
|---|---|---|---|---|---|---|
| | | | Water | Tensile strength | | |
| Sample | | Appear- | resis- | Elongation | Break strength | |
| No. | | ance | tance | (%) | (kg) | ($Kg/mm^2$) |
| Example | 1 | o | o | 2.36 | 2.2 | 166 |
| | 2 | o | o | 2.26 | 2.1 | 158 |
| | 3 | o | o | 2.47 | 2.3 | 173 |
| | 4 | o | o | 2.51 | 2.4 | 181 |
| Comparative Example | 5 | Δ | Δ | 1.92 | 1.0 | 121 |
| | 6 | Δ | x | 1.20 | 0.9 | 68 |
| | 7 | x | x | 1.50 | 1.0 | 75 |

EXAMPLE 11-2

The properties of the aqueous emulsion obtained in Example 1-2, the characteristics of the film formed by air drying at 20° C. and performances as the reinforced glass fiber for optical transmission were measured and evaluated as in Example 11-1. The results are shown in the Table 11-2. Sample Nos. 8–11 are Examples of the present invention, and Sample Nos. 12–14 and 14' are Comparative Examples.

TABLE 11-2

| | | Evaluation of reinforced glass fiber for optical transmission | | | | |
|---|---|---|---|---|---|---|
| | | | Water | Tensile strength | | |
| Sample | | Appear- | resis- | Elongation | Break strength | |
| No. | | ance | tance | (%) | (kg) | ($Kg/mm^2$) |
| Example | 8 | o | o | 2.68 | 2.1 | 156 |
| | 9 | o | o | 2.39 | 2.1 | 159 |
| | 10 | o | o | 2.30 | 2.0 | 151 |
| | 11 | o | o | 2.16 | 2.0 | 149 |
| Comparative Example | 12 | Δ | Δ | 0.80 | 0.9 | 68 |
| | 13 | Δ | x | 1.03 | 1.0 | 77 |
| | 14 | x | x | 1.27 | 1.2 | 90 |
| | 14' | Δ | Δ | 1.46 | 1.3 | 98 |

EXAMPLES 11-3

The properties of the aqueous emulsion obtained in Example 1-3, the characteristics of the film obtained by air drying at 20° C. and the performances as the reinforced glass fiber for optical transmission were measured as in Example 11- 1. The results are shown in Table 11-3.

Sample Nos. 15, 16, 17, !9, 20 and 21 are Examples of the present invention, and Sample Nos. 18 and 22 are Comparative Examples.

TABLE 11-3

| | Evaluation of reinforced glass fiber for optical transmission | | | | |
|---|---|---|---|---|---|
| | | Water | Tensile strength | | |
| Sample | Appear- | resis- | Elongation | Break strength | |
| No. | ance | tance | (%) | (kg) | ($Kg/mm^2$) |
| 15 | o | o | 2.24 | 2.1 | 160 |
| 16 | o | o | 2.36 | 2.2 | 165 |
| 17 | o | o | 2.47 | 2.4 | 184 |
| 19 | o | o | 2.53 | 2.5 | 192 |
| 20 | o | o | 2.44 | 2.3 | 173 |
| 21 | o | o | 2.39 | 2.2 | 165 |

EXAMPLE 11-4

The aqueous polymer emulsions obtained in Example 1-4 were evaluated in the same manner as in Example 11-1.

The results are shown in Table 11-4.

TABLE 11-4

| | Evaluation of reinforced glass fiber for optical transmission | | | | |
|---|---|---|---|---|---|
| | | Water | Tensile strength | | |
| Sample | Appear- | resis- | Elongation | Break strength | |
| No. | ance | tance | (%) | (kg) | ($Kg/mm^2$) |
| 23 | o | o | 2.29 | 2.4 | 180 |
| 24 | o | o | 2.32 | 2.5 | 187 |
| 25 | o | o | 2.34 | 2.6 | 197 |
| 26 | o | o | 2.36 | 2.6 | 196 |
| 27 | o | o | 2.27 | 2.2 | 166 |
| 28 | o | o | 2.30 | 2.3 | 177 |
| 29 | o | o | 2.31 | 2.3 | 171 |
| 30 | o | o | 2.34 | 2.4 | 184 |
| 31 | o | o | 2.37 | 2.2 | 169 |
| 32 | o | o | 2.40 | 2.4 | 180 |
| 33 | o | o | 2.38 | 2.3 | 173 |
| 34 | o | o | 2.41 | 2.4 | 182 |

EXAMPLE 12-1

The aqueous polymer emulsions obtained in Example 1-1 were evaluated as the composition for reinforcing inorganic molded material.

A mortar plate of 5.0 cm×5.0 cm×1.0 cm (cement/fine aggregate=½ weight ratio) was decontaminated by washing with an aqueous polyoxyethylene nonylphenyl ether (EOP=9.7) solution, washed with water, and then dried in air at room temperature. Subsequently, the mortar plate was immersed in a laboratory dish fill with the aqueous emulsion in Table 12-1 controlled to a solid concentration of 20% for 5 minutes, removed from the laboratory dish, and dried in air at 25° C.

Next, for the polymer-impregnated mortar plate, the appearance (luster), water resistance, acid resistance, alkali resistance, solvent resistance and impact resistance were evaluated according to the following standards.

Appearance (luster):

o: mortar plate surface has the same luster as before immersion in the aqueous emulsion;

Δ: mortar plate surface has an inferior luster, and the coating has streaks in the shape of a network;

x: mortar plate surface does not have luster inherent in mortar plate.

Water resistance, acid resistance, alkali resistance and solvent resistance: polymer-impregnated mortar plate was immersed in a laboratory dish filled with deionized water, 1% of aqueous sulfuric acid, 1% of aqueous sodium hydroxide and benzene at 25° C. for 6 months.

Subsequently, the water resistance, acid resistance, alkali resistance and solvent resistance were evaluated according to the following standards.

o: no whitening, blistering peeling on the mortar plate surface;

Δslight whitening, blistering, peeling on the mortar plate surface;

x: heavy whitening, blistering, peeling on the mortar plate surface.

Impact resistance: the polymer-impregnated mortar plate provided for the judgement of water resistance, acid resistance, alkali resistance and solvent resistance was dried in air at 25° C., dehydrated, desolventized, and thereafter, evaluated according to the JIS K-5400 as follows:

o: no cracks on the mortar plate;

Δ: slight cracking on the mortar plate;

x: mortar plate heavily cracked.

The Sample Nos. 1–4 are Examples of the present invention, and it is clear that the reinforced inorganic material molding of the present invention exhibits excellent effects. Also, the aqueous emulsions used in the present invention were found to be good without generating bad odors which will worsen the working environment during working, and without yellow decoloration. Sample Nos. 5–7 are Comparative Examples.

TABLE 12-1

| | Evaluation of reinforced water bardenable inorganic material molding | | | | | | | | |
|---|---|---|---|---|---|---|---|---|---|
| | | | | | | Impact resistance | | | |
| Sample No. | Appearance (luster) | Water resistance | Acid resistance | Alkali resistance | Solvent resistance | Deionized water | Acid | Alkali | Solvent |
| Example 1 | o | o | o | o | o | o | o | o | o |
| 2 | o | o | o | o | o | o | o | o | o |
| 3 | o | o | o | o | o | o | o | o | o |
| 4 | o | o | o | o | o | o | o | o | o |
| Comparative Example 5 | Δ | Δ | Δ | Δ | x | Δ | Δ | Δ | x |
| 6 | Δ | x | x | x | x | x | x | x | x |
| 7 | x | x | x | x | Δ | x | x | x | Δ |

EXAMPLE 12-2

Materials used in this Examples.

cement: portland cement produced by Nippon Cement K.K. (specific gravity 3.16);

fine aggregate: river sand produced from Fuji River (surface dry specific gravity 2.61, coarse grain ratio 2.61);

coarse aggregate: gravel produced from Fuji River (surface dry specific gravity 2.66, maximum dimension 20 mm) was used, and the respective materials with the recipe having the following formula were charged into a slantable mixer and kneaded for 3 minutes.

| Amount used ($Kg/m^3$) | | | | Water/cement | Fine aggregate |
|---|---|---|---|---|---|
| Cement | Fine aggregate | Coarse aggregate | Water | ratio W/C (wt %) | ratio S/a (wt %) |
| 440 | 680 | 1050 | 206 | 46.7 | 39.3 |

Subsequently, with a framework for a Hume pipe having reinforcing rods composed of subordinate rods, spiral rods and oblique rods assembled in a framework carried on rollers of a pipe making machine, the above mixed starting materials were charged while rotating the framework, and finished by rotation until the inner surface of the framework became smooth.

This surface was subjected to steam curing, then demolded, cured in water, and thereafter, the inner surface of the Hume pipe was impregnated with the aqueous emulsion of Sample Nos. 1–4 prepared in Example 1 (solid concentration: 40%) to a solid concentration of 2.5 $Kg/m^2$, followed by natural drying to prepare a reinforced Hume pipe.

These reinforced Hume pipes proved to have a good resistance to corrosion by industrial wastewater and domestic wastewater for many years.

EXAMPLE 12-3

The properties of the aqueous emulsions obtained in Example 1-2, the characteristics of the film formed by air drying at 20° C. and performances as the reinforced water hardenable inorganic material molding were measured and evaluated as in Example 12-1. The results are shown in Table 12-2. Sample Nos. 8–11 are Examples of the present invention, and Sample Nos 12–14 and 14' are Comparative Examples.

TABLE 12-2

| Sample No. | Evaluation of reinforced water bardenable inorganic material molding | | | | | | | | |
|---|---|---|---|---|---|---|---|---|---|
| | | | | | | Impact resistance | | | |
| | Appearance (luster) | Water resistance | Acid resistance | Alkali resistance | Solvent resistance | Deionized water | Acid | Alkali | Solvent |
| Example | | | | | | | | | |
| 8 | O | O | O | O | O | O | O | O | O |
| 9 | O | O | O | O | O | O | O | O | O |
| 10 | O | O | O | O | O | O | O | O | O |
| 11 | O | O | O | O | O | O | O | O | O |
| Comparative Example | | | | | | | | | |
| 12 | Δ | Δ | Δ | Δ | X | Δ | Δ | Δ | X |
| 13 | Δ | X | X | X | X | X | X | X | X |
| 14 | X | X | X | X | Δ | X | X | X | Δ |
| 14' | Δ | Δ | X | Δ | Δ | Δ | X | Δ | Δ |

EXAMPLE 12-4

The properties of the aqueous emulsion obtained in Example 1-3, the characteristics of the film obtained by air drying at 20° C. and the performances as the reinforced water hardenable inorganic material molding were measured as in Example 12-1. The results are shown in Table 12-3.

Sample Nos. 15, 16, 17, 19, 20 and 21 are Examples of the present invention, and Sample Nos. 18 and 22 are Comparative Examples.

TABLE 12-3

| Sample No. | Evaluation of reinforced water bardenable inorganic material molding | | | | | | | | |
|---|---|---|---|---|---|---|---|---|---|
| | | | | | | Impact resistance | | | |
| | Appearance (luster) | Water resistance | Acid resistance | Alkali resistance | Solvent resistance | Deionized water | Acid | Alkali | Solvent |
| 15 | O | O | O | O | O | O | O | O | O |
| 16 | O | O | O | O | O | O | O | O | O |
| 17 | O | O | O | O | O | O | O | O | O |
| 19 | O | O | O | O | O | O | O | O | O |
| 20 | O | O | O | O | O | O | O | O | O |
| 21 | O | O | O | O | O | O | O | O | O |

EXAMPLE 12-5

The aqueous polymer emulsions obtained in Example 1-4 were evaluated in the same manner as in Example 12-1.

The results are shown in Table 12–4.

TABLE 12-4

| Sample No. | Evaluation of reinforced water bardenable inorganic material molding | | | | | | | | |
|---|---|---|---|---|---|---|---|---|---|
| | | | | | | Impact resistance | | | |
| | Appearance (luster) | Water resistance | Acid resistance | Alkali resistance | Solvent resistance | Deionized water | Acid | Alkali | Solvent |
| 23 | O | O | O | O | O | O | O | O | O |
| 24 | O | O | O | O | O | O | O | O | O |
| 25 | O | O | O | O | O | O | O | O | O |
| 26 | O | O | O | O | O | O | O | O | O |

TABLE 12-4-continued

| Sample No. | Evaluation of reinforced water bardenable inorganic material molding: Appearance (luster) | Water resistance | Acid resistance | Alkali resistance | Solvent resistance | Impact resistance: Deionized water | Acid | Alkali | Solvent |
|---|---|---|---|---|---|---|---|---|---|
| 27 | O | O | O | O | O | O | O | O | O |
| 28 | O | O | O | O | O | O | O | O | O |
| 29 | O | O | O | O | O | O | O | O | O |
| 30 | O | O | O | O | O | O | O | O | O |
| 31 | O | O | O | O | O | O | O | O | O |
| 32 | O | O | O | O | O | O | O | O | O |
| 33 | O | O | O | O | O | O | O | O | O |
| 34 | O | O | O | O | O | O | O | O | O |

EXAMPLE 13-1

The aqueous polymer emulsions obtained in Example 1-1 were evaluated as an electroconductive film forming material.

To 53.6 parts of the aqueous emulsion in Example 1-1 to 40% of the solid concentration, 21.2 parts of 1% of ammonia water and 59.8 parts of water were added 50 parts of electrolytic copper powder (350 mesh pass), and the mixture was dispersed in a ball mill to prepare an electroconductive lamination slurry.

The electroconductive layer forming slurry was coated by a knife coater on the surface of a polyester base film with a thickness of 21 μm to a thickness of the electroconductive layer of 10 μm and dried at 80° C. for 5 minutes, followed by heat treatment at 150° C. for 5 minutes to obtain an electroconductive film.

The electroconductive film was evaluated for luster, water resistance, solvent resistance, impact resistance, weathering resistance (frictional reduction), stretchability, surface electrical resistivity value, and shielding effect.

Luster: dispersibility of copper powder and state of luster on the electroconductive layer surface were visually judged.

o: copper powder is uniformly dispersed, and luster is excellent;

Δ: dispersibility of copper powder and luster are slightly inferior;

x: dispersibility of copper powder is bad, and luster is inferior.

Water resistance: the electroconductive film was cut to 2 cm×4 cm, the test strip was placed in a test tube filled with water at 20° C., stoppered, immersed for one month, and the state of the test strip was visually judged.

o: appearance of test strip is equal to that before immersion and there is no peeling between the base film and the electroconductive film;

Δ: test strip is slightly whitened, but no peeling occurs between the base film and the electroconductive layer;

x: test strip is whitened, and peeling readily occurs between the base film and the electroconductive film.

Solvent resistance: the electroconductive film was cut to 2 cm×4 cm to make a test strip, the test strip is placed in a test tube filled with benzene at 20° C., and after sealing immersed for one month, and the state of the test was visually judged.

o: electroconductive layer of test strip slightly swollen, but no peeling between the layer and the base film;

Δ: electroconductive layer of test strip is swollen, and peeling occurs between the layer and the base film;

x: electroconductive layer of test strip is dissolved.

Abrasion characteristic: a certain length of the electroconductive film was connected in a loop, and run at a 38 cm/sec. while in frictional contact with a magnetic head for one hour before the measurement of a frictional reduction of the electroconductive film.

Stretchability: the electroconductive film was cut to a size of 5.0 cm×0.5 cm×31 μm, and stress was applied on the test strip by a tensile tester until an elongation of 50% was exhibited, and the state of deformation (strain) after relaxation was observed for evaluation of the following.

o: adhesiveness between the base substrate film and the electroconductive layer is good, with no deformation of test strip observed;

x: adhesiveness between the base film substrate and the electroconductive layer is slightly reduced, with distortion or deformation in dimensional stability of test strip observed.

Impact resistance: a test panel of ABS resin plate of 7.6 cm×2.6 cm×0.5 cm was washed with 0.5% by weight of an aqueous solution of polyoxyethylene nonyl phenyl ether (P=9.7), dried in air at room temperature, and coated uniformly by a knife coater with the above electroconductive layer forming slurry to a thickness of the electroconductive layer of 0.2 mm. Subsequently, the coating was dried in air at 25° C. to provide an electroconductive laminate.

Subsequently, using the electroconductive laminate, the impact resistance was evaluated according to the impact resistance test method A of JIS K-5400, and according to the following standards.

o: no cracks or peeling at laminate;

Δ: slight cracking or peeling at laminate;

x: heavy cracking or peeling at laminate.

Volume resistivity and shielding effect: the above electroconductive layer forming slurry was molded into a plate to a thickness of 1 mm and 15 cm square. The molding obtained was left to stand in a thermostat-humidistat chamber at 20° C., 60% RH for one week and the volume resistivity value was measured according to SRIS 2301 of the Japanese Rubber Association Standard, and the shielding effect was measured by a TR-4172 produced by Takeda Riken.

The Sample Nos. 1–4 are Examples of the present invention, and it can be understood that they exhibit excellent effects as the material for forming electroconductive film. Also, these samples were found to be good without generating bad odors which will worsen the working environment during working, and without yellow discoloration. Sample Nos. 5–7 are Comparative Examples.

TABLE 13-1

| Sample No. | Evaluation of electroconductive laminate: Electroconductive layer performance: Luster | Water resistance | Solvent resistance | Frictional reduction | Stretch-ability | Impact resistance | Electroconductivity: Volume resistivity (Ω cm) | Shielding effect (dB) |
|---|---|---|---|---|---|---|---|---|
| Example | | | | | | | | |
| 1 | O | O | O | 75 | O | O | $9.5 \times 10^{-3}$ | 71 |
| 2 | O | O | O | 74 | O | O | $9.4 \times 10^{-3}$ | 72 |
| 3 | O | O | O | 76 | O | O | $1.1 \times 10^{-2}$ | 68 |
| 4 | O | O | O | 80 | O | O | $1.6 \times 10^{-2}$ | 67 |
| Comparative Example | | | | | | | | |
| 5 | Δ | Δ | Δ | 107 | X | Δ | $5.6 \times 10^{-2}$ | 55 |
| 6 | Δ | X | X | 139 | X | X | $9.9 \times 10^{-2}$ | 50 |
| 7 | X | X | Δ | 116 | X | Δ | $4.7 \times 10^{-2}$ | 53 |
| Reference Example*[1] | — | — | — | 100 | — | — | — | — |

*[1]Electroconductive laminate was prepared from vinyl chloride - vinyl acetate copolymer with ethyl acetate as the binding component.

EXAMPLE 13-2

The properties of the aqueous emulsion obtained in Example 1-2, the characteristics of the film formed by air drying at 20° C. and performances as the material for forming electroconductive film were measured and evaluated as in Example 1. The results are shown in Table 13-2. Sample Nos. 8–11 are Examples of the present invention, and Sample Nos. 12–14 and 14' are Comparative Examples.

TABLE 13-2

| Sample No. | Evaluation of electroconductive laminate: Electroconductive layer performance: Luster | Water resistance | Solvent resistance | Frictional reduction | Stretch-ability | Impact resistance | Electroconductivity: Volume resistivity (Ω cm) | Shielding effect (dB) |
|---|---|---|---|---|---|---|---|---|
| Example | | | | | | | | |
| 8 | O | O | O | 76 | O | O | $1.9 \times 10^{-2}$ | 66 |
| 9 | O | O | O | 72 | O | O | $1.6 \times 10^{-2}$ | 67 |
| 10 | O | O | O | 74 | O | O | $1.1 \times 10^{-2}$ | 68 |
| 11 | O | O | O | 75 | O | O | $2.3 \times 10^{-2}$ | 65 |
| Comparative Example | | | | | | | | |
| 12 | Δ | Δ | Δ | 115 | X | Δ | $4.1 \times 10^{-2}$ | 56 |
| 13 | Δ | X | X | 142 | X | X | $8.5 \times 10^{-2}$ | 53 |
| 14 | X | X | Δ | 124 | X | Δ | $4.2 \times 10^{-2}$ | 56 |
| 14' | Δ | Δ | O | 94 | X | Δ | $3.9 \times 10^{-2}$ | 60 |

EXAMPLE 13-3

The properties of the aqueous emulsion obtained in Example 1-3, the characteristics of the film obtained by air drying at 20° C. and the performances as the fiber working agent were measured as in Example 13-1. The results are shown in Table 13-3.

Sample Nos. 15, 16, 17, 19, 20 and 21 are Examples of the present invention, and Sample Nos. 18 and 22 are Comparative Examples.

TABLE 13-3

| Sample No. | Evaluation of electroconductive laminate: Electroconductive layer performance: Luster | Water resistance | Solvent resistance | Frictional reduction | Stretch-ability | Impact resistance | Electroconductivity: Volume resistivity (Ω cm) | Shielding effect (dB) |
|---|---|---|---|---|---|---|---|---|
| 15 | O | O | O | 70 | O | O | $1.8 \times 10^{-2}$ | 66 |
| 16 | O | O | O | 68 | O | O | $1.7 \times 10^{-2}$ | 67 |
| 17 | O | O | O | 64 | O | O | $9.0 \times 10^{-3}$ | 72 |
| 19 | O | O | O | 67 | O | O | $1.9 \times 10^{-2}$ | 66 |
| 20 | O | O | O | 71 | O | O | $1.6 \times 10^{-2}$ | 67 |
| 21 | O | O | O | 66 | O | O | $9.5 \times 10^{-3}$ | 71 |

EXAMPLE 13-4

The aqueous emulsions obtained in Example 1-4 were evaluated in the same manner as in Example 13-1.

The results are shown in Table 13–4. Sample Nos. 23–34 are Examples of the present invention.

TABLE 13-4

| Sample No. | Evaluation of electroconductive laminate | | | | | | | |
|---|---|---|---|---|---|---|---|---|
| | Electroconductive layer performance | | | | | | Electroconductivity | |
| | Luster | Water resistance | Solvent resistance | Frictional reduction | Stretch-ability | Impact resistance | Volume resistivity (Ω cm) | Shielding effect (dB) |
| 23 | O | O | O | 71 | O | O | $1.0 \times 10^{-2}$ | 68 |
| 24 | O | O | O | 68 | O | O | $0.9 \times 10^{-2}$ | 68 |
| 25 | O | O | O | 70 | O | O | $9.2 \times 10^{-3}$ | 71 |
| 26 | O | O | O | 72 | O | O | $1.5 \times 10^{-2}$ | 67 |
| 27 | O | O | O | 64 | O | O | $9.6 \times 10^{-3}$ | 71 |
| 28 | O | O | O | 66 | O | O | $1.0 \times 10^{-2}$ | 68 |
| 29 | O | O | O | 68 | O | O | $0.5 \times 10^{-2}$ | 70 |
| 30 | O | O | O | 70 | O | O | $1.4 \times 10^{-2}$ | 68 |
| 31 | O | O | O | 73 | O | O | $0.8 \times 10^{-3}$ | 68 |
| 32 | O | O | O | 71 | O | O | $9.5 \times 10^{-3}$ | 71 |
| 33 | O | O | O | 68 | O | O | $0.6 \times 10^{-2}$ | 68 |
| 34 | O | O | O | 70 | O | O | $0.2 \times 10^{-2}$ | 70 |

EXAMPLE 14-1

The aqueous polymer emulsions obtained in Example 1-1 were evaluated as a film coating agent for coated paper.

(1) Evaluation of heat-sensitive recording paper:

Using Sample Nos. 1–7 in Table 1-1, the solid content was controlled to 20% to form a coated film forming agent, and the liquid A and the liquid B shown below were separately dispersed in a ball mill for 5 minutes, followed by mixing both together, to prepare a coating liquid for each heat-sensitive recording paper. Each coating liquid had a low viscosity with a good fluidity.

| | % |
|---|---|
| Liquid A: | |
| Coated film forming agent (solid: 20%) | 20 |
| Crystal Violet lactone | 4 |
| Water | 26 |
| Liquid B: | |
| Coated film forming agent (solid: 20%) | 20 |
| Bisphenol A | 15 |
| Calcium carbonate | 3 |
| Water | 12 |

Each of these coating liquids was applied on a commercially available pure paper 65 g/m$^2$ by a wire bar to obtain a heat-sensitive recording layer with a dried attachment amount of 3 g/m$^2$. Subsequently, the heat-sensitive recording paper was used in a high-speed facsimile device (Panafac UF-920, produced by Matsushita Electronics Industry Corp), and the image density was measured by a Macbeth densitometer. The results are shown in Table 14-1.

The water resistance was rated 0 when the printed portion exhibited a strength such that the printed portion after impregnation with 0.5 g of hot water for 5 minutes was rubbed with under a loading pressure of about 200 to 300 g with a forefinger tip without peel-off; was rated Δ when slight peel-off at the printed portion occurred; and rated x when heavy peel-off at the printed portion occurred. The results are shown in Table 14-1.

Sample Nos. 1–4 are Examples of the present invention, and Nos. 5–7 are Comparative Examples. From Table 14-1, it is clear that the aqueous emulsion of the present invention has good properties as a coated film forming material for a heat-sensitive recording paper.

(2) Evaluation of ink jet recording paper:

A water-soluble coating color for ink jet recording comprising 50 parts of the aqueous emulsion of Sample Nos. 1–7 and 100 parts of silica was applied on one surface of an original paper coated to 75 g/m$^2$ by an air knife coater, followed by calendering, to prepare an ink jet recording paper.

Subsequently, four colors of aqueous inks, cyan, magenta, yellow and black (color ink for ink jet printer produced by Sharp) were jetted onto these ink jet recording papers by an ink jet color printer (Ink Jet Color Image Printer IO-0700, produced by Sharp) to perform a multi-color ink jet printing.

The respective printed dot density, printed dot diameter, ink absorption, chromaticity, and water resistance after printing were then measured according to the following methods.

Printed dot density

The printed dot densities of each 10 dots printed by the color printer were measured by a microphotometer MPM 2 Model (produced by Union Kogaku) and the average value thereof was determined.

Printed dot diameter

The printed dot diameters of each 25 dots printed by the color printer were measured by an Image Analyzal-Zex 500 (produced by Toyo Ink Co.), and the average value thereof was determined.

Ink absorption

The time (seconds) from the moment when 0.2 μl of an aqueous ink was added dropwise onto the paper surface until all of the ink was absorbed was measured.

Chromaticity

The sharpness of the color of the ink jet recorded image was judged by visual observation.

◎: very good;
o: good;
Δ: bad;
x: very bad.

The water resistance test was performed according to the usual method practiced in an evaluation of heat-sensitive recording paper. The results are shown in Table 14-2. Sample Nos. 1–4 are Examples of the present invention, and Sample Nos. 5–7 are Comparative Examples. From Table 14-2, it is clear that the aqueous emulsion of the present invention is suitable as a coated film forming agent for coated paper for use as ink jet recording paper.

TABLE 14-1

| Sample No. | Image density | Water resistance |
|---|---|---|
| Example | | |
| 1 | 0.88 | O |
| 2 | 0.90 | O |
| 3 | 0.91 | O |
| 4 | 0.89 | O |
| Comparative Example | | |
| 5 | 0.79 | |
| 6 | 0.76 | X |
| 7 | 0.79 | X |

TABLE 14-2

| Sample No. | Printing dot density | Printing dot diameter | Ink absorption | Chromaticity sharpness | Water resistance |
|---|---|---|---|---|---|
| Example | | | | | |
| 1 | 1.35 | 220 | 10 | ◎ | O |
| 2 | 1.36 | 221 | 10 | ◎ | O |
| 3 | 1.34 | 224 | 10 | ◎ | O |
| 4 | 1.35 | 220 | 11 | ◎ | O |
| Comparative Example | | | | | |
| 5 | 1.05 | 269 | 17 | X | Δ |
| 6 | 1.07 | 272 | 19 | X | X |
| 7 | 1.04 | 275 | 17 | X | X |

EXAMPLE 14-2

The aqueous polymer emulsion obtained in Example 1-2 was evaluated as the coated film forming agent for coated paper by measurement of the surface size paper evaluation according to the following method.

(3) Surface size paper evaluation:

Pulp: LBKP:NBKP=50:50 (weight ratio) (formulated pipe beating degree: 430 cc);

Filler: kaolin clay for sheet making was added in an amount of 20% (based on pulp). However, the aqueous emulsions of Sample Nos. 8–14 and 14', controlled to a solid concentration 20% by weight, were applied by an air knife to a dried solid content of 0.2 g/m$^2$ on the non-sizing neutral paper (60 g/m$^2$) obtained under the sheet making conditions of an ash content of 9.5% by weight in the paper, dried and then these surface sized papers were dried in a thermostat-humidistat chamber at a temperature of 20° C. and a humidity of 65%, and measurements of sizing degree, surface strength, and wet paper strength were conducted according to the following standards.

Sizing degree: Stöckigt sizing degree was measured according to JIS-P-8122.

Surface strength: Relative comparison was conducted according to the 10 point method by an RI printing adequacy testing machine.

Wet paper strength: test strip was immersed in distilled water for 30 minutes and measured according to JIS-P-8135.

The results are shown in Table 14-3. Sample Nos. 8–11 are Examples of the present invention, and Sample Nos. 12–14 and 14' are Comparative Examples. From Table 14-3, it is clear that the aqueous emulsion of the present invention is suitable as the coated film forming agent for coating a surface sized paper.

TABLE 14-3

| Sample No. | Stockigt sizing degree (second) | Surface strength | Wet paper strength (m) |
|---|---|---|---|
| Example | | | |
| 8 | 59 | 9 | 0 |
| 9 | 73 | 9 | 0 |
| 10 | 125 | 9 | 0 |
| 11 | 54 | 9 | 0 |
| Comparative Example | | | |
| 12 | 39 | 2 | 0 |
| 13 | 8 | 2 | 0 |
| 14 | 31 | 3 | 0 |
| 14' | 34 | 4 | 0 |

EXAMPLE 14-3

The properties of the aqueous emulsions obtained in Example 1-3, the characteristics of the film obtained by air drying at 20° C., and the performances as the coated film forming agent for coated paper were evaluated as in Example 14-1.

The results of evaluation of Sample Nos. 15–17 and 19–21 as the heat-sensitive recording paper and the ink jet recording paper were good in all of the evaluation items.

Example 14-4

The aqueous polymer emulsions obtained in Example 1-4 were evaluated in the same manner as in Example 14-1 for the heat-sensitive recording paper, the ink jet recording paper or the surface sized paper. As a result, the evaluation results of Sample Nos. 23–34 were good for the heat sensitive recording paper, the ink jet recording paper, and the surface sized paper.

EXAMPLE 15-1

The aqueous polymer emulsions obtained in Example 1-1 were evaluated as an additive for paper making.

To a pulp slurry with a concentration of about 1.3% (LBKP, Canadian freeness 400 ml CSF) in a disintegrator was added 20% (based on pulp) of heavy calcium carbonate as the filler, the mixture was stirred for 3 minutes, and thereafter, the slurry was diluted to a pulp concentration of 1.0%. Next, to the pulp slurry was added a predetermined amount of the aqueous emulsion in Table 1-1 and, after stirring for 3 minutes, water was added to make a pulp slurry with a concentration of 0.5%.

Subsequently, the slurry was subjected to sheet making by a stirring type sheet machine (JIS-P-8209) and dried by a rotary dryer at 105° C. for 3 minutes to obtain a sheet of about 60 g/m$^2$.

The sheet thus obtained was left to stand for humidity control in a room at a temperature of 20° C. and a relative humidity of 65% for 24 hours, followed by evaluation of the sizing degree, paper force enhancement, and disintegratability, according to the following standards.

Sizing degree: measured according to the Stöckigt method based on the method of JIS-P-8112.

Paper force enhancement: measured by the bursting test based on the method of JIS-P-8112.

Disintegratability: 10 g of sheet strips with a size of 1.2 cm×0.2 cm were immersed in 750 ml of warm water at 50°–60° C., stirred by a mixer for domestic use, and the time before the paper strips were disintegrated and dispersed into the original pulp slurry was measured.

The evaluation results of the performances as the additive for paper making are shown in Table 15-1.

Sample Nos. 1–4 are Examples of the present invention, and Sample Nos. 5, 6 and 7 are Comparative Examples. From these results, it is clear that the aqueous emulsion of the present invention exhibits excellent effects as the additive for paper making.

According to the above methods, the evaluation of the properties of the aqueous emulsions, the film characteristics and performances as the additive for paper making was performed. The results are shown in Table 15-1.

Sample Nos. 1–4 are examples of the present invention, and it is clear that they exhibit excellent effects as the additive for paper making. Also, these samples were found to be good without generation of bad odor which will worsen the working environment during working, and without yellow discoloration. Sample Nos. 5–7 are Comparative Examples.

TABLE 15-1

| Sample No. | | Amount added %/pulp | Stockigt sizing degree (second) After one day | Stockigt sizing degree (second) After six months | Specific bursting degree After one day | Specific bursting degree After six months | Disintegratability After one day | Disintegratability After six months |
|---|---|---|---|---|---|---|---|---|
| Example | 1 | 0.15 | 18.3 | 18.6 | 2.0 | 1.9 | 20 | 20 |
| | | 0.30 | 29.3 | 30.1 | 2.7 | 2.6 | 25 | 25 |
| | | 0.60 | 46.3 | 43.9 | 3.7 | 3.8 | 30 | 20 |
| | 2 | 0.15 | 17.6 | 18.3 | 1.9 | 1.9 | 20 | 20 |
| | | 0.30 | 28.6 | 28.5 | 2.6 | 2.7 | 30 | 30 |
| | | 0.60 | 45.2 | 45.6 | 3.6 | 3.7 | 35 | 35 |
| | 3 | 0.15 | 21.4 | 20.5 | 2.0 | 2.0 | 20 | 20 |
| | | 0.30 | 31.2 | 31.0 | 2.8 | 2.7 | 25 | 25 |
| | | 0.60 | 48.3 | 47.9 | 3.9 | 3.9 | 30 | 35 |
| | 4 | 0.15 | 19.3 | 20.7 | 2.1 | 2.0 | 20 | 20 |
| | | 0.30 | 32.1 | 32.3 | 2.8 | 2.8 | 30 | 30 |
| | | 0.60 | 51.6 | 50.3 | 3.9 | 3.9 | 35 | 35 |
| Comparative Example | 5 | 0.15 | 11.4 | 11.0 | 1.3 | 1.3 | 25 | 30 |
| | | 0.30 | 18.6 | 18.5 | 1.7 | 1.8 | 40 | 45 |
| | | 0.60 | 31.6 | 29.6 | 2.4 | 2.4 | 50 | 55 |
| | 6 | 0.15 | 9.1 | 9.7 | 0.8 | 0.9 | 25 | 25 |
| | | 0.30 | 14.3 | 14.3 | 1.3 | 1.2 | 40 | 40 |
| | | 0.60 | 23.1 | 21.9 | 1.6 | 1.7 | 55 | 55 |
| | 7 | 0.15 | 10.5 | 11.0 | 1.1 | 1.2 | 25 | 25 |
| | | 0.30 | 17.2 | 17.0 | 1.5 | 1.6 | 40 | 40 |
| | | 0.60 | 27.1 | 27.4 | 2.0 | 1.9 | 50 | 55 |
| | 8 | 0 | 0 | 0 | 1.3 | 1.3 | — | — |

(Evaluation of additive for paper making)

EXAMPLE 15-2

The properties of the aqueous emulsion obtained in Example 1-2, the characteristics of the film formed by air drying at 20° C. and performances as the additive for paper making were measured and evaluated as in Example 15-1. The results are shown in Table 15-2. Sample Nos. 8–11 are Examples of the present invention, and Sample Nos. 12–14 and 14' are Comparative Examples.

TABLE 15-2

| Sample No. | | Amount added %/pulp | Stockigt sizing degree (second) After one day | Stockigt sizing degree (second) After six months | Specific bursting degree After one day | Specific bursting degree After six months | Disintegratability After one day | Disintegratability After six months |
|---|---|---|---|---|---|---|---|---|
| Example | 8 | 0.30 | 30.4 | 30.6 | 2.3 | 2.2 | 25 | 30 |
| | 9 | 0.30 | 27.8 | 29.2 | 2.1 | 2.1 | 30 | 30 |
| | 10 | 0.30 | 29.6 | 29.5 | 2.0 | 2.1 | 25 | 25 |
| | 11 | 0.30 | 31.7 | 30.9 | 2.2 | 2.3 | 25 | 25 |
| Comparative Example | 12 | 0.30 | 16.7 | 16.3 | 1.0 | 0.9 | 40 | 45 |
| | 13 | 0.30 | 14.2 | 15.1 | 1.0 | 1.1 | 45 | 45 |
| | 14 | 0.30 | 16.7 | 16.2 | 1.1 | 1.0 | 40 | 40 |
| | 14' | 0.30 | 24.3 | 25.6 | 1.5 | 1.6 | 50 | 50 |

(Evaluation of additive for paper making)

EXAMPLE 15-3

The properties of the aqueous emulsion obtained in Example 1-3, the characteristics of the film obtained by air drying at 20° C. and the performances as the additive for paper making were measured as in Example 15-1. The results are shown in Table 15-3.

Sample Nos. 15, 16, 17, 19, 20, and 21 are Examples of the present invention, and Sample Nos. 18 and 22 are Comparative Examples.

TABLE 15-3

| Sample No. | Amount added %/pulp | Stockigt sizing degree (second) | | Specific bursting degree | | Disintegratability | |
|---|---|---|---|---|---|---|---|
| | | After one day | After six months | After one day | After six months | After one day | After six months |
| 15 | 0.15 | 18.6 | 18.9 | 2.2 | 2.1 | 15 | 20 |
| 16 | 0.25 | 26.5 | 27.2 | 2.4 | 2.4 | 20 | 20 |
| 17 | 0.25 | 27.1 | 28.0 | 2.5 | 2.4 | 25 | 25 |
| 19 | 0.25 | 26.3 | 25.7 | 2.6 | 2.4 | 20 | 20 |
| 20 | 0.50 | 40.9 | 42.1 | 3.3 | 3.2 | 30 | 25 |
| 21 | 0.50 | 43.1 | 44.2 | 3.4 | 3.6 | 30 | 30 |

(Evaluation of additive for paper making)

EXAMPLE 15-4

The aqueous polymer emulsions obtained in Example 1-4 were evaluated in the same manner as in Example 15-1.

The results are shown in Table 15-4. Sample Nos. 23–34 are Examples of the present invention.

TABLE 15-4

| Sample No. | Amount added %/pulp | Stockigt sizing degree (second) | | Specific bursting degree | | Disintegratability | |
|---|---|---|---|---|---|---|---|
| | | After one day | After six months | After one day | After six months | After one day | After six months |
| 23 | 0.15 | 16.7 | 17.2 | 2.2 | 2.1 | 20 | 20 |
| 24 | 0.15 | 17.0 | 16.8 | 2.3 | 2.1 | 20 | 20 |
| 25 | 0.30 | 26.6 | 27.2 | 2.9 | 2.9 | 25 | 25 |
| 26 | 0.60 | 43.7 | 44.1 | 4.0 | 4.1 | 35 | 35 |
| 27 | 0.15 | 18.2 | 17.9 | 1.9 | 2.0 | 15 | 20 |
| 28 | 0.30 | 32.4 | 33.4 | 2.5 | 2.6 | 25 | 25 |
| 29 | 0.30 | 31.5 | 30.6 | 2.6 | 2.4 | 25 | 20 |
| 30 | 0.60 | 49.2 | 48.7 | 3.8 | 3.7 | 35 | 30 |
| 31 | 0.15 | 20.2 | 20.4 | 2.2 | 2.3 | 20 | 20 |
| 32 | 0.30 | 31.3 | 30.0 | 2.8 | 2.7 | 25 | 25 |
| 33 | 0.30 | 33.4 | 34.2 | 2.9 | 3.0 | 25 | 25 |
| 34 | 0.60 | 51.7 | 52.0 | 4.1 | 3.9 | 35 | 35 |

(Evaluation of additive for paper making)

EXAMPLE 16-1

The aqueous polymer emulsions obtained in Example 1-1 were evaluated as a toner.

Based on 100% of the above aqueous emulsion, 10% of carbon black was added thereto in a ball mill, uniformly mixed and dispersed therewith to prepare a toner slurry. The toner slurry was granulated by a spray dryer, and dry classified to obtain a spherical toner with an average particle size of 15 μm.

Further, the toner was mixed with iron powder carrier to prepare a developer, and electrophotographic characteristics of blocking property, stability, cleaning property, water resistance, abrasion resistance, water resistance and solvent resistance, and image characteristics were evaluated according to the following standards.

Blocking property: the above developer was left to stand in a thermostat-humidistat chamber at 35° C. and 85% humidity for one month, and the presence or absence of blocking of the toner was visually judged.

o: no blocking;

Δ: slight blocking;

x: heavy blocking.

Fixability: after a latent image having negative static charges was developed according to the conventional two-component developing method, it was transferred onto a pure paper. At this time, the transfer paper having the image was passed through a pressure fixer which applied a pressure contact force by two pressurizing rollers at a line speed of 125 mm/sec. and a line pressure of 10 kg/mm from both ends, and the fixability and image were visually judged according to the following standards.

o: fixability is good, and sharp image without fog is formed;

x: fixability is poor, and image with fog is formed.

Cleaning property: continuous copying was performed on a pure paper of A4 under the conditions of a temperature of 30° C. and a humidity of 80% RH, and the cleaning property was evaluated by the number of copies before poor cleaning occurred.

Abrasion resistance, water resistance or solvent resistance:

the image portion on the pure paper having good results obtained in the fixing test was rubbed (directly or) after impregnated with 0.5 g of water droplets (or benzene droplets) for 5 minutes under a loading of about 200 to 300 g with a forefinger tip, and the state of the image portion was visually judged according to the following standards.

o: sharp image portion maintained;

Δ:slight peeling observed at image portion;

x: heavy peeling observed at image portion.

The properties of the aqueous emulsion, the characteristics of the film and electrophotographic characteristics and image characteristics when used as the resin for toner are shown in Table 16-1.

The sample Nos. 1–4 are Examples of the present invention, and it is clear that the aqueous emulsion of the present invention comprises ultra-fine particles having intramolecular and (or) intermolecular crosslinked structure, and the film formed has an excellent transparency, water resistance and mechanical strength, and a lower glass transition temperature than the aqueous emulsion obtained by the method of the prior art, thus being an aqueous emulsion which has an excellent film forming property and is suitable as the resin for toner. Sample Nos. 5–7 are Comparative Examples.

TABLE 16-1

| Sample No. | | Blocking property | Fixing property | Cleaning property | Water resistance | Solvent resistance | Abrasion resistance |
|---|---|---|---|---|---|---|---|
| Example | 1 | o | o | 1200 or more | o | o | o |
| | 2 | o | o | 1200 or more | o | o | o |
| | 3 | o | o | 1200 or more | o | o | o |
| | 4 | o | o | 1200 or more | o | o | o |
| Comparative | 5 | o | x | less than 1000 | o | o | Δ |
| Example | 6 | x | x | less than 1000 | x | x | Δ |
| | 7 | Δ | x | less than 1000 | o | o | Δ |

EXAMPLE 16-2

The properties of the aqueous emulsion obtained in Example 1-2, the characteristics of the film formed by air drying at 20° C. and performances as the resin for toner were measured and evaluated as in Example 16-1. The results are shown in Table 16-2. Sample Nos. 8–11 are Examples of the present invention, and Sample Nos. 12–14 and 14' are Comparative Examples.

TABLE 16-2

| Sample No. | | Blocking property | Fixing property | Cleaning property | Water resistance | Solvent resistance | Abrasion resistance |
|---|---|---|---|---|---|---|---|
| Example | 8 | o | o | 1200 or more | o | o | o |
| | 9 | o | o | 1200 or more | o | o | o |
| | 10 | o | o | 1200 or more | o | o | o |
| | 11 | o | o | 1200 or more | o | o | o |
| Comparative | 12 | o | x | less than 1000 | o | o | Δ |
| Example | 13 | x | x | less than 1000 | x | x | Δ |
| | 14 | Δ | x | less than 1000 | o | o | Δ |

Example 16-3

The properties of the aqueous emulsion obtained in Example 1-3, the characteristics of the film obtained by air drying at 20° C. and the performances as the resin for toner were measured as in Example 16-1. The results are shown in Table 16-3.

Sample Nos. 15, 16, 17, 19, 20, and 21 are Examples of the present invention.

TABLE 16-3

| Sample No. | Blocking property | Fixing property | Cleaning property | Water resistance | Solvent resistance | Abrasion resistance |
|---|---|---|---|---|---|---|
| 15 | o | o | 1200 or more | o | o | o |
| 16 | o | o | 1200 or more | o | o | o |
| 17 | o | o | 1200 or more | o | o | o |
| 19 | o | o | 1200 or more | o | o | o |
| 20 | o | o | 1200 or more | o | o | o |
| 21 | o | o | 1200 or more | o | o | o |

EXAMPLE 16-4

The aqueous emulsions obtained in Example 1-4 were evaluated as the resin for toner, and as the result, they all had an excellent blocking property, fixability, cleaning property (1200 sheets or more), water resistance, solvent resistance, and abrasion resistance.

EXAMPLE 17-1

The aqueous polymer emulsions obtained in Example 1-1 were evaluated as a photosensitive material.

The silver halide gelatin emulsion comprising 90 mole% of silver chloride, 9 mole% of silver bromide and 1 mole% of silver iodine was chemically sensitized by using a sulfur sensitizer and gold sensitizer. The above aqueous emulsion was added to the silver halide emulsion so that the solid content thereof became 50% relative to gelatin, and then the mixture was mixed uniformly. Subsequently, the silver halide emulsion obtained was applied by coating on a paper support coated with resin by an extrusion coating method, to give a silver quantity of 1.5 g/m$^2$, followed by drying, to prepare a sample.

A part of this photographic material was subjected to exposure through a step tablet be using a tungsten light, developed at 20° C. for 30 seconds by using a roller conveying automatic developing processing material and the developing solution and fixing solution having the composition shown below, and then fixed at 28° C. for 20 seconds. Thereafter, the photographic material was washed for 20 seconds with running water at 20° C., followed by drying in hot air at 45° C.

| [Developing solution (stock solution)] | |
|---|---|
| Potassium bromide | 2.5 g |
| Ethylenediaminetetraacetic acid disodium salt | 1 g |
| Potassium sulfite (55% aqueous solution) | 90 g |
| Potassium carbonate | 25 g |
| Hydroquinone | 10 g |
| 5-Methylbenzotriazole | 100 mg |
| 5-Nitrobenzotriazole | 100 mg |
| 1-Phenyl-5-mercaptotetrazole | 30 mg |
| 5-Nitroindazole | 50 mg |
| 1-Phenyl-4-methyl-4-hydroxymethyl-3-pyrazolidone | 0.5 g |
| Diethylene glycol: | 60 g |
| Sodium hydroxide | amount to adjust pH to 10.6 |
| made up to 500 ml with addition of water | |

The above stock solution was diluted 2-fold with water when used.

| Fixing solution | |
|---|---|
| (Part A) | |
| Ammonium thiosulfate | 170 g |
| Sodium sulfite | 15 g |
| Boric acid | 6.5 g |
| Glacial acetic acid | 12 ml |
| Sodium citrate (dihydrate) | 2.5 g |
| made up to 275 ml with addition of water | |
| (Part B) | |
| Aluminum sulfate (18 hydrate) | 15 g |
| Sulfuric acid (98%) | 2.5 g |
| made up to 40 ml with addition of water | |

The solution to be used prepared by adding 275 ml of the above Part A solution, about 600 ml of water, and then 40 ml of Part B solution, followed by a further addition of water to give a total amount of 1000 ml.

The photographic performances of the respective photographic samples processed by using these processing solutions were evaluated according to the following standards.

Appearance: luster of the photographic layers was judged by visual observation and evaluated according to the following standards:

o: good luster and excellent appearance

Δ: slightly reduced luster x: no luster

Abrasion resistance, water resistance or solvent resistance: the load of about 200 to 300 g was applied by rubbing the photographic layer directly with a tip of forefinger or after having been impregnated with 0.5 g of water or benzene oil for 5 minutes, and the photographic layers were evaluated by visual observation according to the following standards:

o: sharp photographic layer maintained

Δ: slight peeling observed on photographic layer x: heavy peeling observed on photographic layer Blackening density: blackening density of the photographic layer was measured by a Macbeth densitometer (RD-519) and the evaluation was made with a maximum density.

The properties of the aqueous emulsion, the characteristics of the film formed and the photographic performances obtained according to the above method are shown in Table 17 - 1.

The Sample Nos. 1–4 are Examples of the present invention, and the Sample Nos. 5–7 are Comparative Examples. As seen from the Table 17-1, it is clear that the Samples of the present invention are good as a photographic material.

Further, the Sample Nos. 1–4 also exhibit an excellent dimensional stability (curling degree) and hard tone.

TABLE 17-1

| Sample No. | | Appearance | Abrasion resistance | Water resistance | Solvent resistance | Maximum density |
|---|---|---|---|---|---|---|
| Example | 1 | o | o | o | o | 2.16 |
| | 2 | o | o | o | o | 2.27 |
| | 3 | o | o | o | o | 2.15 |
| | 4 | o | o | o | o | 2.15 |
| Comparative Example | 5 | Δ | Δ | o | o | 1.92 |
| | 6 | x | x | x | x | 1.83 |
| | 7 | Δ | Δ | o | o | 1.94 |

EXAMPLE 17-2

The properties of the aqueous emulsion obtained in Example 1-2, the characteristics of the film formed by air drying at 20° C. and the photographic performances were measured and evaluated as in Example 17-1. The results are shown in Table 17-2. Sample Nos. 8–11 are Examples of the present invention, and Sample Nos. 12–14 and 14' are Comparative Examples.

TABLE 17-2

| Sample No. | | Appearance | Abrasion resistance | Water resistance | Solvent resistance | Maximum density |
|---|---|---|---|---|---|---|
| Example | 8 | o | o | o | o | 2.15 |
| | 9 | o | o | o | o | 2.15 |
| | 10 | o | o | o | o | 2.16 |
| | 11 | o | o | o | o | 2.17 |
| Comparative Example | 12 | Δ | Δ | o | o | 1.93 |
| | 13 | x | Δ | x | x | 1.96 |
| | 14 | Δ | Δ | o | o | 1.92 |
| | 14' | Δ | Δ | o | o | 2.03 |

EXAMPLE 17-3

The aqueous emulsions obtained in Example 1-3 were evaluated for the photographic performances as in Example 17-1. The results are shown in Table 17-3.

Sample Nos. 15, 16, 17, 19, 20, and 21 are Examples of the present invention.

TABLE 17-3

| Sample No. | Appearance | Abrasion resistance | Water resistance | Solvent resistance | Maximum density |
|---|---|---|---|---|---|
| 15 | o | o | o | o | 2.14 |
| 16 | o | o | o | o | 2.17 |
| 17 | o | o | o | o | 2.17 |
| 19 | o | o | o | o | 2.16 |
| 20 | o | o | o | o | 2.13 |

TABLE 17-3-continued

| Sample No. | Appearance | Abrasion resistance | Water resistance | Solvent resistance | Maximum density |
|---|---|---|---|---|---|
| 21 | o | o | o | o | 2.15 |

EXAMPLE 17-4

The photographic performances of the aqueous emulsions of Sample Nos. 23–24 obtained in Example 1-4 were measured and evaluated as in Example 17-1. The results obtained indicated that all of the samples had an excellent appearance, abrasion resistance and solvent resistance, and exhibited good photographic performances at the maximum density of 2.14 to 2.18.

We claim:

1. An aqueous polymer latex having an average particle size of 100 nm or less, a crosslinked structure, and a measured glass transition temperature which is lower, by 3° C. or more, than its glass transition temperature when calculated by a weight fraction method, wherein said aqueous latex is derived from the emulsion copolymerization of (i) at least one unsaturated monomer selected from the group consisting of methacrylates, lower fatty acid vinyl esters, styrenes, vinyls, dienes, and vinyl pyridine and (ii) a comonmomer selected from the group consisting of copolymerizable unsaturated monomers having the formulae:

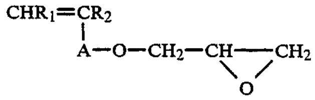
(II)

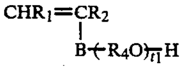
(III)

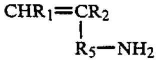
(IV)

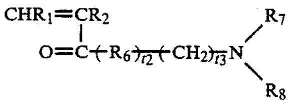
(V)

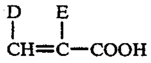
(VI)

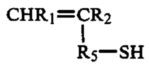
(VII)

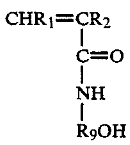
(VIII)

wherein $R_1$, $R_2$, $R_4$, $R_5$, $R_6$, $R_7$, $R_8$, $R_9$, B, D, E, $t_1$, $t_2$ and $t_3$ have the following meanings:

$R_1$, $R_2$: hydrogen or methyl;

$R_4$: alkylene having 2 to 4 carbon atoms;

$R_5$: direct bond, alkylene having 1 to 3 carbon atoms, phenylene or substituted phenylene;

$R_6$: oxygen or —NH—;

$R_7$: hydrogen, alkylol having 1 to 5 carbon atoms;

R8: hydrogen, alkylol having 1 to 5 carbon atoms or alkyl having 1 to 5 carbon atoms;

$R_9$: alkylene having 1 to 4 carbon atoms;

A: methylene or carbonyl;

B: $—CH_2O—$ or carboxyl;

D: hydrogen alkyl having 1 to 3 carbon atoms, carboxyl,

 or $—CONHCONH_2$;

E: hydrogen atom, alkyl having 1 to 3 carbon atoms or $—CH_2COOH$;

$t_1$: real number of 1 to 20;

$t_2$: integer of 0 to 1; and $t_3$: integer of 0 to 10;

in the presence of at least one emulsifying agent selected from the group consisting of emulsifiers having the formulae:

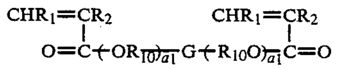
(IX)

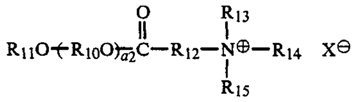
(X)

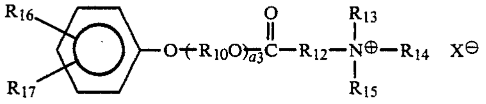
(XI)

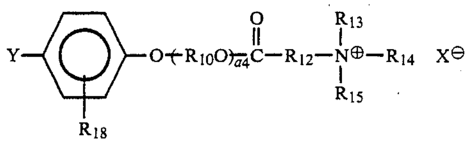
(XII)

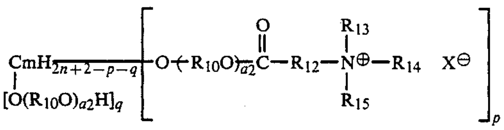
(XIII)

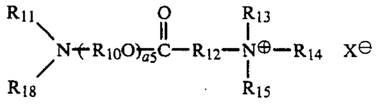
(XIV)

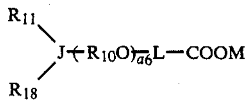
(XV)

$R_{11}—N—[—(R_{10}O)_{a7}L—COOM]_2$ (XVI)

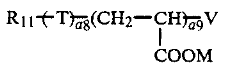
(XVII)

wherein $R_1$, $R_2$, $R_{10}$, $R_{11}$, $R_{12}$, $R_{13}$, $R_{14}$, $R_{15}$, $R_{16}$, $R_{17}$, $R_{18}$, $a_1$, $a_2$, $a_3$, $a_4$, $a_5$, $a_6$, $a_7$, $a_8$, $a_9$, $a_{10}$, G, J, L, M, T, X, Y and V have the following meanings:

$R_1$, $R_2$: hydrogen or methyl;

$R_{10}$: alklene having 2 to 4 carbon atoms;

$R_{11}$: alkyl or alkenyl having 8 to 30 carbon atoms, which are either straight or branched, preferably one having 8 to 18 carbon atoms;

$R_{12}$: alkylene having 1 to 5 carbon atoms;

$R_{13}$, $R_{14}$, $R_{15}$: alkyl having 1 to 3 carbon atoms or $—C_2H_4OH$, and the respective groups may be either the same or different;

$R_{16}$, $R_{17}$: alkyl having 6 to 20 carbon atoms or hydrogen, of which at least one is alkyl having 6 to 20 carbon atoms;

$R_{18}$: hydrogen, alkyl or alkenyl having 1 to 30 carbon atoms;

$a_1$, $a_2$, $a_3$, $a_4$, $a_5$, $a_6$, $a_7$: each represent average moles added, $a_1$: real number of 1 to 50, and preferable the more number of alkylene oxide added in the molecule is 8 or more;

$a_2$: real number of 0 to 20;

$a_3$: real number of 0 to 20 when either one of $R_{16}$ and $R_{17}$ is alkyl, and a real number of 1 to 30 when both $R_{16}$ and $R_{17}$ are alkyls;

$a_4$: real number of 1 to 30;

$a_5$: real number of 0 to 20;

$a_6$: real number of 0 to 20;

$a_7$: real number of 0 to 20;

$a_8$: integer of 0 or 1;

$a_9$: real number of 2 to 20;

p: integer of 2 to 5;

q: integer of 0 to 3;

G:

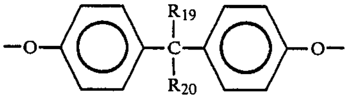

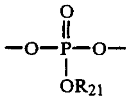

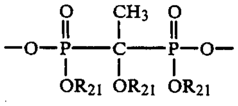

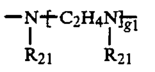 or $—O—C_nH_{2n-g_2}(R_{21})_{g_2}O—$ $R_{19}$, $R_{20}$: hydrogen or alkyl having 1 to 2 carbon atoms;

$R_{21}$: hydrogen or $-(R_{10}O)-_{a_{10}}H$ or

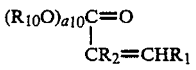

$g_1$: integer of 0 to 5;

$g_2$: integer of 0 to 10;

n: integer of 1 to 10;

$a_{10}$: real number of 1 to 50;

Y:

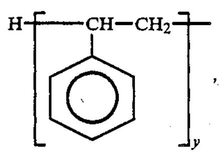

,

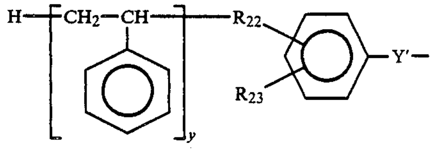

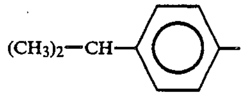 or

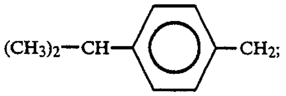

and y is a real number of 1 to 5;

$R_{22}$, $R_{23}$: hydrogen or alkyl having 1 to 20 carbon atoms;

y′: alkylene having 3 to 8 carbon atoms, oxygen or carbonyl;

J: nitrogen,

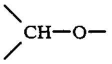 or 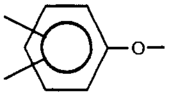

L: alkylene having 1 to 5 carbon atoms or

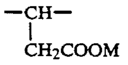

T: direct bond, oxygen sulfur;

M: hydrogen or inorganic anion;

X: inorganic anion or organic anion;

V: hydrogen or halogen.

2. An aqueous polymer latex as claimed in claim 1, wherein the average particle size is 80 nm or less.

3. A coating or paint composition comprising an aqueous polymer latex according to claim 1 and conventional ingredients for the coating composition.

4. An aqueous polymer latex as claimed in claim 1, wherein said aqueous polymer is derived from a (meth-)acrylate and a copolymerizable unsaturated monomer of formula (VIII) in the presence of an emulsifying agent of formula (XI).

* * * * *

UNITED STATES PATENT AND TRADEMARK OFFICE

CERTIFICATE OF CORRECTION

PATENT NO. : 4,943,612

DATED : July 24, 1990

INVENTOR(S) : MORITA et al

It is certified that error appears in the above-identified patent and that said Letters Patent is hereby corrected as shown below:

Column 109, claim 1, line 25, before "methacrylates", insert therefor --acrylates and--.

Signed and Sealed this

Thirteenth Day of April, 1993

*Attest:*

STEPHEN G. KUNIN

*Attesting Officer*

*Acting Commissioner of Patents and Trademarks*